US012695913B2

(12) United States Patent
Misra et al.

(10) Patent No.: US 12,695,913 B2
(45) Date of Patent: Jul. 28, 2026

(54) SYSTEMS AND METHODS FOR COMPRESSION OF FEATURE DATA USING JOINT CODING IN CODING OF MULTI-DIMENSIONAL DATA

(71) Applicant: Sharp Kabushiki Kaisha, Sakai City (JP)

(72) Inventors: Kiran Mukesh Misra, Vancouver, WA (US); Tianying Ji, Vancouver, WA (US); Christopher Andrew Segall, Vancouver, WA (US); Frank Bossen, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/694,138

(22) PCT Filed: Sep. 16, 2022

(86) PCT No.: PCT/JP2022/034656
§ 371 (c)(1),
(2) Date: Mar. 21, 2024

(87) PCT Pub. No.: WO2023/048070
PCT Pub. Date: Mar. 30, 2023

(65) Prior Publication Data
US 2024/0414348 A1      Dec. 12, 2024

Related U.S. Application Data

(60) Provisional application No. 63/248,733, filed on Sep. 27, 2021, provisional application No. 63/247,111, filed on Sep. 22, 2021.

(51) Int. Cl.
*H04N 19/64*        (2014.01)
*H04N 19/124*       (2014.01)
(Continued)

(52) U.S. Cl.
CPC ........... *H04N 19/64* (2014.11); *H04N 19/124* (2014.11); *H04N 19/136* (2014.11);
(Continued)

(58) Field of Classification Search
CPC ........ H04N 19/64; H04N 19/30; H04N 19/31; H04N 19/34; H04N 19/36; H04N 19/63
See application file for complete search history.

(56) References Cited

U.S. PATENT DOCUMENTS

2002/0181795 A1* 12/2002 Chen .................... H04N 19/192
                                                  375/E7.226
2006/0013303 A1*  1/2006 Nguyen ................. H04N 19/63
                                                  375/E7.044
(Continued)

FOREIGN PATENT DOCUMENTS

CN        113422952 A  *  9/2021  ........... G06F 18/253
EP         2685718 A1 *  1/2014  ........... H04N 19/122
(Continued)

OTHER PUBLICATIONS

International Telecommunication Union, "Series H: Audiovisual and Multimedia Systems Infrastructure of audiovisual services—Coding of moving video, Advanced video coding for generic audiovisual services", ITU-T H.264, Aug. 2021, 842 pages.
(Continued)

*Primary Examiner* — David N Werner
(74) *Attorney, Agent, or Firm* — Keating & Bennett, LLP

(57) ABSTRACT

This disclosure discloses a method of compressing feature data corresponding to video data. The method comprising: generating feature data including a number of channels corresponding to a scale for each of N pictures included in video data, concatenating the generated feature data about the channel dimension, reducing the number of channels in the concatenated feature data to generate reduced concat-
(Continued)

enated feature data and encoding the reduced concatenated feature data into a bitstream.

8 Claims, 56 Drawing Sheets

(51) Int. Cl.

| | |
|---|---|
| *H04N 19/136* | (2014.01) |
| *H04N 19/172* | (2014.01) |
| *H04N 19/30* | (2014.01) |
| *H04N 19/70* | (2014.01) |
| *H04N 19/85* | (2014.01) |
| *H04N 19/91* | (2014.01) |
| *H04N 19/31* | (2014.01) |
| *H04N 19/34* | (2014.01) |
| *H04N 19/36* | (2014.01) |
| *H04N 19/63* | (2014.01) |

(52) U.S. Cl.
CPC .......... *H04N 19/172* (2014.11); *H04N 19/30* (2014.11); *H04N 19/70* (2014.11); *H04N 19/85* (2014.11); *H04N 19/91* (2014.11); *H04N 19/31* (2014.11); *H04N 19/34* (2014.11); *H04N 19/36* (2014.11); *H04N 19/63* (2014.11)

(56) References Cited

U.S. PATENT DOCUMENTS

| | | | | |
|---|---|---|---|---|
| 2014/0064380 A1* | 3/2014 | Mallat | .................... | H04N 19/61 |
| | | | | 375/240.18 |
| 2015/0341660 A1* | 11/2015 | Joshi | ...................... | H04N 19/93 |
| | | | | 375/240.03 |
| 2018/0176578 A1* | 6/2018 | Rippel | ............. | G06V 30/19173 |
| 2019/0387250 A1* | 12/2019 | Boyce | .................... | H04N 19/52 |
| 2020/0304804 A1* | 9/2020 | Habibian | ............. | G06N 3/0464 |
| 2021/0160499 A1* | 5/2021 | Wang | ................... | G06N 3/0495 |
| 2022/0224934 A1* | 7/2022 | Rippel | ................. | G06N 3/0455 |

FOREIGN PATENT DOCUMENTS

| | | | | | |
|---|---|---|---|---|---|
| GB | 2505640 | B | * | 12/2014 | ............. H04N 19/50 |
| WO | WO-9602895 | A1 | * | 2/1996 | ........... H04N 19/186 |

OTHER PUBLICATIONS

International Telecommunication Union, "Series H: Audiovisual and Multimedia Systems Infrastructure of audiovisual services—Coding of moving video, High efficiency video coding", ITU-T H.265, Dec. 2016, 662 pages.

Bross et al., "Versatile Video Coding Editorial Refinements on Draft 10", Joint Video Experts Team (JVET) of ITU-T SG 16 WP 3 and ISO/IEC JTC 1/SC 29, JVET-T2001-v2, Oct. 7-16, 2020, pp. 1-512.

Zhang et al., "MSFC: Deep Feature Compression in Multi-Task Network", IEEE International Conference on Multimedia and Expo (ICME), Jul. 5, 2021, pp. 1-6.

Pan et al., "A CNN-Based Fast Inter Coding Method for VVC", IEEE Signal: Processing Letters, vol. 28, Jun. 7, 2021, pp. 1260-1264.

Lee et al., "Deep Video Prediction Network-Based Inter-Frame Coding in HEVC", IEEE Access vol. 8, May 11, 2020, pp. 95906-95917.

Zhao et al., "Enhanced Bi-Prediction With Convolutional Neural Network for High-Efficiency Video Coding", IEEE Transactions on Circuits and Systems for Video Technology, vol. 29, No. 11, Nov. 2019, pp. 3291-3301.

Xing et al., "End-Edge-Cloud Collaborative System: A Video Big Data Processing and Analysis Architecture", IEEE Conference on Multimedia Information Processing and Retrieval (MIPR), 2020, pp. 233-236.

Redmon et al., "YOLOv3: An Incremental Improvement", https://arxiv.org/abs/1804.02767, Apr. 8, 2018, 6 pages.

Everingham et al., "The PASCAL Visual Object Classes Challenge—a Retrospective", International Journal of Computer Vision vol. 111, 2015, Jun. 25, 2014, pp. 1-38.

Honda, "Digging into Detectron 2—part 1-5", Medium.com, Jan. 5-Jun. 4, 2020, 62 pages.

Theis et al., "Lossy Image Compression With Compressive Autoencoders", ICLR, https://arxiv.org/abs/1703.00395, Mar. 1, 2017, 19 pages.

Ronneberger et al., "U-Net: Convolutional Networks for Biomedical Image Segmentation", https://arxiv.org/abs/1505.04597, May 18, 2015, pp. 234-241.

Mentzer et al., "Conditional Probability Models for Deep Image Compression", CVPR 2018, https://arxiv.org/abs/1801.04260, Jun. 4, 2019, pp. 4394-4402.

* cited by examiner

[Fig. 2A]
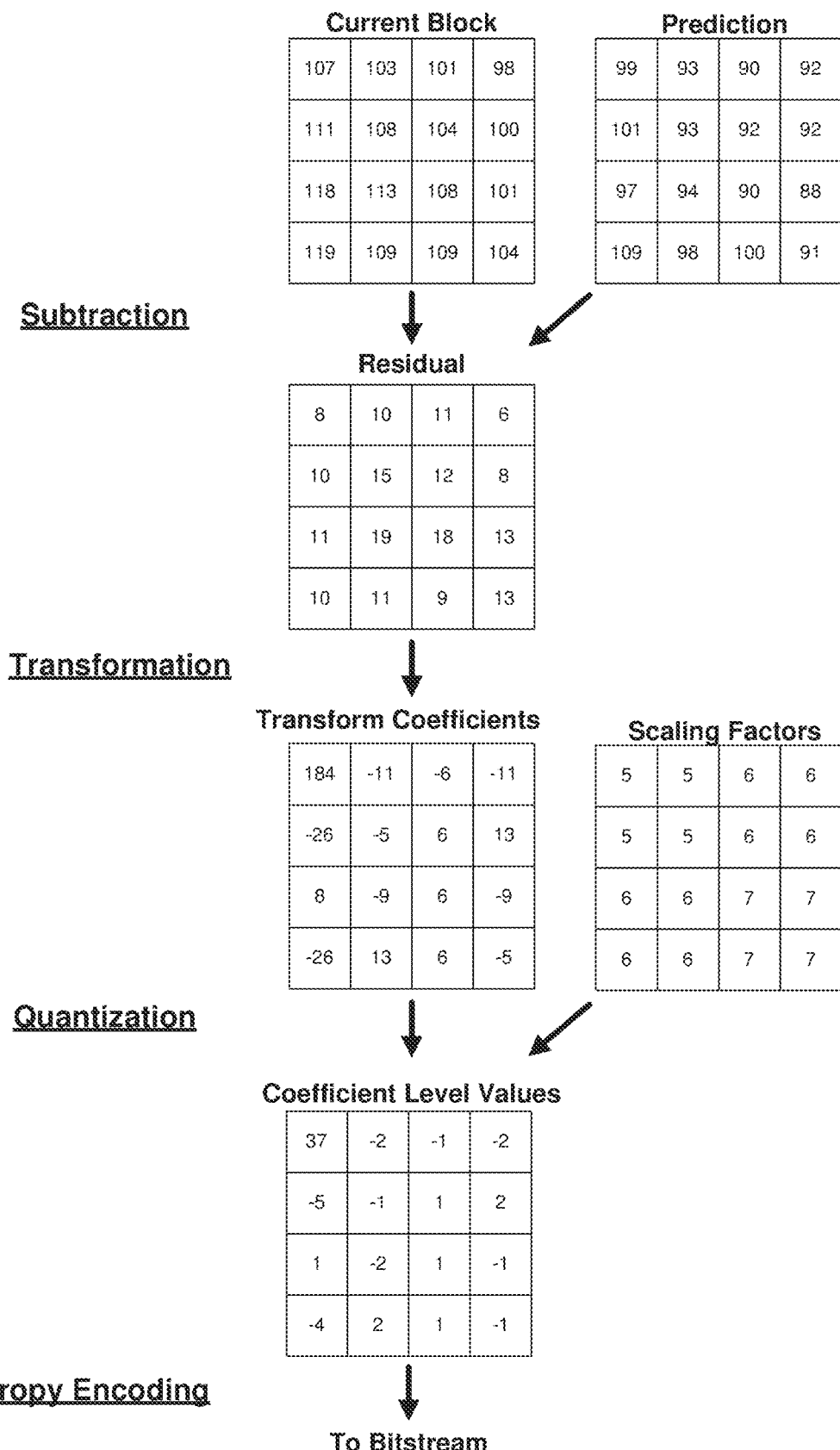

[Fig. 2B]
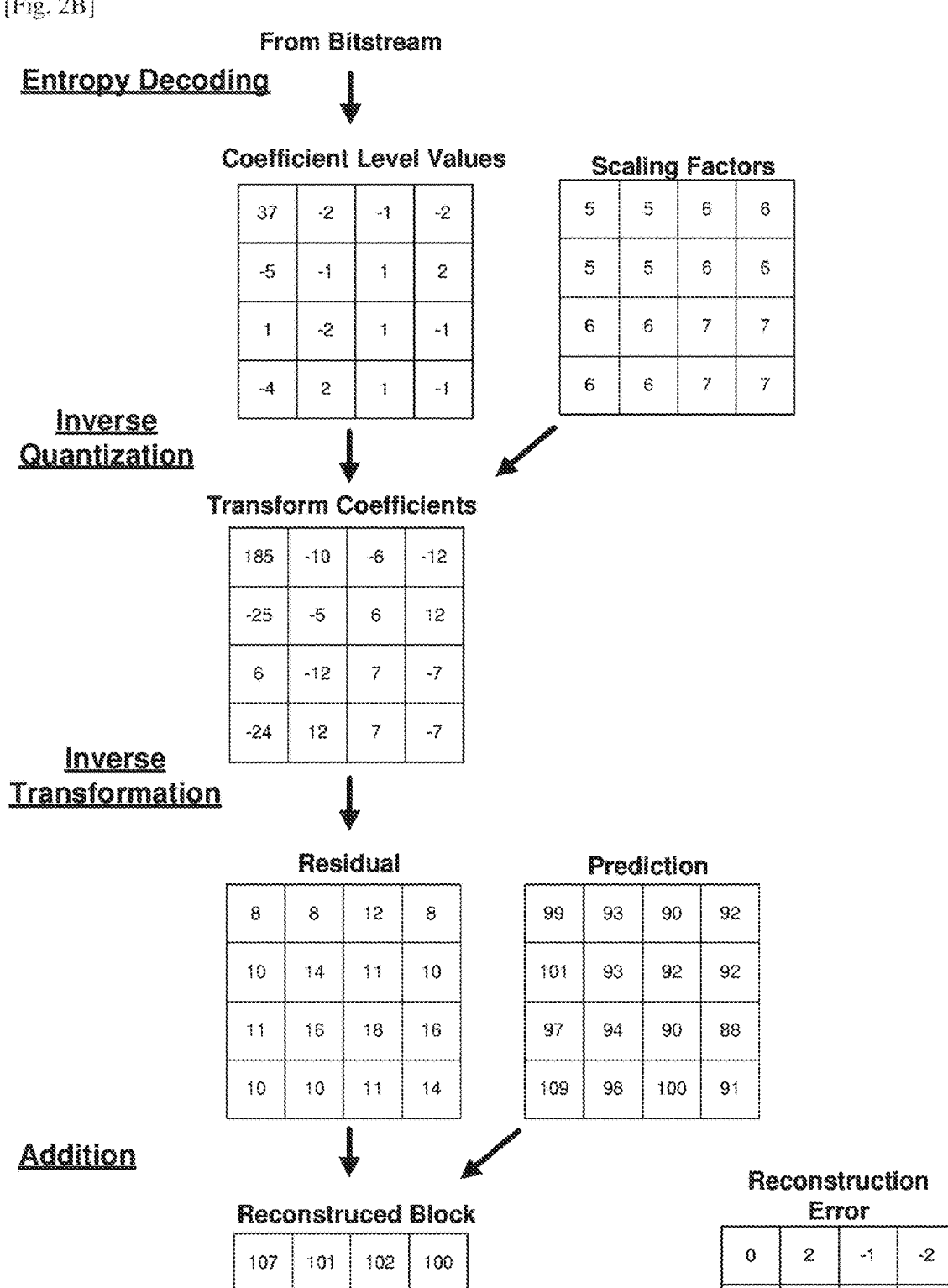

Figure 7B:
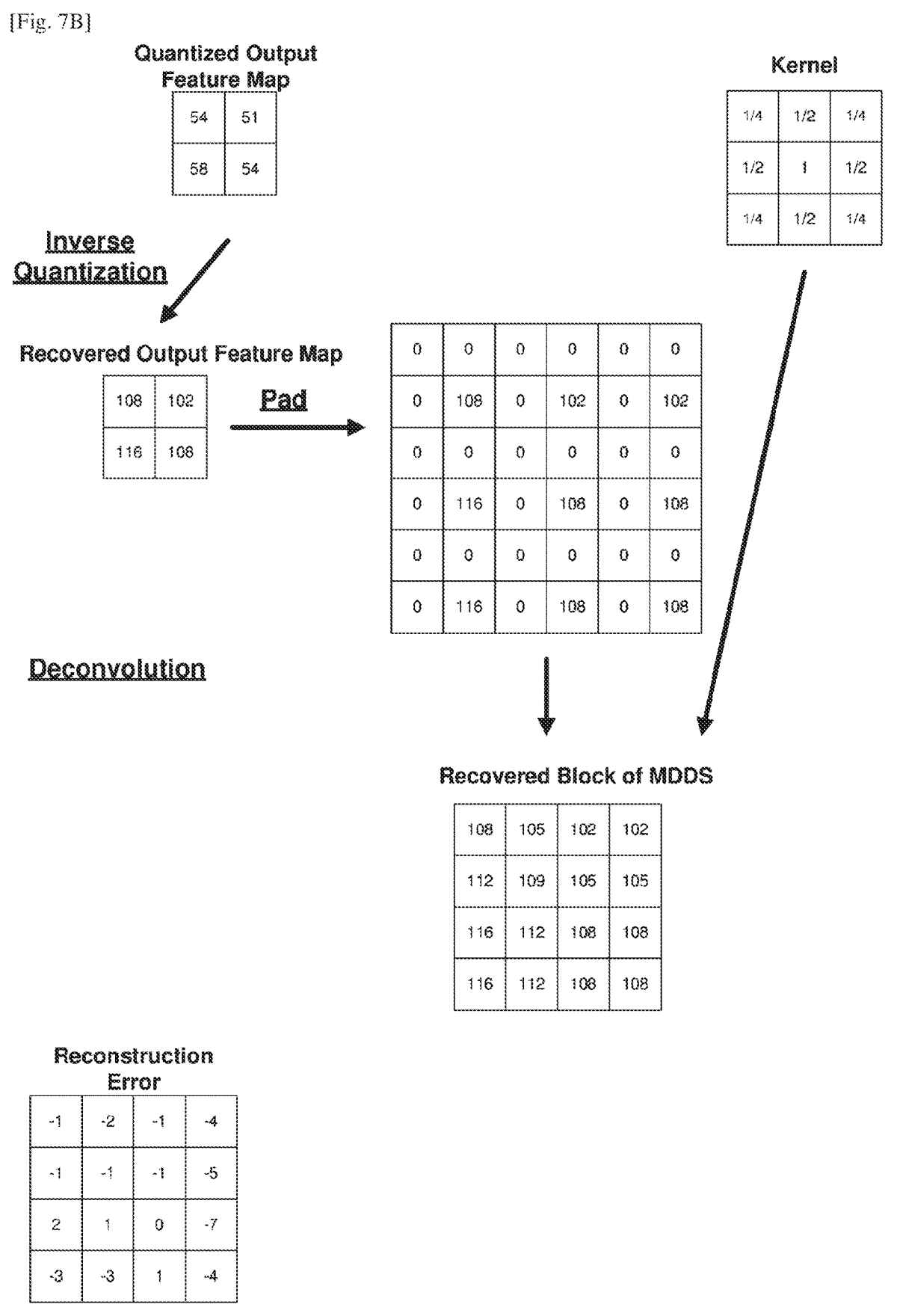

Quantized Output Feature Map

| 54 | 51 |
|----|----|
| 58 | 54 |

Kernel

| 1/4 | 1/2 | 1/4 |
|-----|-----|-----|
| 1/2 | 1 | 1/2 |
| 1/4 | 1/2 | 1/4 |

Inverse Quantization

Recovered Output Feature Map

| 108 | 102 |
|-----|-----|
| 116 | 108 |

Pad

| 0 | 0 | 0 | 0 | 0 | 0 |
|---|---|---|---|---|---|
| 0 | 108 | 0 | 102 | 0 | 102 |
| 0 | 0 | 0 | 0 | 0 | 0 |
| 0 | 116 | 0 | 108 | 0 | 108 |
| 0 | 0 | 0 | 0 | 0 | 0 |
| 0 | 116 | 0 | 108 | 0 | 108 |

Deconvolution

Recovered Block of MDDS

| 108 | 105 | 102 | 102 |
|-----|-----|-----|-----|
| 112 | 109 | 105 | 105 |
| 116 | 112 | 108 | 108 |
| 116 | 112 | 108 | 108 |

Reconstruction Error

| -1 | -2 | -1 | -4 |
|----|----|----|----|
| -1 | -1 | -1 | -5 |
| 2 | 1 | 0 | -7 |
| -3 | -3 | 1 | -4 |

Figure 13:
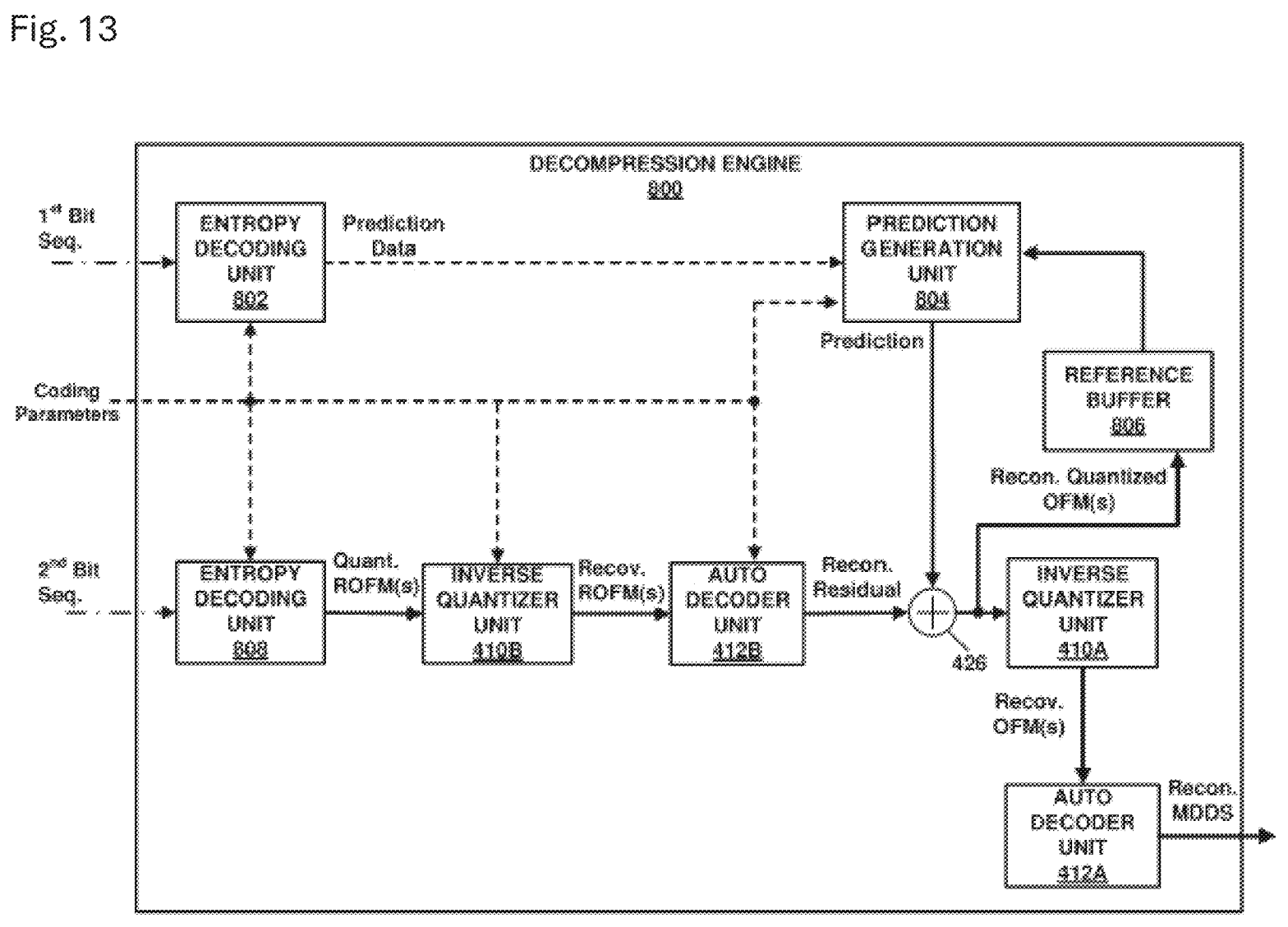

DECOMPRESSION ENGINE 800

ENTROPY DECODING UNIT 802

PREDICTION GENERATION UNIT 804

REFERENCE BUFFER 806

INVERSE QUANTIZER UNIT 410A

AUTO DECODER UNIT 412A

ENTROPY DECODING UNIT 808

INVERSE QUANTIZER UNIT 410B

AUTO DECODER UNIT 412B

Recon. MDDS

Recon. Quantized OFM(s)

Recov. OFM(s)

Prediction

426

Recon. Residual

Recov. ROFM(s)

Quant. ROFM(s)

Prediction Data

Coding Parameters

1st Bit Seq.

2nd Bit Seq.

[Fig. 33]
Concatenated Feature data
Pic₁(256 Channels)
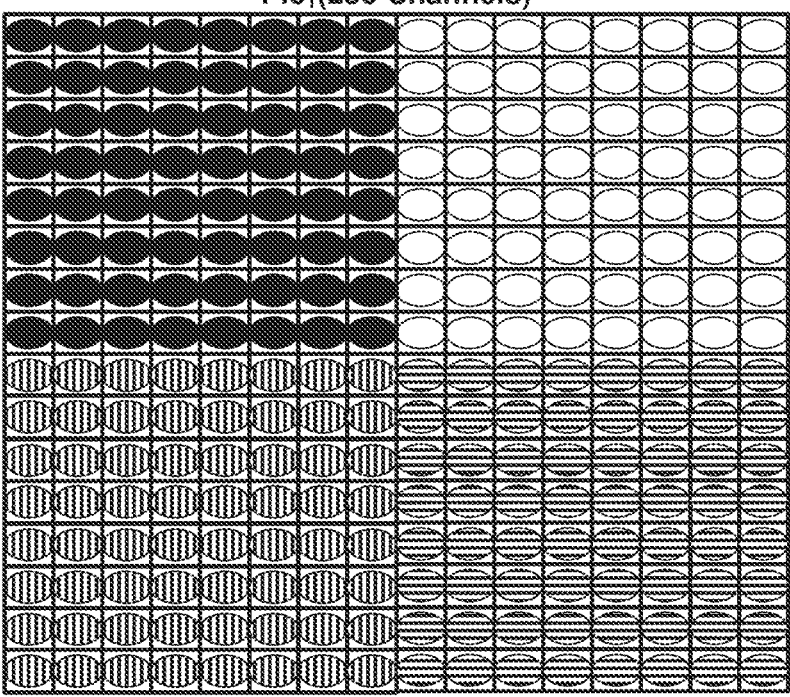
Picₙ(256 Channels)
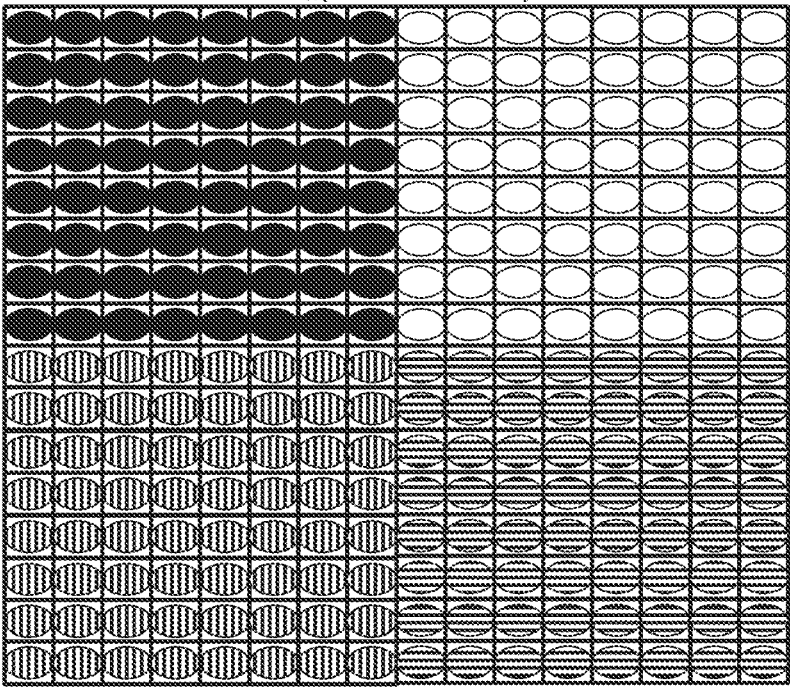

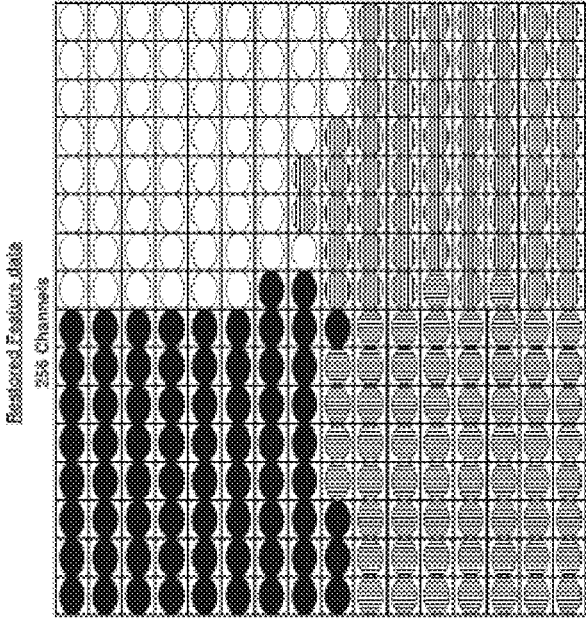
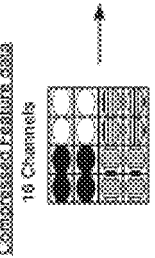
Fig. 34A

[Fig. 44]
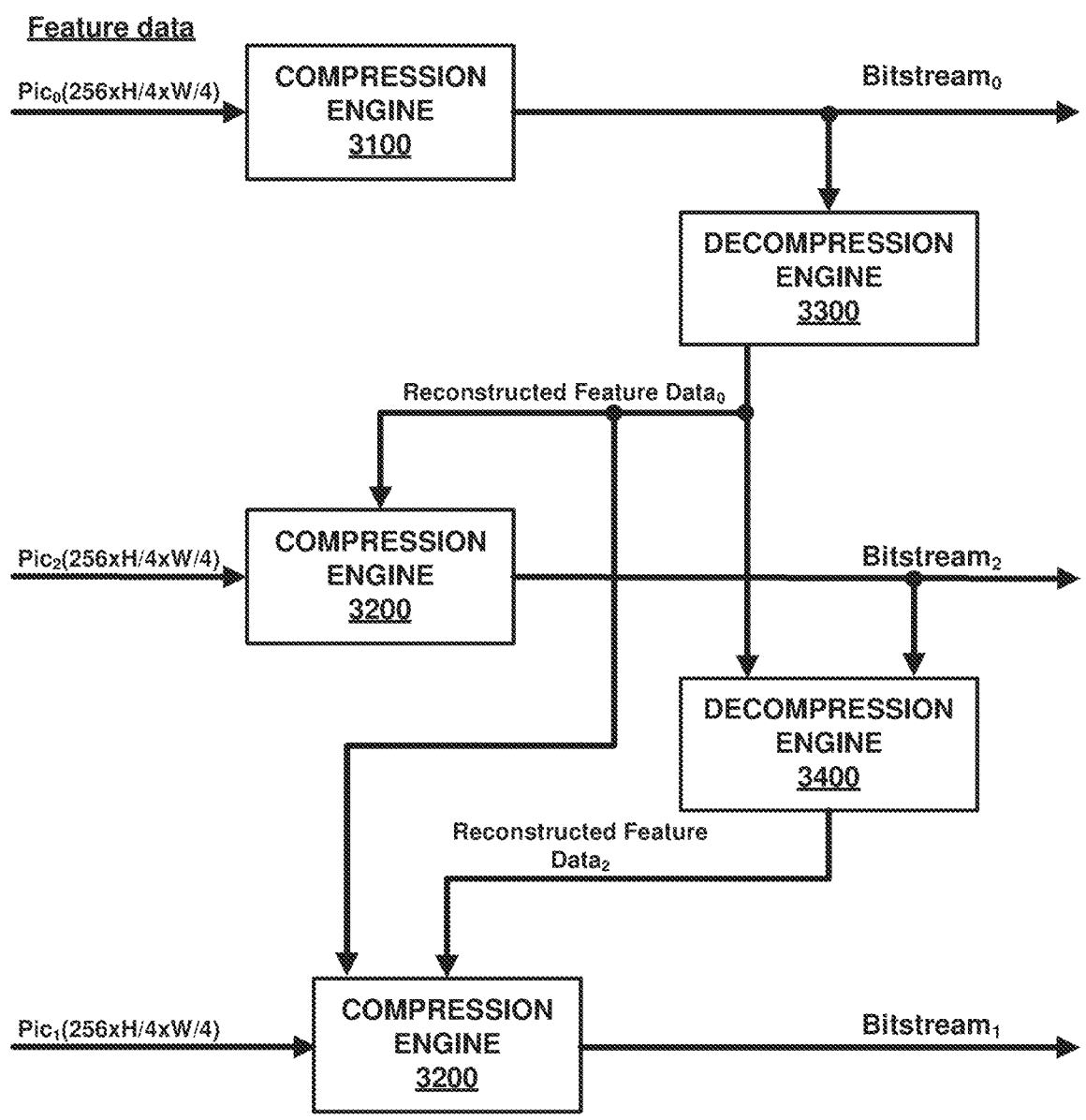

[Fig. 45]
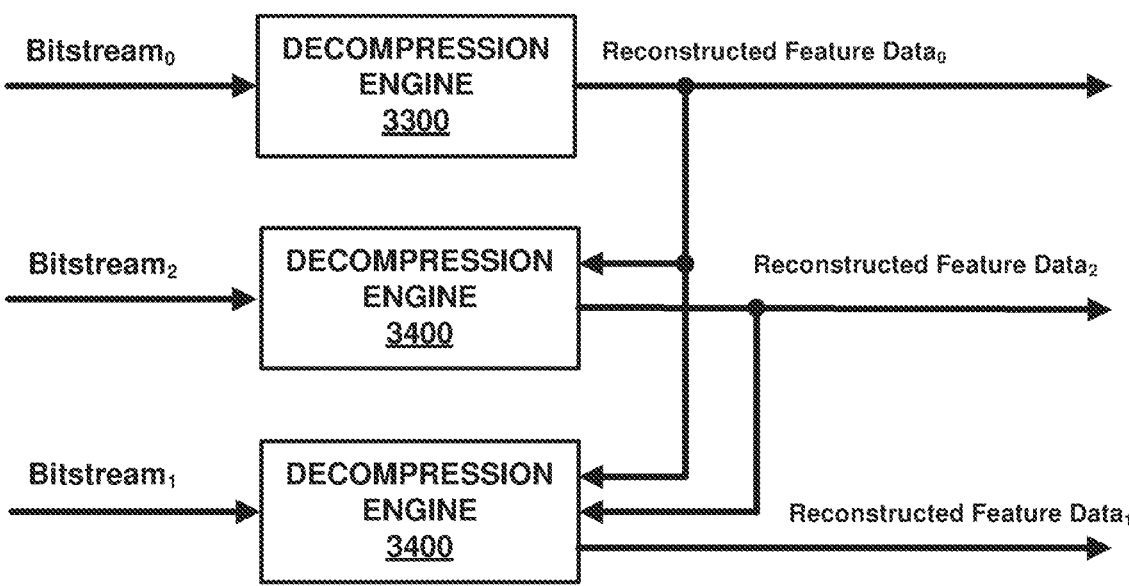

SYSTEMS AND METHODS FOR COMPRESSION OF FEATURE DATA USING JOINT CODING IN CODING OF MULTI-DIMENSIONAL DATA

TECHNICAL FIELD

This disclosure relates to coding multi-dimensional data and more particularly to techniques for compressing feature data.

BACKGROUND ART

Digital video and audio capabilities can be incorporated into a wide range of devices, including digital televisions, computers, digital recording devices, digital media players, video gaming devices, smartphones, medical imaging devices, surveillance systems, tracking and monitoring systems, and the like. Digital video and audio can be represented as a set of arrays. Data represented as a set of arrays may be referred to as multi-dimensional data. For example, a picture in digital video can be represented as a set of two-dimensional arrays of sample values. That is, for example, a video resolution provides a width and height dimension of an array of sample values and each component of a color space provides a number of two-dimensional arrays in the set. Further, the number of pictures in a sequence of digital video provides another dimension of data. For example, one second of 60 Hz video at 1080p resolution having three color components could correspond to four dimensions of data values, i.e., the number of samples may be represented as follows: 1920×1080×3×60. Thus, digital video and images are examples of multi-dimensional data. It should be noted that digital video may be represented using additional and/or alternative dimensions (e.g., number of layers, number of views/channels, etc.).

Digital video may be coded according to a video coding standard. Video coding standards define the format of a compliant bitstream encapsulating coded video data. A compliant bitstream is a data structure that may be received and decoded by a video decoding device to generate reconstructed video data. Typically, the reconstructed video data is intended for human-consumption (i.e., viewing on a display). Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. The ITU-T Video Coding Experts Group (VCEG) and ISO/IEC (Moving Picture Experts Group (MPEG) (collectively referred to as the Joint Video Exploration Team (JVET)) have worked to standardize video coding technology with a compression capability that exceeds that of HEVC. This standardization effort is referred to as the Versatile Video Coding (VVC) project. "Versatile Video Coding (Draft 10)," 20th Meeting of ISO/IEC JTC1/SC29/WG11 7-16 Oct. 2020, Teleconference, document JVET-T2001-v2, which is incorporated by reference herein, and referred to as VVC, represents the current iteration of the draft text of a video coding specification corresponding to the VVC project.

Video coding standards may utilize video compression techniques. Video compression techniques reduce data requirements for storing and/or transmitting video data by exploiting the inherent redundancies in a video sequence.

Video compression techniques typically sub-divide a video sequence into successively smaller portions (i.e., groups of pictures within a video sequence, a picture within a group of pictures, regions within a picture, sub-regions within a region, etc.) and utilize intra prediction coding techniques (e.g., spatial prediction techniques within a picture) and inter prediction techniques (i.e., inter-picture techniques (temporal)) to generate difference values between a unit of video data to be coded and a reference unit of video data. The difference values may be referred to as residual data. Syntax elements may relate residual data and a reference coding unit (e.g., intra-prediction mode indices and motion information). Residual data and syntax elements may be entropy coded. Entropy encoded residual data and syntax elements may be included in data structures forming a compliant bitstream.

SUMMARY OF INVENTION

In one example, a method of compressing feature data corresponding to video data, the method comprises for each of N pictures included in video data, generating feature data including a number of channels corresponding to a scale, such that the generated feature data includes a feature tensor including a channel dimension, a height dimension, and a width dimension, concatenating the generated feature data about the channel dimension, such that the concatenated feature data includes a feature tensor including a channel dimension, wherein the number of channels is given by N multiplied by the number of channels corresponding to the scale, a height dimension, and a width dimension, reducing the number of channels in the concatenated feature data to generate reduced concatenated feature data, and encoding the reduced concatenated feature data into a bitstream.

The details of one or more examples are set forth in the accompanying drawings and the description below. Other features, objects, and advantages will be apparent from the description and drawings, and from the claims.

BRIEF DESCRIPTION OF DRAWINGS

FIG. 2A is conceptual diagrams illustrating examples of coding a block of video data with typical video coding techniques which may be utilized in accordance with one or more techniques of this disclosure.

FIG. 2B is conceptual diagrams illustrating examples of coding a block of video data with typical video coding techniques which may be utilized in accordance with one or more techniques of this disclosure.

FIG. 8 is an example of a coding system that may encode a multi-dimensional data set in accordance with one or more techniques of this disclosure.

FIG. 13 is a block diagram illustrating an example of a decompression engine that may be configured to decode a multi-dimensional data set in accordance with one or more techniques of this disclosure.

FIG. 33 is a conceptual diagram illustrating an example of concatenating coded input data in accordance with one or more techniques of this disclosure.

FIG. 34A is conceptual diagrams illustrating an example of recovering input data from compressed feature data in accordance with one or more techniques of this disclosure.

FIG. 44 is an example of a coding system that may encode a multi-dimensional data set in accordance with one or more techniques of this disclosure.

FIG. 45 is an example of a coding system that may decode a multi-dimensional data set in accordance with one or more techniques of this disclosure.

DESCRIPTION OF EMBODIMENTS

Figure 1:
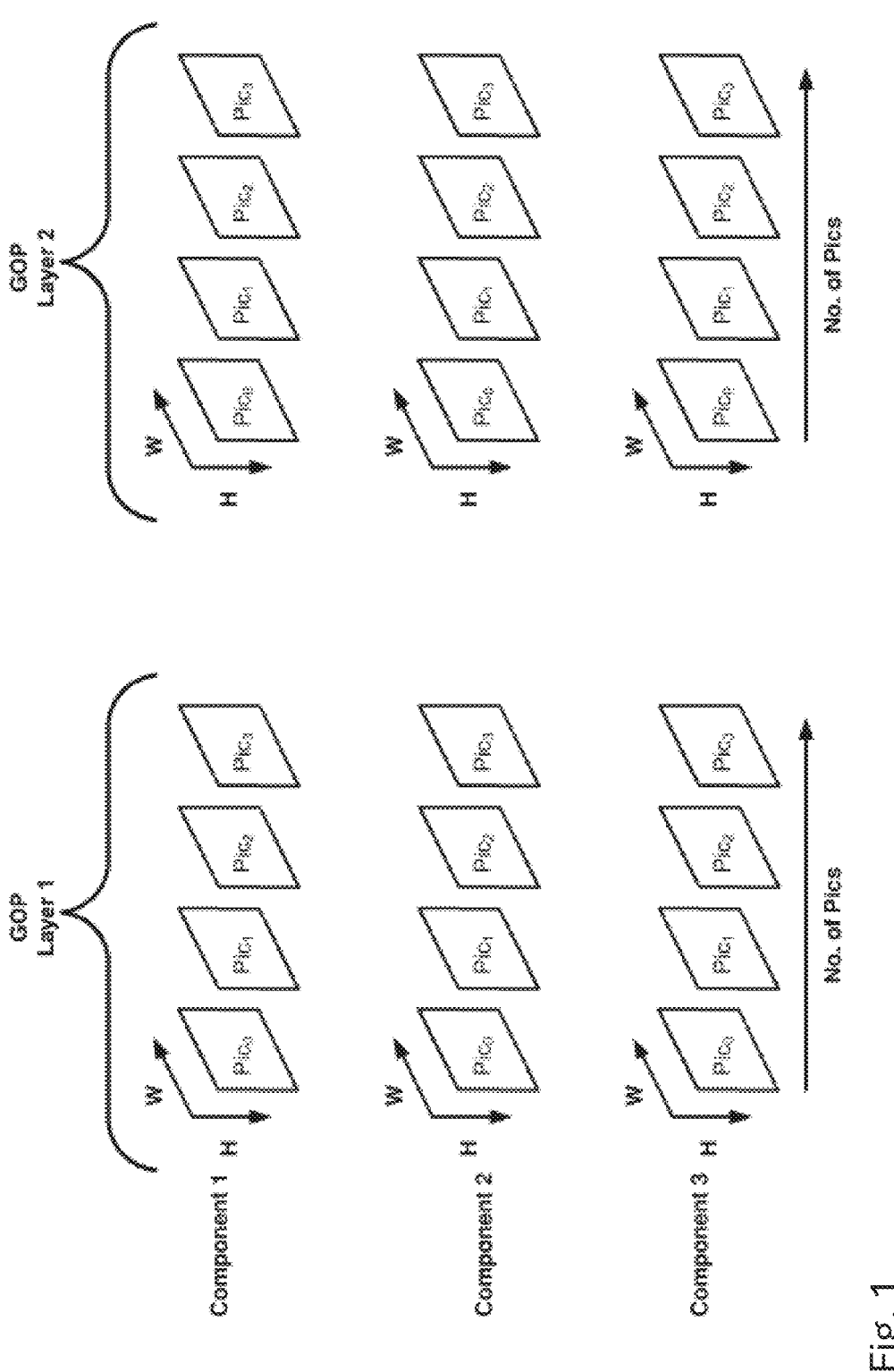
FIG. 1 is a conceptual diagram illustrating video data as a multi-dimensional data set (MDDS) in accordance with one more techniques of this disclosure.

In general, this disclosure describes various techniques for coding multi-dimensional data, which may be referred to as a multi-dimensional data set (MDDS) and may include, for example, video data, audio data, and the like. It should be noted that in addition to reducing the data requirements for providing multi-dimensional data for human consumption, the techniques for coding of multi-dimensional data described herein may be useful for other applications. For example, the techniques described herein may be useful for so-called machine consumption. That is, for example, in the case of surveillance, it may be useful for a monitoring application running on a central server to be able quickly identify and track an object from any of a number video feeds. In this case, it is not necessary that the coded video data is capable of being reconstructed to a human consumable form, but only capable of being able to enable an object to be identified. As described in further detail below, object detection, segmentation and/or tracking (i.e., object recognition tasks) typically involve receiving an image (e.g., a single image or an image included in a video sequence), generating feature data corresponding to the image, analyzing the feature data, and generating inference data, where inference data may indicate types of objects and spatial locations of objects within the image. Spatial locations of objects within an image may be specified by a bounding box having a spatial coordinate (e.g., x,y) and a size (e.g., a height and a width). This disclosure describes techniques for compressing and reconstructing feature data. In particular, this disclosure describes techniques for compressing feature data using joint coding. The techniques described in this disclosure may be particularly useful for allowing object recognition tasks to be distributed across a communication network and optimizing video encoding. For example, in some applications, an acquisition device (e.g., a video camera and accompanying hardware) may have power and/or computational constraints. In this case, generation of feature data could be optimized for the capabilities at the acquisition device, but, the analysis and inference may be better suited to be performed at one or more devices with additional capabilities distributed across a network. In this case, compression of the feature set may facilitate efficient distribution (e.g., reduced bandwidth and/or latency) of object recognition tasks. It should be noted, as described in further detail below, inference data (e.g., spatial locations of objects within an image) may be used to optimize encoding of video data, (e.g., adjust coding parameters to improve relative image quality in regions where objects of interest are present and the like). Further, a video encoding device that utilizes inference data may be located at a distinct location from acquisition device. For example, distributing network may include multiple distribution servers (at various physical locations) that perform compression and distribution of acquired video.

It should be noted that as used herein the term typical video coding standard or typical video coding may refer to a video coding standard utilizing one or more of the following video compression techniques: video partitioning techniques, intra prediction techniques, inter prediction techniques, residual transformation techniques, reconstructed video filtering techniques, and/or entropy coding techniques for residual data and syntax elements. For example, the term typical video coding standard may refer to any of ITU-T H.264, ITU-T H.265, VVC, and the like, individually or collectively. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

Video content includes video sequences comprised of a series of frames (or pictures). A series of frames may also be referred to as a group of pictures (GOP). For coding purposes, each video frame or picture may divided into one or more regions, which may be referred to as video blocks. As used herein, the term video block may generally refer to an area of a picture that may be coded (e.g., according to a prediction technique), sub-divisions thereof, and/or corresponding structures. Further, the term current video block may refer to an area of a picture presently being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components (RGB)). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

Digital video data including one or more video sequences is an example of multi-dimensional data. FIG. 1 is a conceptual diagram illustrating video data represented as multi-dimensional data. Referring to FIG. 1, the video data includes a respective group of pictures for two layers. For example, each layer may be a view (e.g., a left and a right view) or a temporal layer of video. As illustrated in FIG. 1, each layer includes three components of video data (e.g., RGB, BGR, YCbCr, etc.) and each component includes four pictures having width (W)×height (H) sample values (e.g., 1920×1080, 1280×720, etc.). Thus, in the example illustrated in FIG. 1, there are 24 W×H arrays of sample values and each array of sample values may be described as a two-dimensional data. Further, the arrays may be grouped into sets according to one or more other dimensions (e.g., channels, components, and/or a temporal sequence of frames). For example, component 1 of the GOP of layer 1 may be described as a three-dimensional data set (i.e., W×H×Number of pictures), all of the components the GOP of layer 1 may be described as a four-dimensional data set (i.e., W×H×Number of pictures×Number of components), and all of the components of the GOP of layer 1 and the GOP of layer 2 may described as a five-dimensional data set (i.e., W×H×Number of pictures×Number of components×Number of layers).

Multi-layer video coding enables a video presentation to be decoded/displayed as a presentation corresponding to a base layer of video data and decoded/displayed as one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. A sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream.

A video encoder operating according to a typical video coding standard may perform predictive encoding on video blocks and sub-divisions thereof. For example, pictures may be segmented into video blocks which are the largest array of video data that may be predictively encoded and the largest arrays of video data may be further partitioned into nodes. For example, in ITU-T H.265, coding tree units (CTUs) are partitioned into coding units (CUs) according to a quadtree (QT) partitioning structure. A node may be associated with a prediction unit data structure and a residual unit data structure having their roots at the node. A prediction unit data structure may include intra prediction data (e.g., intra prediction mode syntax elements) or inter prediction data (e.g., motion data syntax elements) that may be used to produce reference and/or predicted sample values for the node. For intra prediction coding, a defined intra prediction mode may specify the location of reference samples within a picture. For inter prediction coding, a reference picture may be determined and a motion vector (MV) may identify samples in the reference picture that are used to generate a prediction for a current video block. For example, a current video block may be predicted using reference sample values located in one or more previously coded picture(s) and a motion vector may be used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (i.e., e.g., pixel precision). Previously decoded pictures may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture is used to generate a prediction for a current video block and in bi-prediction, a first reference picture and a second reference picture may be used to generate a prediction for a current video block. In bi-prediction, respective sample values may be combined (e.g., added, rounded, and clipped, or averaged according to weights) to generate a prediction. Further, a typical video coding standard may support various modes of motion vector prediction. Motion vector prediction enables the value of a motion vector for a current video block to be derived based on another motion vector. For example, a set of candidate blocks having associated motion information may be derived from spatial neighboring blocks to the current video block and a motion vector for the current video block may be derived from a motion vector associated with one of the candidate blocks.

As described above, intra prediction data or inter prediction data may be used to produce reference sample values for a current block of sample values. The difference between sample values included in a current block and associated reference samples may be referred to as residual data. Residual data may include respective arrays of difference values corresponding to each component of video data. Residual data may initially be calculated in the pixel domain. That is, from subtracting sample amplitude values for a component of video data. A transform, such as, a discrete cosine transform (DCT), a discrete sine transform (DST), an integer transform, a wavelet transform, or a conceptually similar transform, may be applied to an array of sample difference values to generate transform coefficients. It should be noted that in some cases, a core transform and a subsequent secondary transforms may be applied to generate transform coefficients. A quantization process may be performed on transform coefficients or residual sample values directly (e.g., in the case, of palette coding quantization). Quantization approximates transform coefficients (or residual sample values) by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding and/or offset addition operations. It should be noted that as used herein the term quantization process in some instances may refer to generating level values (or the like) in some instances and recovering transform coefficients (or the like) in some instances. That is, a quantization process may refer to quantization in some cases and inverse quantization (which also may be referred to as dequantization) in some cases. Further, it should be noted that although in some of the examples quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a prediction for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, as implemented in ITU-T H.265 may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein, each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context may provide a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in a current syntax element and previously coded syntax elements.

FIGS. 2A-2B are conceptual diagrams illustrating examples of coding a block of video data. As illustrated in FIG. 2A, a current block of video data (e.g., an area of a picture corresponding to a video component) is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In particular, FIG. 2B illustrates a reconstruction error which is the difference between the current block and the reconstructed block. In this manner, coding may be said to be lossy. However, the difference in sample values may be considered minimally perceptible to a viewer of the reconstructed video. That is, the reconstructed video may be said to be fit for human-consumption. However, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize a reconstruction error and/or minimize perceivable artifacts introduced by a video coding process. Such modifications may generally be referred to as filtering. It should be noted that filtering may occur as part of an in-loop filtering process or a post-loop filtering process. For an in-loop filtering process, the resulting sample values of a filtering process may be used for further reference and for a post-loop filtering process the resulting sample values of a filtering process are merely output as part of the decoding process (e.g., not used for subsequent coding).

Typical video coding standards may utilize so-called deblocking (or de-blocking), which refers to a process of smoothing the boundaries of neighboring reconstructed video blocks (i.e., making boundaries less perceptible to a viewer) as part of an in-loop filtering process. In addition to applying a deblocking filter as part of an in-loop filtering process, a typical video coding standard may utilized Sample Adaptive Offset (SAO), where SAO is a process that modifies the deblocked sample values in a region by conditionally adding an offset value. Further, a typical video coding standard may utilized one or more additional filtering techniques. For example, in VVC, a so-called adaptive loop filter (ALF) may be applied.

As described above, for coding purposes, each video frame or picture may divided into one or more regions, which may be referred to as video blocks. It should be noted that in some cases, other overlapping and/or independent regions may be defined. For example, according to typical video coding standards, each video picture may be partitioned to include one or more slices and further partitioned to include one or more tiles. With respect to VVC, slices are required to consist of an integer number of complete tiles or an integer number of consecutive complete CTU rows within a tile, instead of only being required to consist of an integer number of CTUs. Thus, in VVC, a picture may include a single tile, where the single tile is contained within a single slice or a picture may include multiple tiles where the multiple tiles (or CTU rows thereof) may be contained within one or more slices. Further, it should be noted that VVC provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, a bitstream of coded video data may include a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 3:
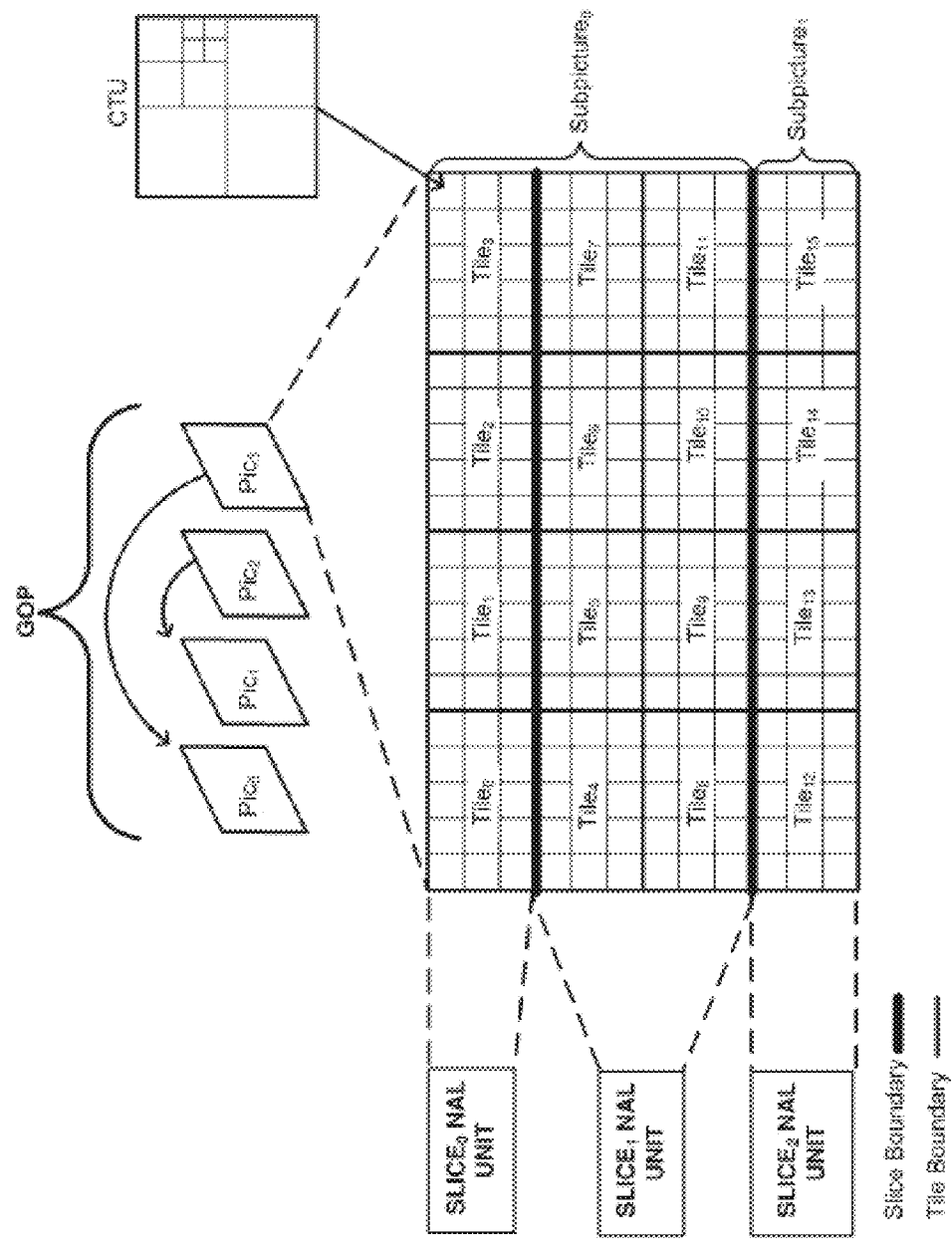
FIG. 3 is a conceptual diagram illustrating coded video data and corresponding data structures associated with typical video coding techniques which may be utilized in accordance with one or more techniques of this disclosure.

FIG. 3 is a conceptual diagram illustrating an example of a picture within a group of pictures partitioned according to tiles, slices, and subpictures and the corresponding coded video data encapsulated into NAL units. It should be noted that the techniques described herein may be applicable to tiles, slices, subpictures, sub-divisions thereof and/or equivalent structures thereto. That is, the techniques described herein may be generally applicable regardless of how a picture is partitioned into regions. In the example illustrated in FIG. 3, $Pic_3$ is illustrated as including 16 tiles (i.e., $Tile_0$ to $Tile_{15}$) and three slices (i.e., $Slice_0$ to $Slice_2$). In the example illustrated in FIG. 3, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 3, $Pic_3$ includes two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and $Slice_0$ NAL unit and $Slice_1$ NAL unit may be decoded and displayed.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. According to a typical video coding standard, when a picture is decoded it may be stored to a decoded picture buffer (DPB) (which may be referred to as frame buffer, a reference buffer, a reference picture buffer, or the like). For example, referring to FIG. 3, $Pic_2$ is illustrated as referencing $Pic_1$. Similarly, $Pic_3$ is illustrated as referencing $Pic_0$. With respect to FIG. 3, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0, Pic_1\}$; at the onset of decoding $Pic_2$, the DPB would include $\{Pic_0, Pic_1\}$. $Pic_2$ would then be decoded with reference to $Pic_1$ and after decoding $Pic_2$, the DPB would include $\{Pic_0, Pic_1, Pic_2\}$. At the onset of decoding $Pic_3$, pictures $Pic_0$ and $Pic_1$ would be marked for removal from the DPB, as they are not needed for decoding $Pic_3$ (or any subsequent pictures, not shown) and assuming $Pic_1$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

Figure 4:
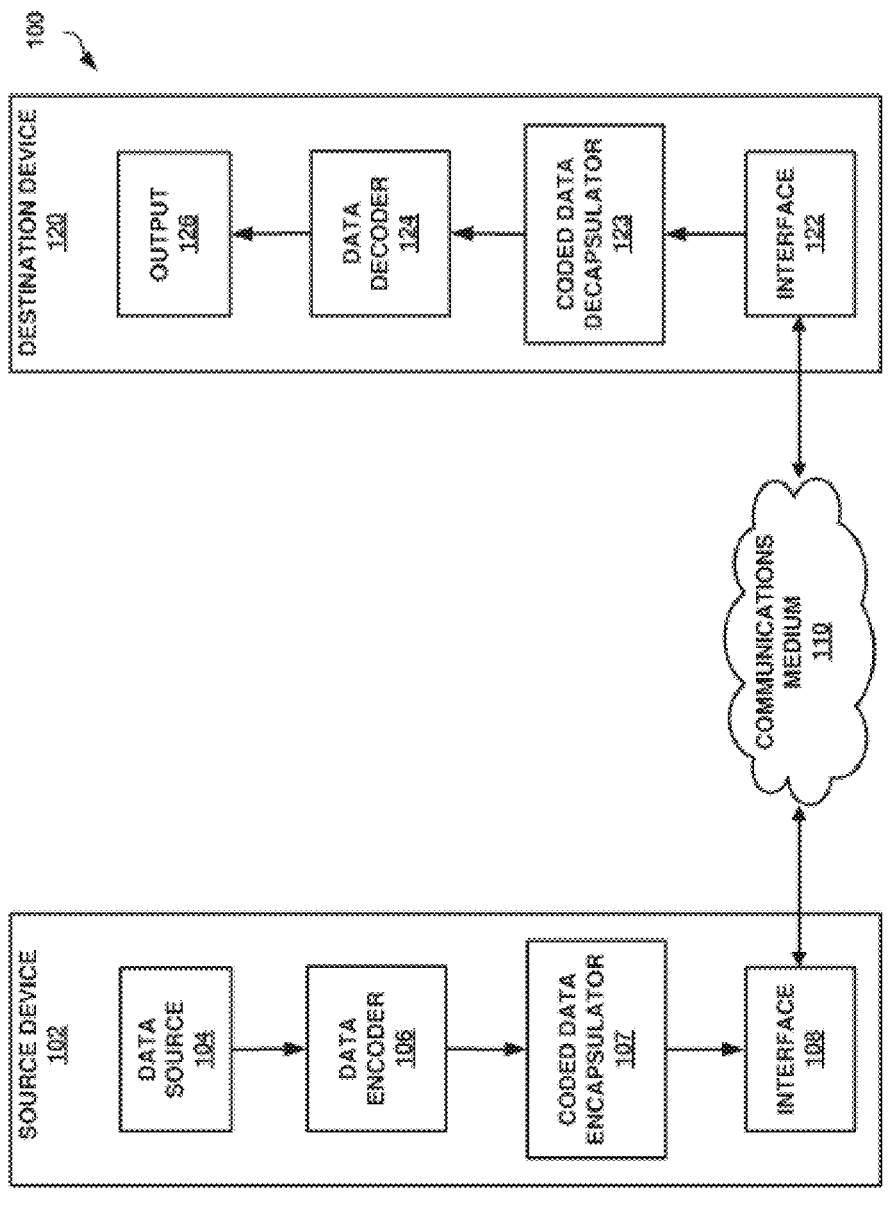
FIG. 4 is a block diagram illustrating an example of a system that may be configured to encode and decode multi-dimensional data according to one or more techniques of this disclosure.

FIG. 4 is a block diagram illustrating an example of a system that may be configured to code (i.e., encode and/or decode) a multi-dimensional data set (MDDS) according to one or more techniques of this disclosure. It should be noted that in some cases an MDDS may be referred to as a tensor. System 100 represents an example of a system that may encapsulate coded data according to one or more techniques of this disclosure. As illustrated in FIG. 4, system 100 includes source device 102, communications medium 110, and destination device 120. In the example illustrated in FIG. 4, source device 102 may include any device configured to encode multi-dimensional data and transmit encoded data to communications medium 110. Destination device 120 may include any device configured to receive encoded data via communications medium 110 and to decode encoded data. Source device 102 and/or destination device 120 may include computing devices equipped for wired and/or wireless communications and may include, for example, set top boxes, digital video recorders, televisions, computers, gaming consoles, medical imaging devices, and mobile devices, including, for example, smartphones.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 4, source device 102 includes data source 104, data encoder 106, coded data encapsulator 107, and interface 108. Data source 104 may include any device configured to capture and/or store multi-dimensional data. For example, data source 104 may include a video camera and a storage device operably coupled thereto. Data encoder 106 may include any device configured to receive multi-dimensional data and generate a bitstream representing the data. A bitstream may refer to a general bitstream (i.e., binary values representing coded data) or a compliant bitstream where aspects of a compliant bitstream may be defined according to a standard, e.g., a video coding standard. Coded data encapsulator 107 may receive a bitstream and encapsulate the bitstream for purposes of storage and/or transmission. For example, coded data encapsulator 107 may encapsulate bitstream according to a file format. It should be noted that coded data encapsulator 107 need not necessarily be located in the same physical device as data encoder 106. For example, functions described as being performed by data source 104, data encoder 106 and/or coded data encapsulator 107 may be distributed among devices in a computing system (e.g., at distinct server locations, etc.). Interface 108 may include any device configured to receive data generated by coded data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 4, destination device 120 includes interface 122, coded data decapsulator 123, data decoder 124, and output 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Coded data decapsulator 123 may be configured to receive and extract a bitstream from an encapsulated format. For example, in the case of video coded according to a typical video coding standard stored on physical medium according to a defined file format, coded data decapsulator 123 may be configured to extract a compliant bitstream from the file. Data decoder 124 may include any device configured to receive a bitstream and/or acceptable variations thereof and reproduce multi-dimensional data therefrom. Reproduced multi-dimensional data may then be received by output 126. For example, in the case of video, output 126 may include a display device configured to display video data. Further, it should be noted that data decoder 124 may be configured to output multi-dimensional data to various types of devices and/or sub-components thereof. For example, data decoder 124 may be configured to output data to any communication medium. Further, as described above, the techniques described in this disclosure may be particularly useful for allowing object recognition tasks to be distributed across a communications network. Thus, in some examples, source device 102 may represent an acquisition device where data source 104 acquires video data and generates corresponding feature data, data encoder 106 compresses feature data e.g., according to one or more techniques described herein, and destination device 120 is a device that performs analysis and inference on the reconstructed feature data. It should be noted, for example, with respect to the example described above, data encoder 106 and data decoder 124 may be configured to code multiple types of data. For example, in the case of video data, data encoder 106 may receive source video and corresponding feature data and generate a compliant bitstream according to a video coding standard and generate a bitstream including compressed feature data, e.g., according to the techniques described herein. In this case, in one example, destination device 120 may be a headend type of device that reconstructs video (e.g., a high quality representation) and the feature data from a received bitstreams and encodes the reconstructed video based on the feature data, e.g., at output 126, for further distribution (e.g., to nodes in a media distribution system).

Figure 5:
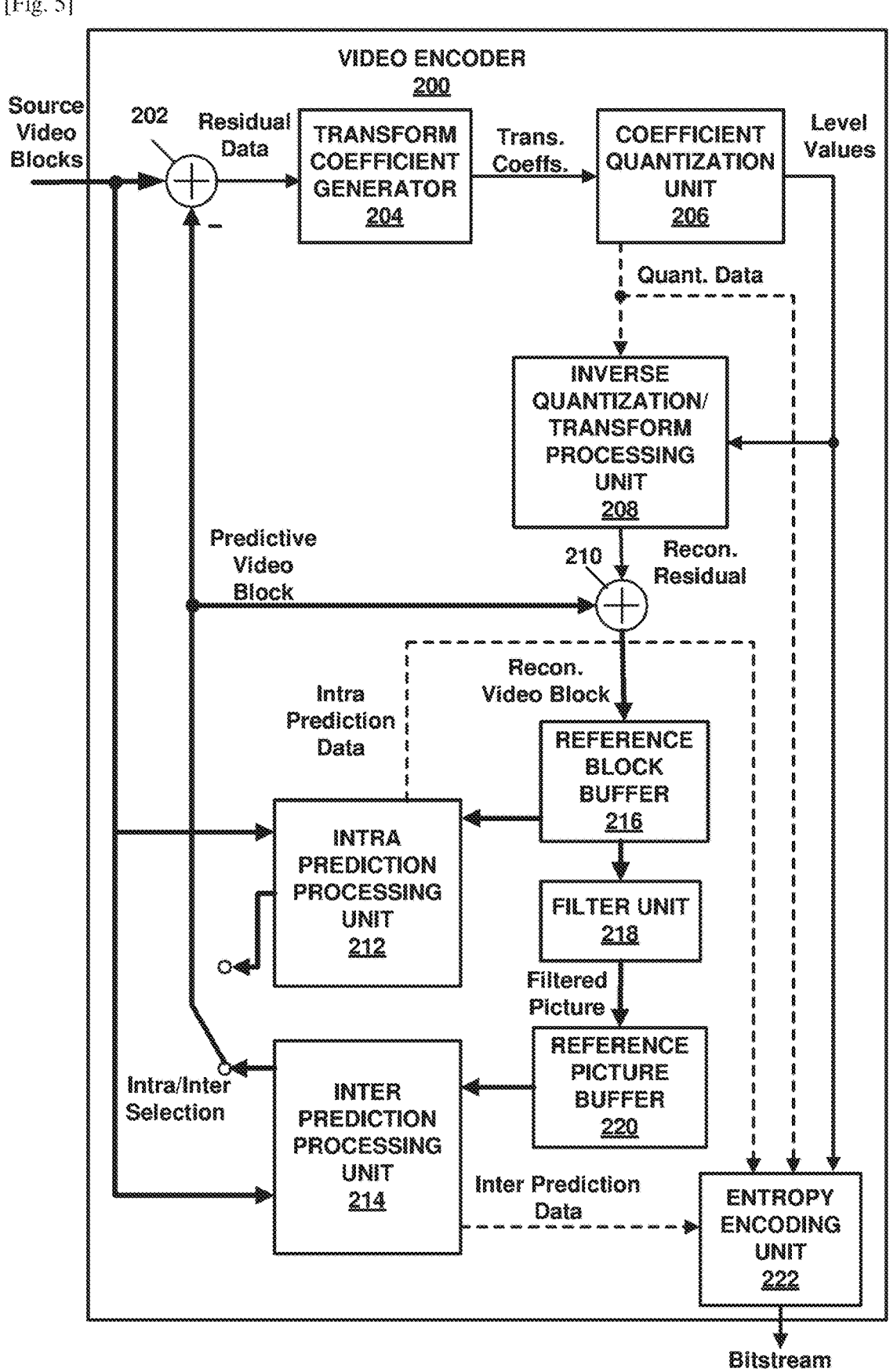
FIG. 5 is a block diagram illustrating an example of a video encoder that may be configured to encode video data in accordance with typical video encoding techniques which may be utilized with one or more techniques of this disclosure.

As described above, data encoder 106 may include any device configured to receive multi-dimensional data and an example of multi-dimensional data includes video data which may be coded according to a typical video coding standard. As described in further detail below, in some example, techniques for coding multi-dimensional data described herein may be utilized in conjunction with techniques utilized in typical video standards. FIG. 5 is a block diagram illustrating an example of a video encoder that may be configured to encode video data in accordance with typical video encoding techniques. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. Video encoder 200 may perform intra prediction coding and inter prediction coding of picture areas, and, as such, may be referred to as a hybrid video encoder. In the example illustrated in FIG. 5, video encoder 200 receives source video blocks. In some examples, source video blocks may include areas of picture that has been divided according to a coding structure. For example, source video data may include CTUs, sub-divisions thereof, and/or another equivalent coding unit. In some examples, video encoder 200 may be configured to perform additional subdivisions of source video blocks. It should be noted that the techniques described herein are generally applicable to video coding, regardless of how source video data is partitioned prior to and/or during encoding. In the example illustrated in FIG. 5, video encoder 200 includes summer 202, transform coefficient generator 204, coefficient quantization unit 206, inverse quantization and transform coefficient processing unit 208, summer 210, intra prediction processing unit 212, inter prediction processing unit 214, reference block buffer 216, filter unit 218, reference picture buffer 220, and entropy encoding unit 222. As illustrated in FIG. 5, video encoder 200 receives source video blocks and outputs a bitstream.

In the example illustrated in FIG. 5, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a DCT or a conceptually similar transform, to the residual block or sub-divisions thereof (e.g., four 8×8 transforms may be applied to a 16×16 array of residual values) to produce a set of transform coefficients. Transform coefficient generator 204 may be configured to perform any and all combinations of the transforms included in the family of discrete trigonometric transforms, including approximations thereof. Transform coefficient generator 204 may output transform coefficients to coefficient quantization unit 206. Coefficient quantization unit 206 may be configured to perform quantization on the transform coefficients. The quantization process may reduce the bit depth associated with some or all of the coefficients. The degree of quantization may alter the rate-distortion (i.e., bit-rate vs. quality of video) of encoded video data. In a typical video coding standard, the degree of quantization may be modified by adjusting a quantization parameter (QP) and a quantization parameter may be determined based on signaled and/or predicted values. Quantization data may include any data used to determine a QP for quantizing a particular set of transform coefficients. As illustrated in FIG. 5, quantized transform coefficients (which may be referred to as level values) are output to inverse quantization and transform coefficient processing unit 208. Inverse quantization and transform coefficient processing unit 208 may be configured to apply an inverse quantization and an inverse transformation to generate reconstructed residual data. As illustrated in FIG. 5, at summer 210, reconstructed residual data may be added to a predictive video block. Reconstructed video blocks may be stored to reference block buffer 216 and used as reference for predicting subsequent blocks (e.g., using intra prediction).

Referring again to FIG. 5, intra prediction processing unit 212 may be configured to select an intra prediction mode for a video block to be coded. Intra prediction processing unit 212 may be configured to evaluate reconstructed blocks stored to reference block buffer 216 and determine an intra prediction mode to use to encode a current block. In a typical video coding standard, possible intra prediction modes may include planar prediction modes, DC prediction modes, and angular prediction modes. As illustrated in FIG. 5, intra prediction processing unit 212 outputs intra prediction data (e.g., syntax elements) to entropy encoding unit 222.

Referring again to FIG. 5, inter prediction processing unit 214 may be configured to perform inter prediction coding for a current video block. Inter prediction processing unit 214 may be configured to receive source video blocks, select a reference picture from pictures stored to the reference buffer 220, and calculate a motion vector for a video block. A motion vector may indicate the displacement of a prediction unit of a video block within a current video picture relative to a predictive block within a reference picture. Inter prediction coding may use one or more reference pictures. Inter prediction processing unit 214 may be configured to select predictive block(s) by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within reference picture buffer 220. It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 222.

Referring again to FIG. 5, filter unit 218 receives reconstructed video blocks from reference block buffer 216 and outputs a filtered picture to reference picture buffer 220. That is, in the example of FIG. 5, filter unit 218 is part of an in-loop filtering process. Filter unit 218 may be configured to perform one or more of deblocking, SAO filtering, and/or ALF filtering, for example, according to a typical video coding standard. Entropy encoding unit 222 receives data representing level values (i.e., quantized transform coefficients) and predictive syntax data (i.e., intra prediction data and motion prediction data). It should be noted that data representing level values may include for example, flags, absolute values, sign values, delta values, and the like. For example, significant coefficient flags and the like as provided in a typical video coding standard. Entropy encoding unit 518 may be configured to perform entropy encoding according to one or more of the techniques described herein and output a bitstream, for example, a compliant bitstream according to a typical video coding standard.

Figure 6:
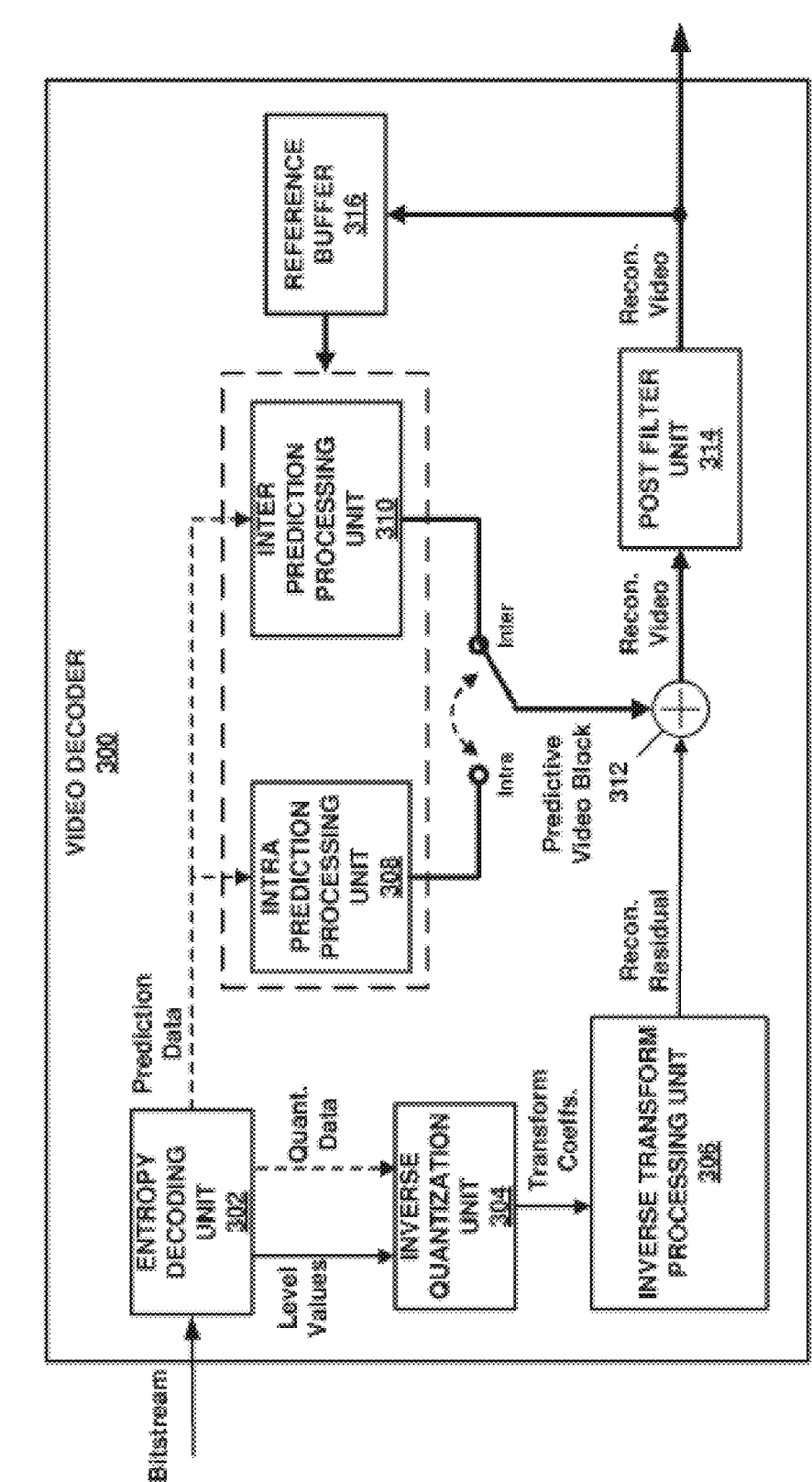
FIG. 6 is a block diagram illustrating an example of a video decoder that may be configured to decode video data in accordance with typical video decoding techniques which may be utilized with one or more techniques of this disclosure.

Referring again to FIG. 4, as described above, data decoder 124 may include any device configured to receive coded multi-dimensional data and an example of coded multi-dimensional data includes video data which may be coded according to a typical video coding standard. FIG. 6 is a block diagram illustrating an example of a video decoder that may be configured to decode video data in accordance with typical video decoding techniques which may be utilized with one or more techniques of this disclosure. In the example illustrated in FIG. 6, video decoder 300 includes an entropy decoding unit 302, inverse quantization unit 304, inverse transform coefficient processing unit 306, intra prediction processing unit 308, inter prediction processing unit 310, summer 312, post filter unit 314, and reference buffer 316. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 6, entropy decoding unit 302 receives an entropy encoded bitstream. Entropy decoding unit 302 may be configured to decode syntax elements and level values from the bitstream according to a process reciprocal to an entropy encoding process. Entropy decoding unit 302 may be configured to perform entropy decoding according any of the entropy coding techniques described above and/or determine values for syntax elements in an encoded bitstream in a manner consistent with a video coding standard. As illustrated in FIG. 6, entropy decoding unit 302 may determine level values, quantization data, and prediction data from a bitstream. In the example, illustrated in FIG. 6, inverse quantization unit 304 receives quantization data and level values and outputs transform coefficients to inverse transform coefficient processing unit 306. Inverse transform coefficient processing unit 306 outputs reconstructed residual data. Thus, inverse quantization unit 304 and inverse transform coefficient processing unit 306 operate in a similar manner to inverse quantization and transform coefficient processing unit 208 described above.

Referring again to FIG. 6, reconstructed residual data is provided to summer 312. Summer 312 may add reconstructed residual data to a predictive video block and generate reconstructed video data. A predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more pictures (and corresponding regions) of video data. Intra prediction syntax elements may identify an intra prediction mode, such as the intra prediction modes described above. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Post filter unit 314 may be configured to perform filtering on reconstructed video data. For example, post filter unit 314 may be configured to perform deblocking based on parameters specified in a bitstream. Further, it should be noted that in some examples, post filter unit 314 may be configured to perform proprietary discretionary filtering (e.g., visual enhancements, such as, mosquito noise reduction). As illustrated in FIG. 6, a reconstructed video may be output by video decoder 300, for example, to a display.

As described above with respect to FIGS. 2A-2B, a block of video data, i.e., an array of data included within a MDDS, may be encoded by generating a residual, performing a transformation on the residual, and quantizing the transform coefficients to generate level values and decoded by performing inverse quantization on level values, performing an inverse transform, and adding the resulting residual to a prediction. An array of data included within a MDDS may also be coded using so-called autoencoding techniques. Generally, autoencoding may refer to a learning technique that imposes a bottleneck into a network to force a compressed representation of an input. That is, an autoencoder may be referred to as a non-linear Primary Component Analysis (PCA) that tries to represent input data in a lower dimensional space. An example of an autoencoder includes a convolution autoencoder that compresses an input using a single convolution operation. Convolution autoencoders may be utilized in so-called deep convolutional neural networks (CNNs).

Figure 7:
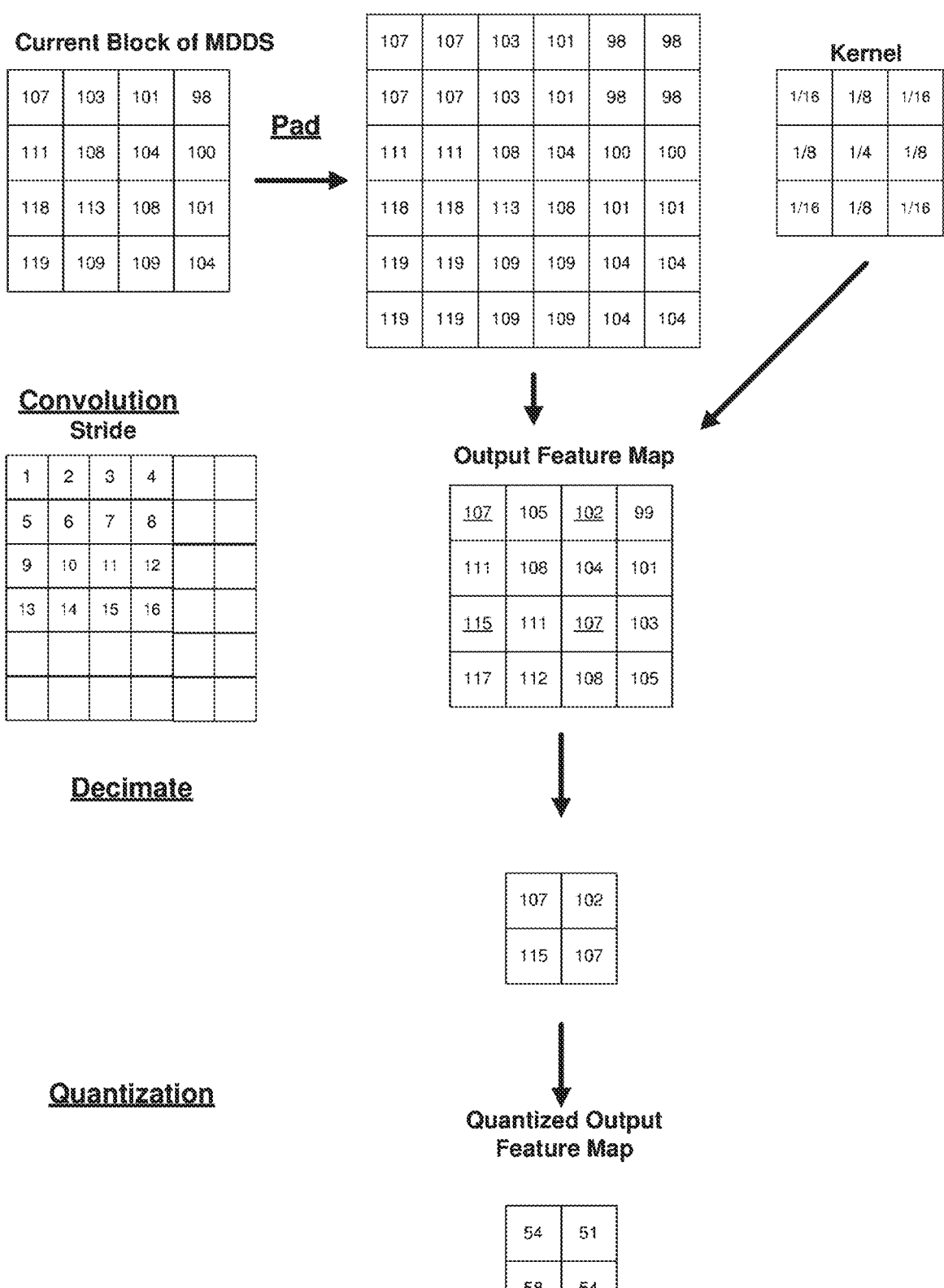
FIG. 7A is conceptual diagrams illustrating examples of coding a block of video data in accordance with autoencoding techniques which may be utilized with one or more techniques of this disclosure.
FIG. 7B is conceptual diagrams illustrating examples of coding a block of video data in accordance with autoencoding techniques which may be utilized with one or more techniques of this disclosure.

FIG. 7A illustrates an example of autoencoding using a two-dimensional discrete convolution. In the example illustrated in FIG. 7A, a discrete convolution is performed on a current block of video data (i.e., the block of video data illustrated in FIG. 2A) to generate an output feature map (OFM), where the discrete convolution is defined according to a padding operation, a kernel, and a stride function. It should be noted that although FIG. 7A illustrates a discrete convolution on a two-dimensional input using a two-dimensional kernel, discrete convolution may be performed on higher dimensional data sets. For example, discrete convolution may be performed on a three-dimensional input using a three-dimensional kernel (e.g., a cubic kernel). In the case of video data, such a convolution may down-sample video in both the spatial and temporal dimensions. Further, it should be noted that although the example illustrated in FIG. 7A illustrates where a square kernel is convolved over a square input, in other examples, the kernel and/or the input may be non-square rectangles. In the example illustrated in FIG. 7A, the 4×4 array of video data is upscaled to a 6×6 array by duplicating the nearest value at the boundary. This is an example of a padding operation. In general, a padding operation increases the size of an input data set by inserting values. In a typical case, zero values may be inserted into an array in order to achieve a particular sized array prior to convolution. It should be noted that padding functions may include one or more of inserting zero's (or another default value) at particular locations, symmetric extension, replicate extension, circular extension at various positions of a data set. For example, for symmetric extension input array values outside the bounds of the array may be computed by mirror-reflecting the array across the array border along the dimension being padded. For replicate extension input array values outside the bounds of the array may be assumed to equal the nearest array border value along the dimension being padded. For circular extension, input array values outside the bounds of the array may be computed by implicitly assuming the input array is periodic along the dimension being padded.

Referring again to FIG. 7A, an output feature map is generated by convolving a 3×3 kernel over the 6×6 array according to a stride function. That is, the stride illustrated in FIG. 7A illustrates the top-left position of the kernel at a corresponding position in the 6×6 array. That is, for example, at stride position 1, the top-left of the kernel is aligned with the top-left of the 6×6 array. At each discrete position of the stride, the kernel is used to generate a weighted sum. Generated weighted sum values are then used to populate a corresponding position in an output feature map. For example, at position 1 of the stride function, the output of 107 ($107=\frac{1}{16}*107+\frac{1}{8}*107+\frac{1}{16}*103+\frac{1}{8}*107+\frac{1}{4}*107+\frac{1}{8}*103+\frac{1}{16}*111+\frac{1}{8}*111+\frac{1}{16}*108$) corresponds to the top-left position of the output feature map. It should be noted that in the example illustrated in FIG. 7A, the stride function corresponds to a so-called unit stride, i.e., the kernel slides across every position of the input. In other examples, non-unit or arbitrary strides may be used. For example, a stride function may include only the positions 1, 4, 13, and 16 in the stride illustrated in FIG. 7A to generate a 2×2 output feature map. In this manner, in the case of two-dimensional discrete convolution, for an input data having a width, $w_i$, and height, $h_i$, an arbitrary padding function, an arbitrary stride function, and a kernel having a width, $w_k$, and height, $h_k$, may be used to create an output feature map having a desired width, $w_o$, and height, $h_o$. It should be noted, that similar to a kernel, a stride function may be defined for multiple dimensions (e.g., a three-dimensional stride function may be defined). It should be noted that in some cases, for particular kernel size and stride function, the kernel may lie outside of the support region. In some cases, the output at such a position is not valid. In some cases, a corresponding value is derived for the out-of-bound support position, e.g., according to a padding operation.

It should be noted that in the example illustrated in FIG. 7A, the 4×4 array of video data is illustrated as being down-sampled to a 2×2 output feature map by selecting the underlined values of the 4×4 output feature map. The 4×4 output feature map is shown for illustration purposes. That is, to illustrate a typical unit stride function. In a typical case, computations would not be made for discarded values. In a typical case, as described above, the 2×2 output feature map could/would be derived by performing the weighted sum operation with the kernel at positions 1, 4, 13, and 16. However, it should be noted that in other examples, so-called pooling operations, such as finding a maximum pooling, may be performed on an input (prior to performing the convolution) or an output feature map to down-sample a data set. For example, in the example illustrated in FIG. 7A, the 2×2 output feature map may be generated by taking a local maximum of each 2×2 region in the 4×4 output feature map (i.e., 108, 104, 117, and 108). That is, there may be numerous ways to perform autoencoding that includes performing convolutions on input data in order to represent the data as a down-sampled output feature map.

Finally, as indicated in FIG. 7A, an output feature map may be quantized in a manner similar to that described above with respect to transform coefficients (e.g., amplitudes restricted to a set of specified values). In the example illustrated in FIG. 7A, the amplitudes of the 2×2 output feature map are quantized by division by 2. In this case, quantization may be described as a uniform quantization defined by:

$$QOFM(x, y) = \text{round}\big(OFM(x, y)/\text{Stepsize}\big)$$

Where,
$QOFM(x,y)$ is a quantized value corresponding position $(x, y)$;
$OFM(x,y)$ is a value corresponding position $(x, y)$;
Stepsize is a scalar; and
round(x) rounds x to the nearest integer.
Thus, for the example illustrated in FIG. 7A, Stepsize=2 and x=0 . . . 1, y=0 . . . 1. In this example, at an autodecoder, the inverse quantization for deriving the recovered output feature map, $ROFM(x,y)$ may be defined as follows:

$$ROFM(x, y) = QOFM(x, y) * \text{Stepsize}$$

It should be noted that in one example, a respective Stepsize may be provided for each position, i.e., $\text{Stepsize}_{(x,y)}$. It should be noted that this may be referred to a uniform quantization, as across the range of possible amplitudes at a position in $OFM(x,y)$ the quantization (i.e., scaling is same).

In one example, quantization may be non-uniform. That is, the quantization may differ across the range of possible amplitudes. For example, respective Stepsizes may vary across a range of values. That is, for example, in one example, a non-uniform quantization function may be defined as follows:

$$QOFM(x, y) = \text{round}\left(OFM(x, y)/\text{Stepsize}_i\right)$$

Where
$\text{Stepsize}_i = \text{scalar}_0$: if $OFM(x,y) < \text{value}_0$
$\text{scalar}_1$: if $\text{value}_0 \leq OFM(x,y) \leq \text{value}_1$
$\text{scalar}_{N-1}$: if $\text{value}_{N-2} \leq OFM(x,y) \leq \text{value}_{N-1}$
$\text{scalar}_N$: if $OFM(x,y) > \text{value}_{N-1}$
Further, it should be noted that as described above, quantization may include mapping an amplitude in a range to a particular value. That is, for example, in one example, non-uniform quantization function may be defined as:

$$QOFM(x, y) = \begin{cases} s_0 & OFM(x, y) < \text{value}_0 \\ s_1 & \text{value}_0 \leq OFM(x, y) < \text{value}_1 \\ \vdots & \vdots \\ s_N & \text{value}_N \leq OFM(x, y) \end{cases}$$

Where, $\text{value}_{i+1} > \text{value}_i$ and $\text{value}_{i+1} - \text{value}_i$ does not have to equal $\text{value}_{j+1} - \text{value}_j$ for $i \neq j$ The inverse of the non-uniform quantization process, may be defined as:

$$ROFM(x, y) = \begin{cases} r_0 & QOFM(x, y) = s_0 \\ r_1 & QOFM(x, y) = s_1 \\ \vdots & \vdots \\ r_N & QOFM(x, y) = s_N \end{cases}$$

The inverse process corresponds to a lookup table and may be signaled in the bitstream.

Finally, it should be noted that combinations of the quantization techniques described above may be utilized and in some cases, specific quantization functions may be specified and signaled. For example, quantization tables may be signaled in a manner similar to signaling of quantization tables in VVC.

Referring again to FIG. 7A, although not shown, but as described in further detail below, entropy encoding may be performed on quantized output feature map data. Thus, as illustrated in FIG. 7A, the quantized output feature map is a compressed representation of the current video block.

As illustrated in FIG. 7B, the current block of video data is decoded by performing inverse quantization on the quantized output feature map, performing a padding operation on the recovered output feature map, and convolving the padded output feature map with a kernel. Similar to FIG. 2B, FIG. 7B illustrates a reconstruction error which is the difference between current block and recovered block. It should be noted that the padding operation performed in FIG. 7B is different than the padding operation performed in FIG. 7A and the kernel utilized in FIG. 7B is different than the kernel utilized in FIG. 7A. That is, in the example illustrated in FIG. 7B, zero values are interleaved with the recovered output feature map, and the 3×3 kernel in convolved over the 6×6 input using a unit stride resulting in the recovered block of MDDS. It should be noted that such a convolution operation performed during autodecoding may be referred to a convolution-transpose (convT). It should be noted that a convolution-transpose, in some cases may define a specific relationship between kernels at each of an autoencoder and autodecoder and in other cases, the term convolution-transpose may be more general. It should be noted that there may be several ways in which autodecoding may be implemented. That is, FIG. 7B provides an illustrative case of a convolution-transpose and there numerous ways in which a convolution-transpose (and autodecoding) may be performed and/or implemented. The techniques described herein are generally applicable to autodecoding. For example, with respect to the example illustrated in FIG. 7B, in a simple case, each of the four values illustrated in the recovered output feature map may be duplicated to create a 4×4 array (i.e., an array having its top-left four values as 108, its top-right four values as 102, its bottom-left four values as 116, and its bottom-right four values as 108). Further, other padding operations, kernels, and/or stride functions may be utilized. Essentially, at an autodecoder, an autodecoding process may be selected in a manner that achieves a desired objective, for example, reducing a reconstruction error. It should be noted the other desired objectives may include reducing visual artifacts, increasing the probability an object is detected, etc.

As described above, techniques for coding multi-dimensional data described herein may be utilized in conjunction with techniques utilized in typical video standards. As described above, with respect to FIG. 5, the degree of quantization applied during video encoding may alter the rate-distortion of encoded video data. Further, a typical video encoder selects an intra prediction mode for intra prediction and reference frame(s) and motion information for inter prediction. These selections also alter the rate-distortion. That is, in general, video encoding includes selecting video encoding parameters in a manner that optimizes and/or provides a desired rate-distortion. According to the techniques herein, in one example, autoencoding may be used during video encoding in order to select video encoding parameters in order to achieve a desired rate-distortion. That is, for example as described above, inference data (e.g., where objects are located within an image) derived from feature data may be used to optimize the encoding of video data, (e.g., adjust coding parameters to improve relative image quality in regions where objects of interest are present).

Figure 8:
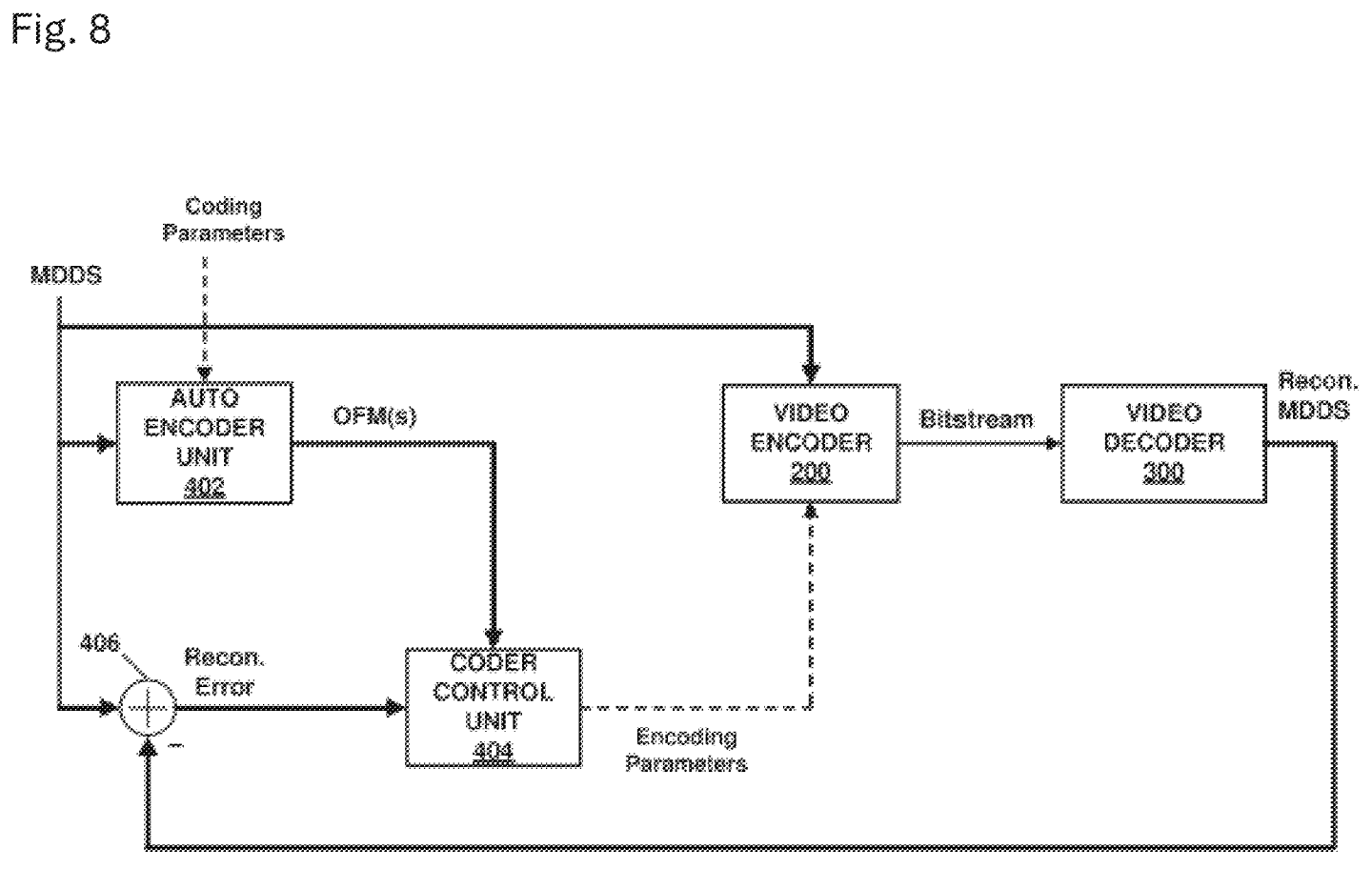

FIG. 8 is an example of a coding system that may encode a multi-dimensional data set in accordance with one or more techniques of this disclosure. In the example illustrated in FIG. 8, autoencoder unit 402 receives a multi-dimensional data set, that is, video data, and generates one or more output feature maps corresponding to the video data. That is, for example, autoencoder may perform two-dimensional discrete convolution, as described above, on regions within a video sequence. It should be noted that in FIG. 8, the coding parameters illustrated as being received by autoencoder unit 402 correspond to selection of parameters for performing autoencoding. That is, for example, in the case of two-dimensional discrete convolution, selection of $w_i$ and $h_i$, selection of a padding function, selection of stride function, and selection of a kernel. As illustrated in FIG. 8, coder control unit 404 receives the output feature maps and provides coding parameters (e.g., a QP, intra prediction modes, motion information, etc.) to video encoder 200. Video encoder 200 receives video data and provides a bitstream based on the encoding parameters according to a typical video coding standard as described above. Video decoder 300 receives the bitstream and reconstructs the video data according to a typical video coding standard as described above. As illustrated in FIG. 8, summer 406, subtracts the reconstructed video data from the source video data and generates a reconstruction error, i.e., e.g., in a manner similar to that described above with respect to FIG. 2B. As illustrated in FIG. 8, coder control unit 404 receives the reconstruction error. It should be noted that although not explicitly shown in FIG. 8, coder control unit 404 may determine a bit-rate corresponding to a bitstream. Thus, coder control unit 404 may correlate output feature map(s) (i.e., e.g., statistics thereof) corresponding to video data, encoding parameters used for encoding video, a reconstruction error, and a bit-rate. That is, coder control unit 404 may determine a rate-distortion for video data encoded using a particular set of encoding parameters and having particular OFMs. In this manner, through multiple iterations of encoding the same video data (or a training set of video data) with different encoding parameters coder control unit 404 may be said to be able learn (or train) which encoding parameters optimize rate-distortion for various types of video data. That is, for example, output feature maps with relatively low of variance may correlate to images having large low-texture regions and may be relatively less sensitive to changes in degrees of quantization. That is, in this case, for this types of images rate-distortion may optimized by increasing quantization.

As described above, with respect to FIGS. 7A-7B, auto-encoding may be performed on video data to generate a quantized output feature map data. A quantized output feature map is a compressed representation of the current video block. In some cases, that is, based on how autoencoding is performed an output feature map may effectively be a down-sampled version of video data. For example, referring to FIG. 7A, the 4×4 array of video data may be compressed to a 2×2 array (before or after quantization). In a case where the 4×4 array of video data is one of several 4×4 arrays of video data included in a 1920×1080 resolution picture, autoencoding each 4×4 array as illustrated in FIG. 7A may effectively down-sample the 1920×1080 resolution picture to a 960×540 resolution picture. It should be noted that in some cases, quantization may include adjusting a number of bits used to represent a sample value. That is, for example, mapping 10-bit values to 8-bit values. In this case, the quantized values may have the same amplitude range as the non-quantized values, but the fidelity of the amplitude data is reduced. In one example, according to the techniques herein, such a down-sampled representation of video data may be coded according to a typical video coding standard. Further, according to the techniques herein, autoencoding may be used during the video encoding in order to select video encoding parameters in order to achieve a desired rate-distortion, for example, as described above with respect to FIG. 8.

Figure 9:
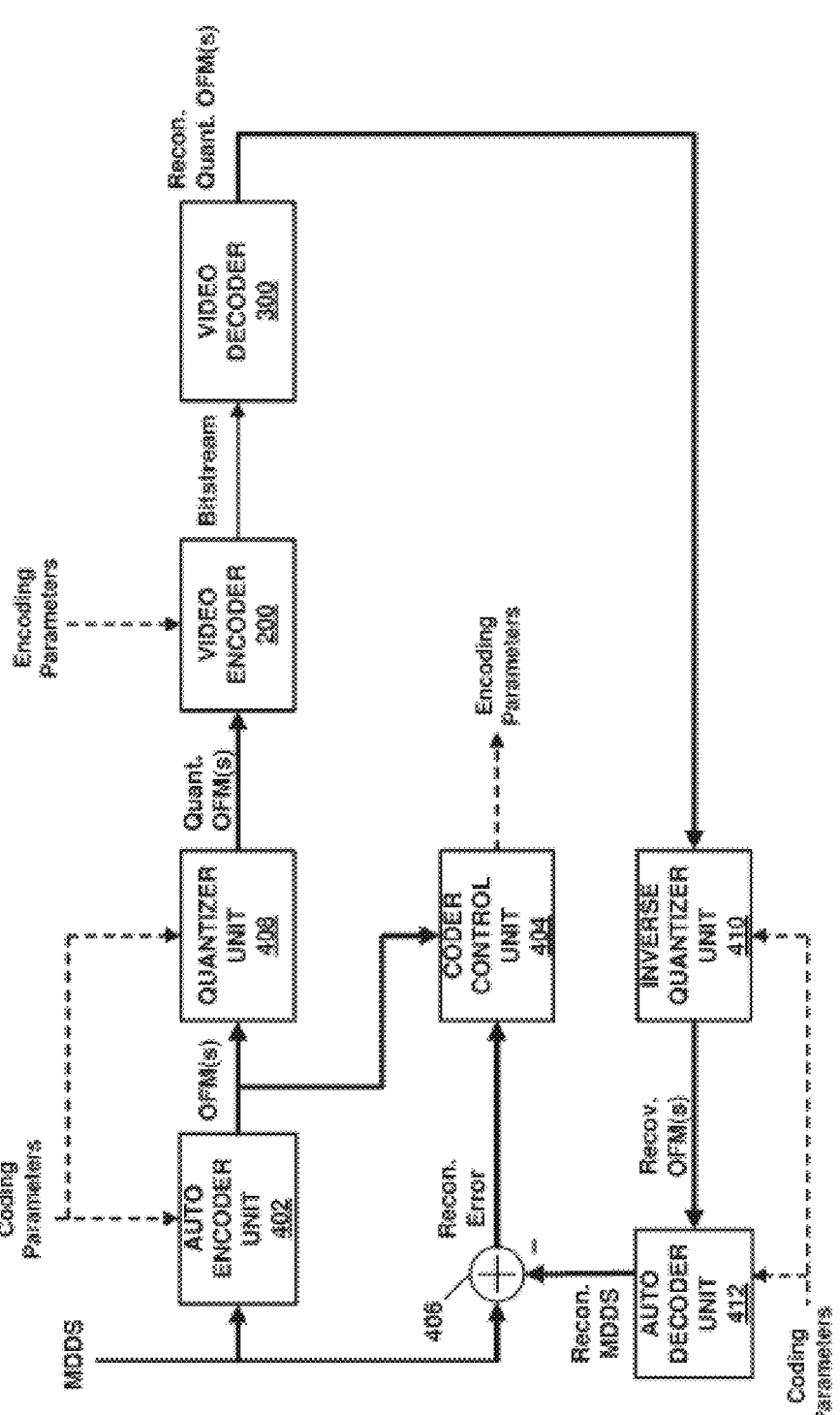
FIG. 9 is an example of a coding system that may encode a multi-dimensional data set in accordance with one or more techniques of this disclosure.

FIG. 9 is an example of a coding system that may encode a multi-dimensional data set in accordance with one or more techniques of this disclosure. The system in FIG. 9 is similar to the system illustrated in FIG. 8, and also includes quantizer unit 408, inverse quantizer unit 410, and autodecoder unit 412. As illustrated in FIG. 9, quantizer unit 408 receives the one or more output feature maps corresponding to the video data and quantizes the output feature maps. As described above, quantizing may include reducing bit-depth such that the amplitude range of the quantized OFM values is the same as input video data. As illustrated in FIG. 9, video encoder 200 receives the quantized output feature maps and encodes the quantized output feature maps based on the encoding parameters according to a typical video coding standard as described above and outputs a bitstream. Video decoder 300 receives the bitstream and reconstructs the quantized output feature maps according to a typical video coding standard as described above. It should be noted that although, not shown in FIG. 9, in some examples, additional processing may be performed on the quantized OFMs for purposes of coding the data according to a video coding standard. That is, in some examples, the data may be re-arranged, scaled, etc. Further, a reciprocal process may be performed on the reconstructed quantized OFMs. Inverse quantizer unit 410 receives the recovered quantized output feature maps and performs an inverse quantization and autodecoder unit 412 performs autodecoding. That is, inverse quantizer unit 410 and autodecoder unit 412 may operate in a manner similar to that described above with respect to FIG. 7B. In this manner, in the system illustrated in FIG. 9, the bitstream output video encoder 200 is an encoded down-sampled representation of input video data and video decoder, inverse quantizer unit 410, and autodecoder unit 412 reconstruct the input video data from the bitstream. Further, as illustrated in FIG. 9, in manner similar to that described above with respect to FIG. 8, coder control unit 404 may determine a rate-distortion for quantized output feature maps encoded using a particular set of encoding parameters and video data having particular OFMs. That is, coder control unit 404 may optimize the encoding of a down-sampled representation of video data. Further, coder control unit 404 may optimize the down-sampling of input video data. That is, for example, according to the techniques herein, coder control unit 404 may determine which types of video data (e.g., highly detailed images vs. low detail images (or regions thereof)) are more or less sensitive to a reconstruct error as a result of down-sampling.

Figure 10:
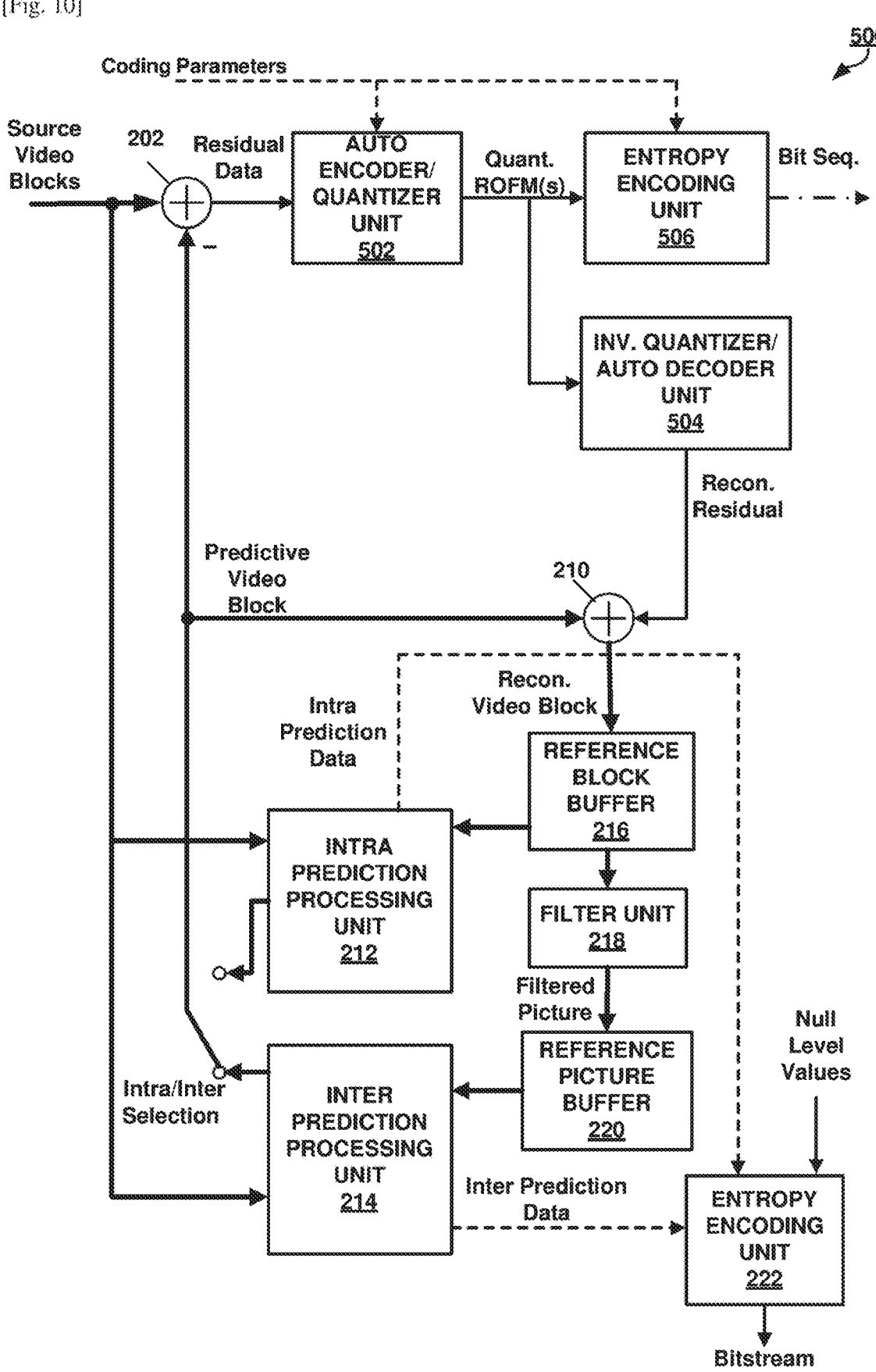
FIG. 10 is a block diagram illustrating an example of video encoder that may be configured to encode video data in according to one or more techniques of this disclosure.

As described above, with respect to FIG. 5, in the case of a typical video encoder, residual data may be encoded in a bitstream as level values. It should be noted that similar to input video data, residual data is an example of a multiple dimensional data set. Thus, in one example, according to the techniques herein, residual data (e.g., pixel domain residual data) may be encoded using autoencoding techniques. FIG. 10 is a block diagram illustrating an example of a video encoder that may be configured to encode video data according to techniques described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations. As illustrated in FIG. 10, video encoder 500 receives source video blocks and outputs a bitstream and similar to video encoder 200 includes summer 202, summer 210, intra prediction processing unit 212, inter prediction processing unit 214, reference block buffer 216, filter unit 218, reference picture buffer 220, and entropy encoding unit 222. Thus, video encoder 500 may perform intra prediction coding and inter prediction coding of picture areas in manner similar to that described above with respect to video encoder 200 receives source video blocks.

As illustrated in FIG. 10, video encoder 500 includes, autoencoder/quantizer unit 502, inverse quantizer and autodecoder unit 504, and entropy encoding unit 506. As illustrated in FIG. 10, autoencoder/quantizer unit 502 receives residual data and output quantized residual output feature map(s) (ROFM(s)). That is, autoencoder/quantizer unit 502 may perform autoencoding according to techniques described herein. For example, in a manner similar to that described above with respect to FIG. 7A. As illustrated in FIG. 10, inverse quantizer and autodecoder unit 504 receives quantized residual output feature map(s) (ROFM(s)) and outputs reconstructed residual data. That is, auto inverse quantizer and autodecoder unit 504 may perform auto decoding according to techniques described herein. For example, in a manner similar to that described above with respect to FIG. 7B. In this manner, video encoder 200 illustrated FIG. 5 and video encoder 500 illustrated FIG. 10 have encode/decode loops for reconstructing residual data which is then added to predictive video blocks for subsequent coding. As illustrated in FIG. 10, entropy encoding unit 506 receives quantized residual output feature map(s) and outputs a bit sequence. That is, entropy encoding unit 506 may perform entropy encoding according to entropy encoding techniques described herein. As further, illustrated in FIG. 10, coding parameters entropy encoding unit 222 receives null level values. That is, because video encoder 500 outputs encoded residual data as a bit sequence and a video decoder (e.g., video decoder 500 illustrated in FIG. 11), can derive residual data from the bit sequence, in some cases, residual data may not be derived from a typical video coding standard compliant bitstream. For example, the bitstream generated from video encoder 500 may set coded block flags (e.g., cbf_luma, cbf_cb, and cbf_cr in ITU-T H.265) to zero to indicate that there are no transform coefficient level values not equal to 0. It should be noted that although, in the example illustrated in FIG. 10, transform coefficient generator 204, coefficient quantization unit 206, inverse quantization and transform coefficient processing unit 208 are not included in some examples, video encoder 500 may be configured to additional/alternatively encode residual data using one or more of the techniques described above. That is, the type of encoding used to encode residual data may be selectively applied, e.g., on a sequence-by-sequence, a picture-by-picture, a slice-by-slice level, and/or a component-by-component basis. As further, illustrated in FIG. 10, autoencoder/quantizer unit 502 and entropy encoding unit 506 are controlled by coding parameters. That is, coder control unit (a coder control unit 404 described in FIG. 8 and FIG. 9) may be used in conjunction with video encoder 500. That is, video encoder 500 may be used in a system where rate-distortion is optimized based on techniques described herein.

Figure 11:
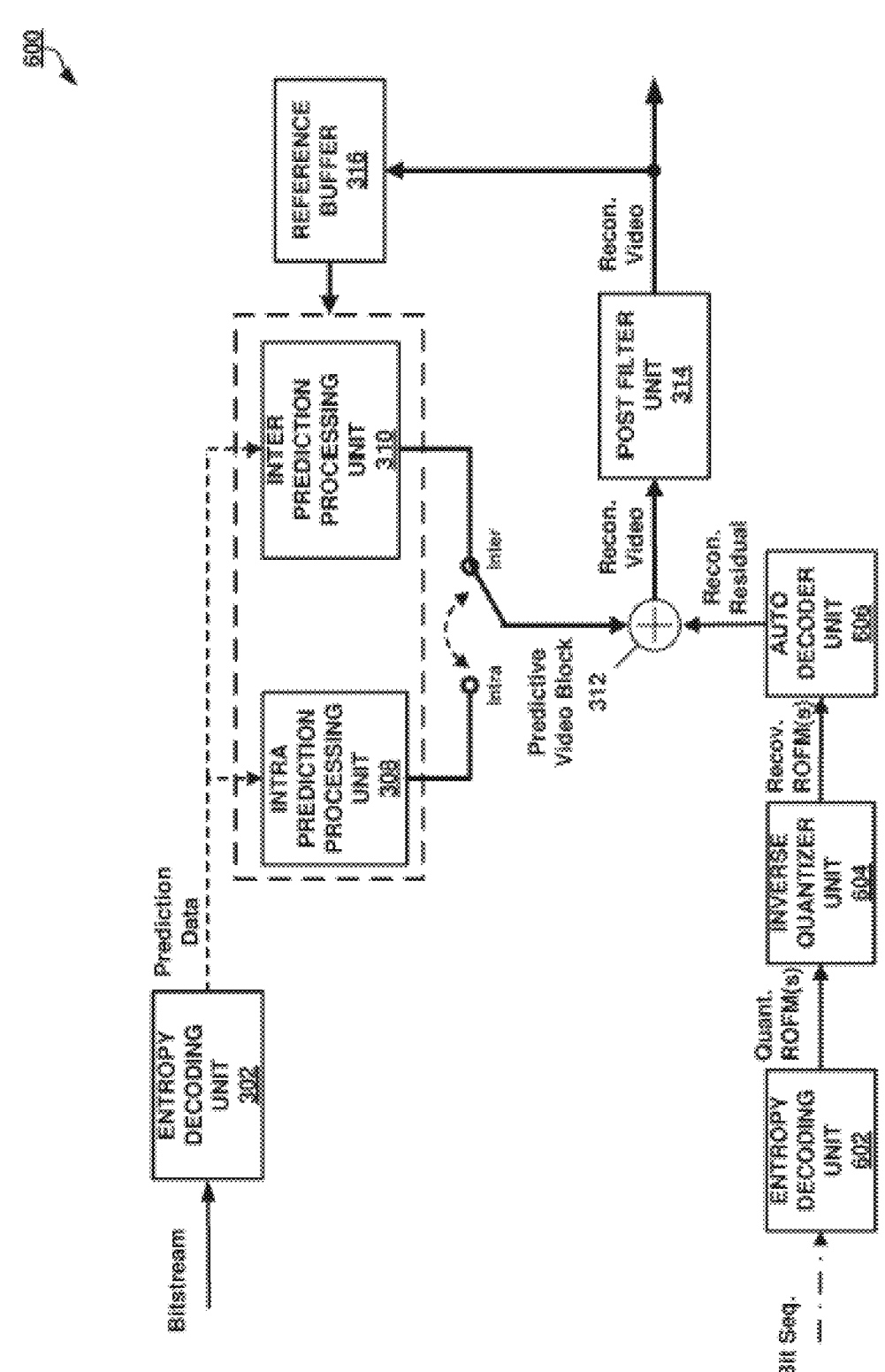
FIG. 11 is a block diagram illustrating an example of video decoder that may be configured to decode video data in according to one or more techniques of this disclosure.

FIG. 11 is a block diagram illustrating an example of a video decoder that may be configured to decode video data according to techniques described herein. As illustrated in FIG. 11, video decoder 600 receives an entropy encoded bitstream and a bit sequence and outputs reconstructed video. Similar to video decoder 300 illustrated in FIG. 6, video decoder 600 includes an entropy decoding unit 302, intra prediction processing unit 308, inter prediction processing unit 310, summer 312, post filter unit 314, and reference buffer 316. Thus, video decoder 600 may be configured to derive a predictive video block from a compliant bitstream and add the predictive video block to a reconstructed residual to generate reconstructed video in a manner similar to that described above with respect to FIG. 6. As further illustrated in the example illustrated in FIG. 6, video decoder 600 includes entropy decoding unit 602. Entropy decoding unit 602 may be configured to decode quantized residual output feature maps from a bit sequence according to a process reciprocal to an entropy encoding process. That is, entropy decoding unit 302 may be configured to perform entropy decoding according to entropy encoding techniques performed by entropy encoding unit 506 described above. As illustrated in FIG. 11, inverse quantizer unit 604 receives quantized residual output feature map(s) and outputs recovered residual output feature map(s) to autodecoder unit 606. Autodecoder unit 606 outputs reconstructed residual data. Thus, inverse quantizer unit 604 and autodecoder unit 606 operate in a similar manner to inverse quantization and autodecoder unit 504 described above. That is, inverse quantizer unit 604 and autodecoder unit 606 may perform autodecoding according to techniques described herein. Thus, in the example illustrated in FIG. 11, video decoder 600 may be configured to decode video data according to techniques described herein. It should be noted that as described in further detail below, predictive coding may be used on data other than video data. Thus, in one example, video decoder 600 may decode non-video MDDS from a compliant bitstream. For example, video decoder 600 may decode data for machine consumption. Similarly, video encoder 600 may decode non-video MDDS having a compatible input structure format. That is, for example, source video may undergoes some pre-processing and be converted to non-video MDDS. To summarize, a typical video encoder and decoder may be agnostic as to whether the data being coded is actually video data (e.g., human consumable video data).

As described above, predictive video coding techniques (i.e., intra prediction and inter prediction) generate a prediction for a current video block from stored reconstructed reference video data. As further described above, in one example, according to the techniques herein, a down-sampled representation of video data, which is an output feature map, may be coded according to predictive video coding techniques. Thus, predictive coding techniques utilized for coding video data may be generally applied to output feature maps. That is, in one example, according to the techniques herein output features maps (e.g., output features maps corresponding to video data) may be predictively coded utilizing predictive video coding techniques. Further, in some examples, according to the techniques herein, the corresponding residual data (i.e., e.g., the difference in a current region of an OFM and a prediction) may be encoded using autoencoding techniques. Thus, in one example, according to the techniques herein a multi-dimensional data set may be autoencoded, the resulting output features maps may be predictively coded, and the residual data corresponding output features maps may be auto encoded.

Figure 12:
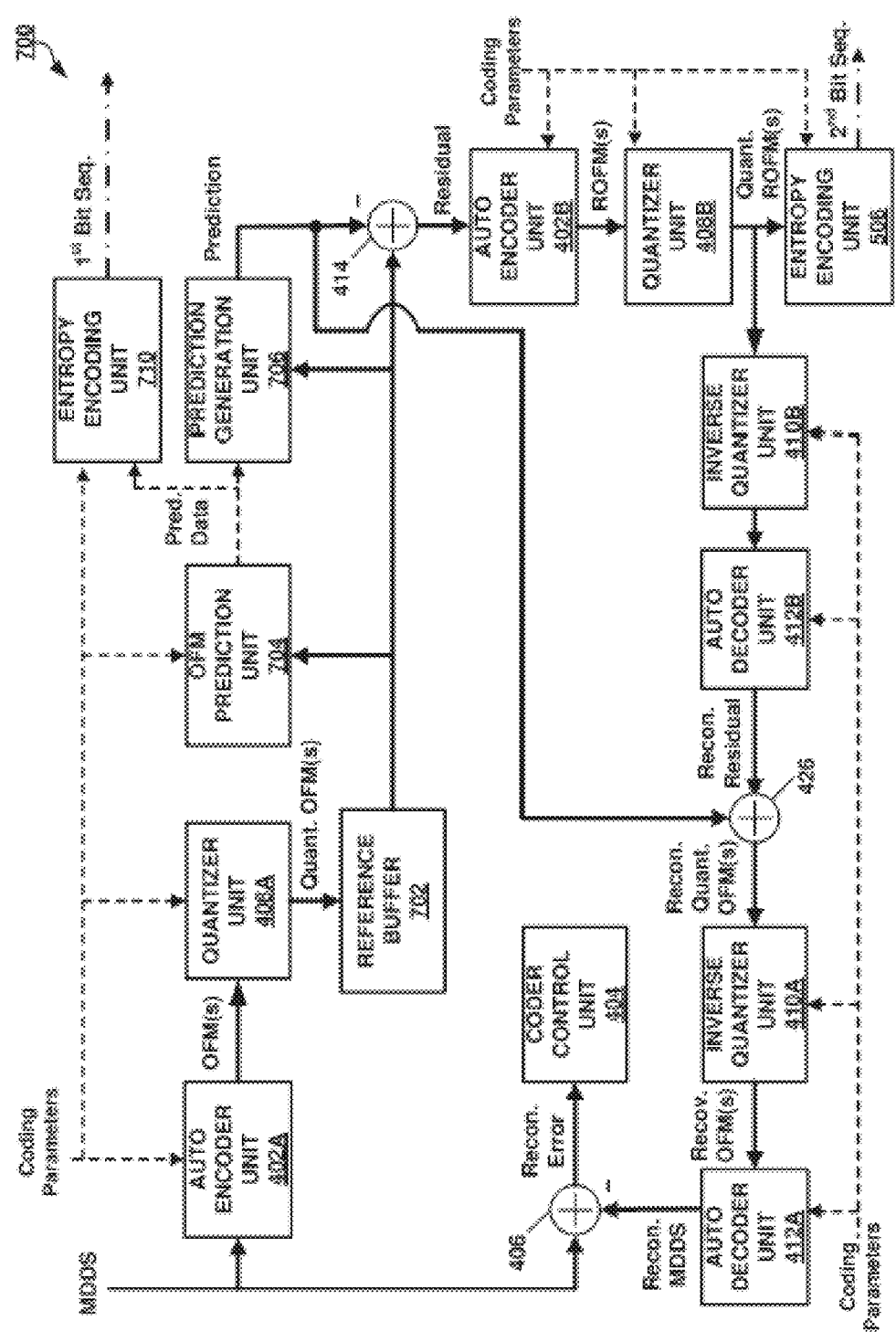
FIG. 12 is a block diagram illustrating an example of a compression engine that may be configured to encode a multi-dimensional data set in accordance with one or more techniques of this disclosure.

FIG. 12 is a block diagram illustrating an example of a compression engine that may be configured to encode a multi-dimensional data set in accordance with one or more techniques of this disclosure. It should be noted that although example compression engine 700 is illustrated as having distinct functional blocks, such an illustration is for descriptive purposes and does not limit compression engine 700 and/or sub-components thereof to a particular hardware or software architecture. Functions of compression engine 700 may be realized using any combination of hardware, firmware, and/or software implementations. In the example illustrated in FIG. 12, compression engine 700 includes autoencoder units 402A and 402B, coder control unit 404, summer 406, quantizer units 408A and 408B, inverse quantizer units 410A and 410B, autodecoder units 412A and 412B, summer 414, and entropy encoding unit 506. As further illustrated in FIG. 12, compression engine 700 includes reference buffer 702, OFM prediction unit 704, prediction generation unit 706 and entropy encoding unit 710. As illustrated in FIG. 12, compression engine 700 receives an MDDS and outputs a first bit sequence and a second bit sequence.

Autoencoder units 402A and 402B and quantizer units 408A and 408B are configured to operate in manner similar to autoencoder unit 402 and quantizer unit 408 described above with respect to FIG. 9. That is, autoencoder units 402A and 402B and quantizer units 408A and 408B are configured to receive an MDDS and output quantized OFMs. In particular, in the example illustrated in FIG. 12, autoencoder unit 402A and quantizer unit 408A receive a source MDDS and output quantized OFMs and autoencoder unit 402B and quantizer unit 408B receive residual data, which as described above is an MDDS, and output quantized OFMs. Further, inverse quantizer units 410A and 410B and autodecoder units 412A and 412B are configured to operate in manner similar to inverse quantizer unit 410 and autodecoder unit 412 described above with respect to FIG. 9. That is, inverse quantizer units 410A and 410B and autodecoder units 412A and 412B are configured to receive quantized output feature maps, perform inverse quantization, and autodecoding to generate a reconstructed data set. In particular, in the example illustrated in FIG. 12, inverse quantizer unit 410B and autodecoder unit 412B receive quantized residual output feature map(s) and output reconstructed residual data as part of an encode/decode loop. As illustrated in FIG. 12 at summer 426 the reconstructed residual data is added to a prediction video block for subsequent coding. As described in further detail below, the prediction is generated by prediction generation unit 706 and is a quantized OFM(s). As illustrated in FIG. 12, the output of summer 426 is reconstructed quantized OFM(s) and inverse quantizer units 410A and 410B receive the reconstructed quantized OFM(s) and output reconstructed MDDS as part of an encode/decode loop. That is, as illustrated in FIG. 12, summer 406 provides a reconstruction error which may be evaluated by coder control unit 404, in a manner similar to that described above. Thus, compression engine 700 is similar to encoders and systems described above, in that rate-distortion may be optimized based on a reconstruction error. As illustrated in FIG. 12, entropy encoding unit 506 receives quantized residual output feature map(s) and outputs a bit sequence. In this manner, entropy encoding unit 506 operations in a manner similar to entropy encoding unit 506 described above with respect to FIG. 10.

As described above, output features maps may be predictively coded. Referring again to FIG. 12, reference buffer 702, OFM prediction unit 704, and prediction generation unit 706 represent components of compression engine 700 configured to predictively code output features maps. That is, output features maps may be stored in reference buffer 702. OFM prediction unit 704 may be configured to analyze a current OFM and a OFM stored to reference buffer 702 and generate prediction data. That is, for example, OFM prediction unit 704 may treat OFMs similar to the way pictures are treated in a typical video coding and select a reference OFM and motion information for a current OFM. In the example, illustrated in FIG. 12, prediction generation unit 706 receives the prediction data and generates a prediction (e.g., retrieves an area of an OFM) from OFM data stored to reference buffer 702. It should be noted that in FIG. 12, OFM prediction unit 704 is illustrated as receiving coding parameters. In this case, coder control unit 404 may control how prediction data is generated, e.g., based on a rate-distortion analysis. For example, OFM data may be particularly sensitive to various types of artifacts that are relatively minor with respect to video data and thus prediction modes associated with such artifacts may be disabled. Finally, as illustrated in FIG. 12 entropy encoding unit 710 receives coding parameters and prediction data and outputs a bit sequence. That is, entropy encoding unit 710 may be configured to perform entropy encoding techniques described herein. It should be noted that although not shown in FIG. 12, the first bit sequence and the second bit sequence may be multiplexed (e.g., before or after entropy encoding) to form a single bitstream.

FIG. 13 is a block diagram illustrating an example of a decompression engine that may be configured to decode a multi-dimensional data set in accordance with one or more techniques of this disclosure. As illustrated in FIG. 13, decompression engine 800 receives an entropy encoded first bit sequence, an entropy encoded second bit sequence, and coding parameters and outputs a reconstructed MDDS. That is, decompression engine 800 may operate in a reciprocal manner to compression engine 700. As illustrated in FIG. 13, decompression engine 800 includes inverse quantizer units 410A and 410B, autodecoder units 412A and 412B, and summer 426, each of which may be configured to operate in a similar manner to like numbered components described above with respect to FIG. 12. As further, illustrated in FIG. 13, decompression engine 800 includes entropy decoding unit 802, prediction generation unit 804, reference buffer 806, and entropy decoding unit 808. As illustrated in FIG. 13, entropy decoding unit 802 and entropy decoding unit 808 receive respective bit sequences and output respective data. That is, entropy decoding unit 802 and entropy decoding unit 808 may operate in a reciprocal manner to entropy encoding unit 710 and entropy encoding unit 506 described above with respect to FIG. 12. As illustrated in FIG. 13 reference buffer 806 stores reconstructed quantized OFM and prediction generation unit 804 receives prediction data and coding parameters generates a prediction. That is, prediction generation unit 804 and reference buffer 806 may operate in manner similar to prediction generation unit 706 and reference buffer 702 described above with respect to FIG. 12. Thus, decompression engine 800 may be configured to decode encoded MDDS data according to techniques described herein.

It should be noted that in the examples illustrated above, in FIG. 8, FIG. 9 and FIG. 12, each coder control unit 404 is illustrated as receiving a reconstruction error. In some examples, a coder control unit may not receive a reconstruction error. That is, in some examples, full decoding may not occur at an encoder. For example, referring to FIG. 8, in one example, video decoder 300 and summer 406 (i.e., decoding loop) and coder control unit 404 may simply receive the OFM(s) to determine encoding parameters.

As described above, in addition to performing discrete convolution on two-dimensional (2D) data sets, convolution may be performed on one-dimensional data sets (1D) or on higher dimensional data sets (e.g., 3D data sets). There are several ways in which video data may be mapped to a multi-dimensional data set. In general, video data may be described as having a number of input channels of spatial data. That is, video data may be described as an $N_i \times W \times H$, data set where $N_i$ is the number of input channels, W is a spatial width, and H is a spatial height. It should be noted that $N_i$, in some examples, may be a temporal dimension (e.g., number of pictures). For example, $N_i$ in $N_i \times W \times H$ may indicate a number of 1920×1080 monochrome pictures. Further, in some examples, $N_i$, may be a component dimension (e.g., number of color components). For example, $N_i \times W \times H$ may include a single 1024×742 image having RGB components, i.e., in this case, $N_i$ equals 3. Further, it should be noted that in some cases, there may be N input channels for both a number of components (e.g., $N_{Ci}$) and a number of pictures (e.g., $N_{Pi}$). In this case, video data may be specified as $N_{Ci} \times N_{Pi} \times W \times H$, i.e., as a four-dimensional data set. According to the $N_{Ci} \times N_{Pi} \times W \times H$ format, an example of 60 1920×1080 monochrome pictures may be expressed as 1×60×1920×1080 and a single 1024×742 RGB image may be expressed as 3×1×1024×742. It should be noted that in these cases, each of the four-dimensional data sets have a dimension having a size of 1, and may be referred to as three-dimensional data sets and respectively simplified to 60×1920×1080 and 3×1024×742. That is, 60 and 3 are both input channels in three-dimensional data sets, but refer to different dimensions (i.e., temporal and component).

As described above, in some cases, a 2D OFM may correspond to a down-sampled component of video (e.g., luma) in both the spatial and temporal dimensions. Further, in some cases, a 2D OFM may correspond to a down-sampled video in both the spatial and component dimensions. That is, for example, a single 1024×742 RGB image, (i.e., 3×1024×742) may be down-sampled to a 1×342×248 OFM. That is, down-sampled by 3 in both spatial dimensions and down-sampled by 3 in the component dimension. It should be noted that in this case, 1024 may be padded by 1 to 1025 and 743 may be padded by 2 to 744, such that each are multiples of 3. Further, in one example, 60 1920×1080 monochrome pictures (i.e., 60×1920×1080) may be downsampled to a 1×640×360 OFM. That is, down-sampled by 3 in both spatial dimensions and down-sampled by 60 in the temporal dimension.

It should be noted that in the cases above, the down-sampling may be achieved by having a $N_i \times 3 \times 3$ kernel with a stride of 3 in the spatial dimension. That is, for the 3×1025×744 data set, the convolution generates a single value for each 3×3×3 data point and for the 60×1920×1080 data set, the convolution generates a single value for each 60×3×3 data point. It should be noted that in some cases, it may be useful to perform discrete convolution on a data set multiple times, e.g., using multiple kernels and/or strides. That is, for example, with respect to the example described above, a number of instances of $N_i \times 3 \times 3$ kernels (e.g., each with different values) may be defined and used to generate a corresponding number of instances of OFMs. In this case, the number of instances may be referred to as a number of output channels, i.e., $N_O$. Thus, in the case where an $N_i \times W_i \times H$; input data set is down-sampled according to a $N_O$ instances of $N_i \times W_k \times H_k$ kernels, the resulting output data may be represented as $N_O \times W_O \times H_O$. Where $W_O$ is a function of $W_i$, $W_k$, and the stride in the horizontal dimension and $H_O$ is a function of $H_i$, $H_k$, and the stride in the vertical dimension. That is, each of $W_O$ and $H_O$ are determined according to spatial down-sampling. It should be noted that in some examples, according to the techniques herein, an $N_O \times W_O \times H_O$ data set may be used for object/feature detection. That is, for example, each of the $N_0$ data sets may be compared to one another and relationships in common regions may be used to identify the presence of an object (or another feature) in the original $N_i \times W_i \times H$, input data set. For example, a comparison/task may be carried out over a multiple of NN layers. Further, an algorithm, such as, for example, a non-max suppression to select amongst available choices, may be used. In this manner, as described above, the encoding parameters of a typical video encoder may be optimized based on the $N_O \times W_O \times H_O$ data set, e.g., quantization varied based on the indication of an object/feature in video. In this manner according to the techniques herein, data encoder 106 represents an example of a device configured to receive a data set having a size specified by a number of channels dimension, a height dimension, and a width dimension, generate an output data set corresponding to the input data by performing a discrete convolution on the input set, wherein performing a discrete convolution includes spatial down-sampling the input data set according to a number of instances of kernels, and encoding the received data set based on the generated output set. It should be noted, that in theory a stride may be less than one and in this case, convolution may be used to up-sample data.

In one example, in a case where a number of instances of K×K kernels each having a corresponding dimension equal to a $N_i$ is used in processing of an $N_i \times W_i \times H_i$ dataset, the following notation may be used to indicate one of a convolution or convolution transpose, the kernel size, the stride function, and padding function for a convolution, and the number of output dimensions of a discrete convolution:

conv2d: 2D convolution, conv2dT: 2D convolution transpose,
kK: kernel of size K for all dimensions (e.g., K×K);
sS: stride of S for all dimensions (e.g. (S, S));
pP: pad by P to both sides of all dimensions with value 0, (e.g., (P, P) for 2D); and
nN number of output of channels.

It should be noted that in the example notation provided above, the operations are symmetric, i.e., square. It should be noted that in some examples, the notation may be as follows for general rectangular cases:

conv2d: 2D convolution, conv2dT: 2D convolution transpose, $kK_wK_h$: kernel of size K for width dimension and $K_h$ for height dimension (e.g., $K_w \times K_h$);

$sS_nS_h$: stride of $S_w$ for width dimension and $S_h$ for height dimension (e.g., $S_w \times S_h$);

$pP_wP_h$: pad by $P_W$ to both sides of width dimension and $P_h$ to both sides of height dimension (e.g., $P_w \times P_h$); and nN number of output of channels.

It should be noted that in some examples, a combination of the above notation may be used. For example, in some examples, K, S, and $P_wP_h$ notation may be used. Further, it should be noted that in other examples, padding may be asymmetric about a spatial dimension (e.g., Pad 1 row above, 2 rows below).

Further, as described above, convolution may be performed on one-dimensional data sets (1D) or on higher dimensional data sets (e.g., 3D data sets). It should be noted that in some cases, the notation above may be generalized for convolutions of multiple dimensions as follows:

conv1d: 1D convolution, conv2d: 2D convolution, conv3d: 3D convolution conv1dT: 1D convolution transpose, conv2dT: 2D convolution transpose, conv3dT: 3D convolution transpose kK: kernel of size K for all dimensions (e.g., K for 1D, K×K for 2D, K×K×K for 3D)

sS: stride of S for all dimensions (e.g., (S) for 1D, (S, S) for 2D, (S, S, S) for 3D)

pP: pad by P to both sides of all dimensions with value 0 (e.g., (P) for 1D, (P, P) for 2D, (P, P, P) for 3D)

nN number of output of channels

The notation provided above may be used for efficiently signaling of autoencoding and autodecoding operations. For example, in the case of down-sampling a single 1024×742 RGB image to a 342×248 OFM, as described above, according to 256 instances of kernels may be described as follows:

Input data: 3×1024×742

Operation: conv2d, k3, s3, p1, n256

Resulting Output data: 256×342×248

Similarly, in the case of down-sampling a 60 1920×1080 monochrome pictures to a 640×360 OFM, as described above, according to 32 instances of kernels may be described as follows:

Input data: 60×1920×1080

Operation: conv2d, k3, s3, p0,2 n32

Resulting Output data: 32×640×360

It should be noted that there may be numerous ways to perform convolution on input data in order to represent the data as an output feature map (e.g., $1^{st}$ padding, $1^{st}$ convolution, $2^{nd}$ padding, $2^{nd}$ convolution, etc.). For example, the resulting data set 256×342×248 may be further down-sampled by 3 in the spatially dimension and by 8 in the channel dimension and as follows:

Input data: 256×342×248

Operation: conv2d, k3, s3, p0,1, n32

Resulting Output data: 32×114×84

In one example, according to the techniques herein, the operation of an autodecoder may be well-defined and known to an autoencoder. That is, the autoencoder knows the size of the input (e.g., the OFM) received at the decoder (e.g., 256×342×248, 32×640×360, or 32×114×84 in the examples above). This information along with the known k and s of convolution/convolution-transpose stages can be used to determine what the data set size will be at a particular location of the autodecoder.

As described above, object recognition tasks typically involve receiving an image, generating feature data corresponding to the image, analyzing the feature data, and generating inference data. Examples of typical object detection systems include, for example, versions of YOLO, RetinaNet, and Faster R-CNN. Detailed descriptions of object detection systems, performance evaluation techniques, and performance comparisons are provided in various journals and the like. For example, Redmon, et al., "YOLOv3: An Incremental Improvement," arXiv: 1804.02767, 8 Apr. 2018 generally describes YOLOv3 and provides a comparison to other object detection systems. Everingham M, Eslami S M A, Van Gool L, et al. The Pascal Visual Object Classes Challenge: A Retrospective[J]. International Journal of Computer Vision, 2015, 111(1):98-136 describes a mAP (mean Average Precision) evaluation metric for evaluating object detection and segmentation. Wu et al., "Detectron2," at github, facebookresearch, detectron2, 2019 provides libraries and associated documentation for Detectron2 which is a Facebook Artificial intelligence (AI) Research platform for object detection, segmentation and other visual recognition tasks.

Figure 14:
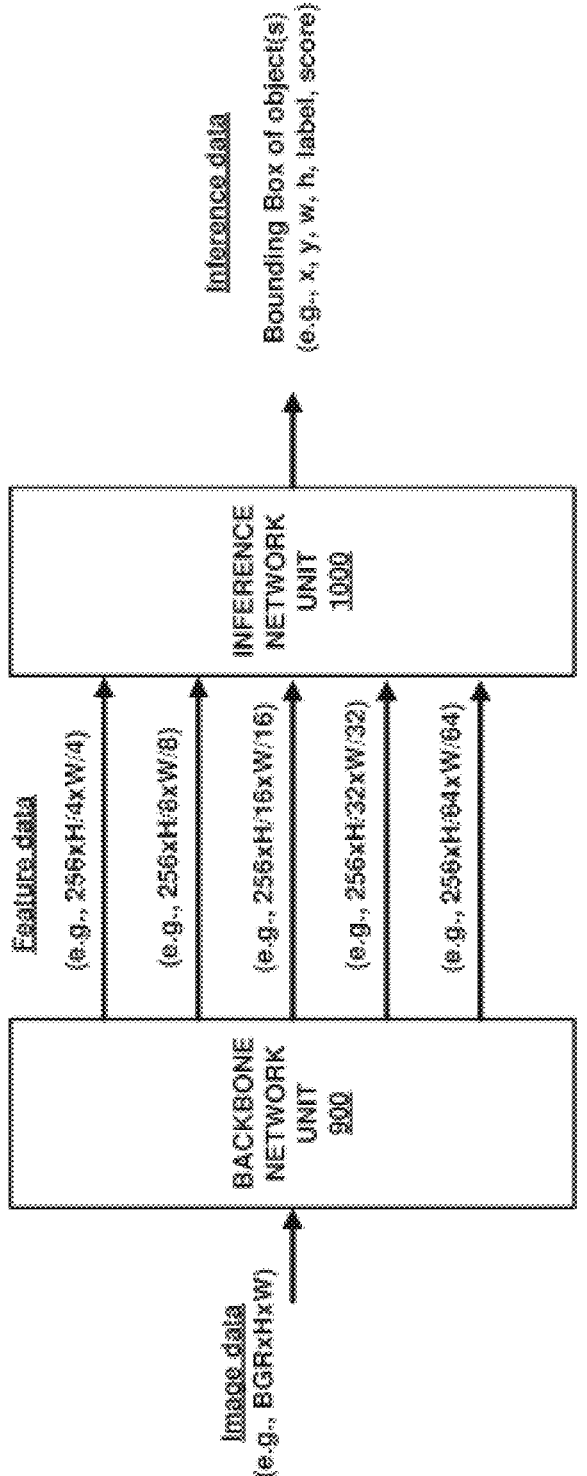
FIG. 14 is an example of a coding system that may encode a multi-dimensional data set in accordance with one or more techniques of this disclosure.
Figure 15:
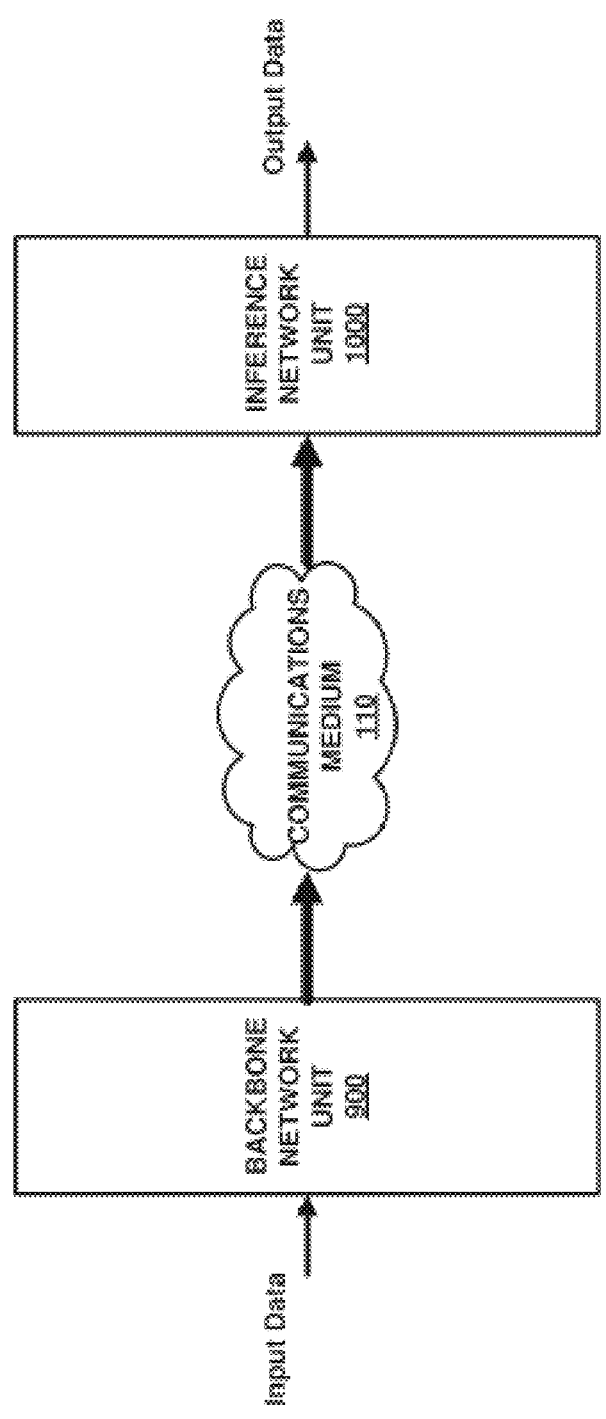
FIG. 15 is an example of a coding system that may encode a multi-dimensional data set in accordance with one or more techniques of this disclosure.

It should be noted that for explanation purposes, in some cases, the techniques described herein are described with specific example object detection systems (e.g., Detectron2). However, it should be noted that the techniques herein are generally applicable to any object detection system. Further, the techniques described herein may be applicable to any system where feature tensors are generated for a MDDS. For example, the techniques described herein may be generally applicable to other type of MDDSs (e.g., multi-channel audio, omnidirectional video, etc.). That is, regardless of what input data represents, a feature tensor generated therefrom may be compressed according to the techniques described herein. Referring to FIG. 14, in general, in the case image data, an object detection system can be described as receiving image data at a backbone network unit 900 (e.g., ResNet-101-C4, ResNet-101-FPN, InceptionResNet-v2, Inception-ResNet-v2-TDM, DarkNet-19, ResNet-101-SSD, ResNet101-DSSD, ResNet-101-FPN, ResNeXt-101-SSD, Darknet-53, etc.) and generating feature data (also referred to as OFM(s), feature tensors, feature maps, etc.) and receiving feature data at an inference network unit 1000 and generating inference data. It should be noted that there may be several methods (or algorithmic strategies) for generating inference data at an inference network unit 1000 including, for example, so-called one-stage methods and two-stage methods. The techniques described herein are generally applicable regardless of how inference data is generated. As described above, the techniques described in this disclosure may be particularly useful for allowing object recognition tasks to be distributed across a communication network. That is, referring to FIG. 15, according to the techniques herein each of backbone network unit 900 and inference network unit 1000 may be coupled communications medium 110, and thus, in some examples located at distinct physical locations.

Figure 16:
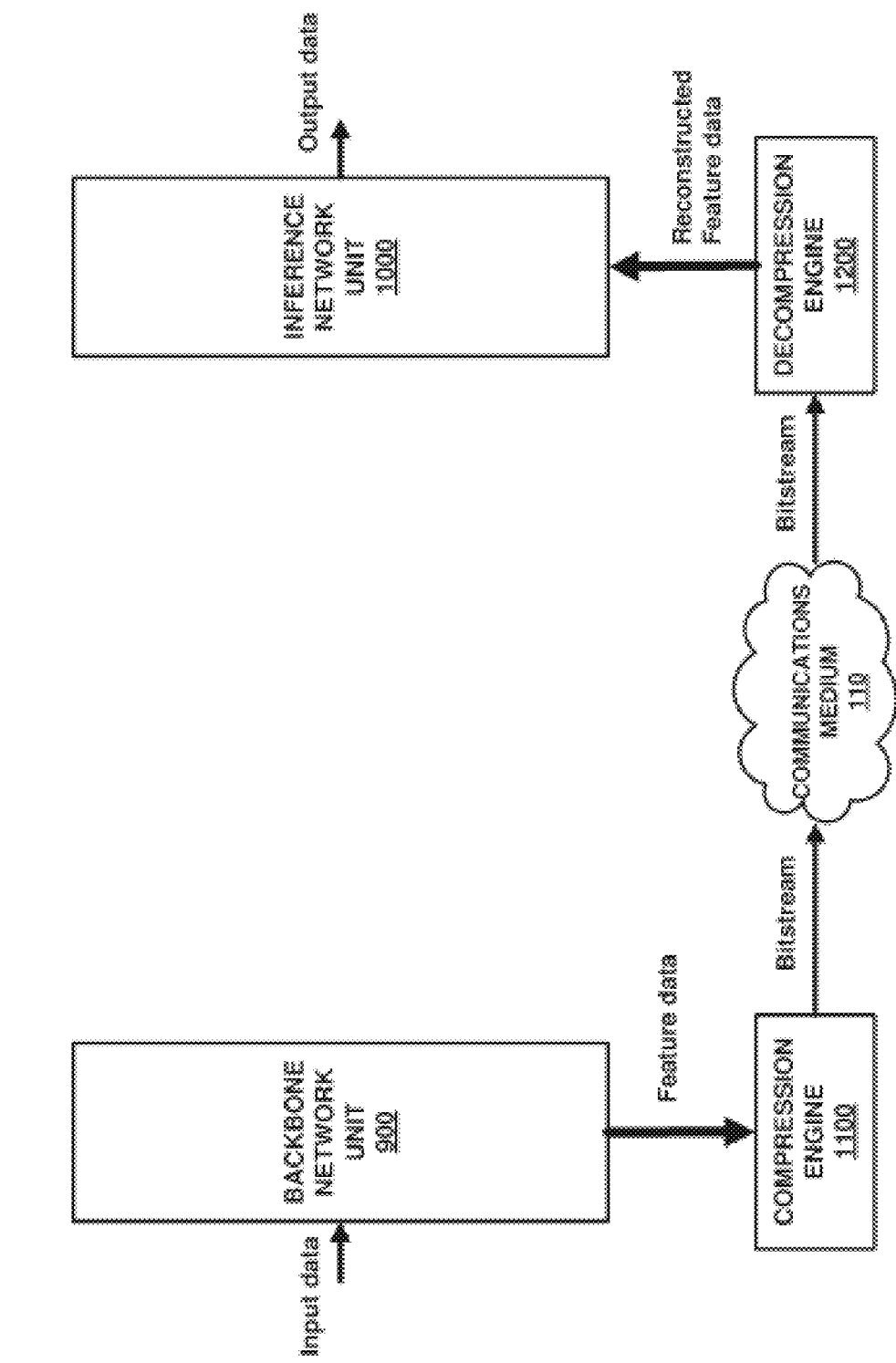
FIG. 16 is an example of a coding system that may encode a multi-dimensional data set in accordance with one or more techniques of this disclosure.

FIG. 16 is an example of a coding system that may encode a multi-dimensional data set in accordance with one or more techniques of this disclosure. As illustrated in FIG. 16, the system includes backbone network unit 900, inference network unit 1000 and communications medium 110. Additionally, as illustrated in FIG. 16, the system includes compression engine 1100 and decompression engine 1200. Compression engine 1100 may be configured to compress feature data according to one or more of the techniques described herein and decompression engine 1200 may be configured perform reciprocal operations to reconstruct the feature data. As described above, feature data may be generated according to a defined backbone network. In a typical case, feature data may be multi-scale feature maps with different receptive fields. A backbone network may be based on a backbone model (e.g., R-50, R101, X-101, ResNet-101-C4, ResNet-101-FPN, Inception-ResNet-v2, Inception-ResNet-v2-TDM, DarkNet-19, ResNet-101-SSD, ResNet-101-DSSD, ResNet-101-FPN, ResNeXt101-SSD, Darknet-53, Base-RCNN-FPN, etc.). In a typical case, a backbone network includes stages that include multiple bottlenecks. Stages may correspond to scales. For example, for a 2D image, a stage may correspond to a ¼ down sampling of data (e.g., 1920×1080 data values to 480×270 data values). The bottlenecks may include convolution layers. That is, a bottleneck may include performing multiple convolutions operations with various kernel sizes and strides. Further, it should be noted that a backbone network may further process features from each stage. That is, for example features generated from a bottleneck may be provided as input for one or more additional processes. That is, a backbone network may include so-called fully-connected layers and/or activation layers. For example, Base-RCNN-FPN includes lateral and output convolution layers, up-samplers, and a last-level max pool layer. Thus, there are numerous ways in which a backbone network can implemented. The techniques described herein are generally applicable regardless of the backbone network used to generate feature data. However, it should be noted that, in some cases it may be useful to use a common (e.g., standardized) backbone network for particular tasks. That is, for some applications, similar advantages to those achieved by having a video coding standard that defines a compliant bitstream may be realized by implementing common/standardized backbone networks. As described in detail below, the techniques described herein are particularly useful for common/standardized backbone networks, in that the techniques allow feature data to be compressed without necessarily requiring a particular backbone network to be modified. With respect to modifying a backbone network, it should be noted that developing a useful backbone model may require analyzing a significant amount of training data and thus, may not be a simple process.

Figure 17:
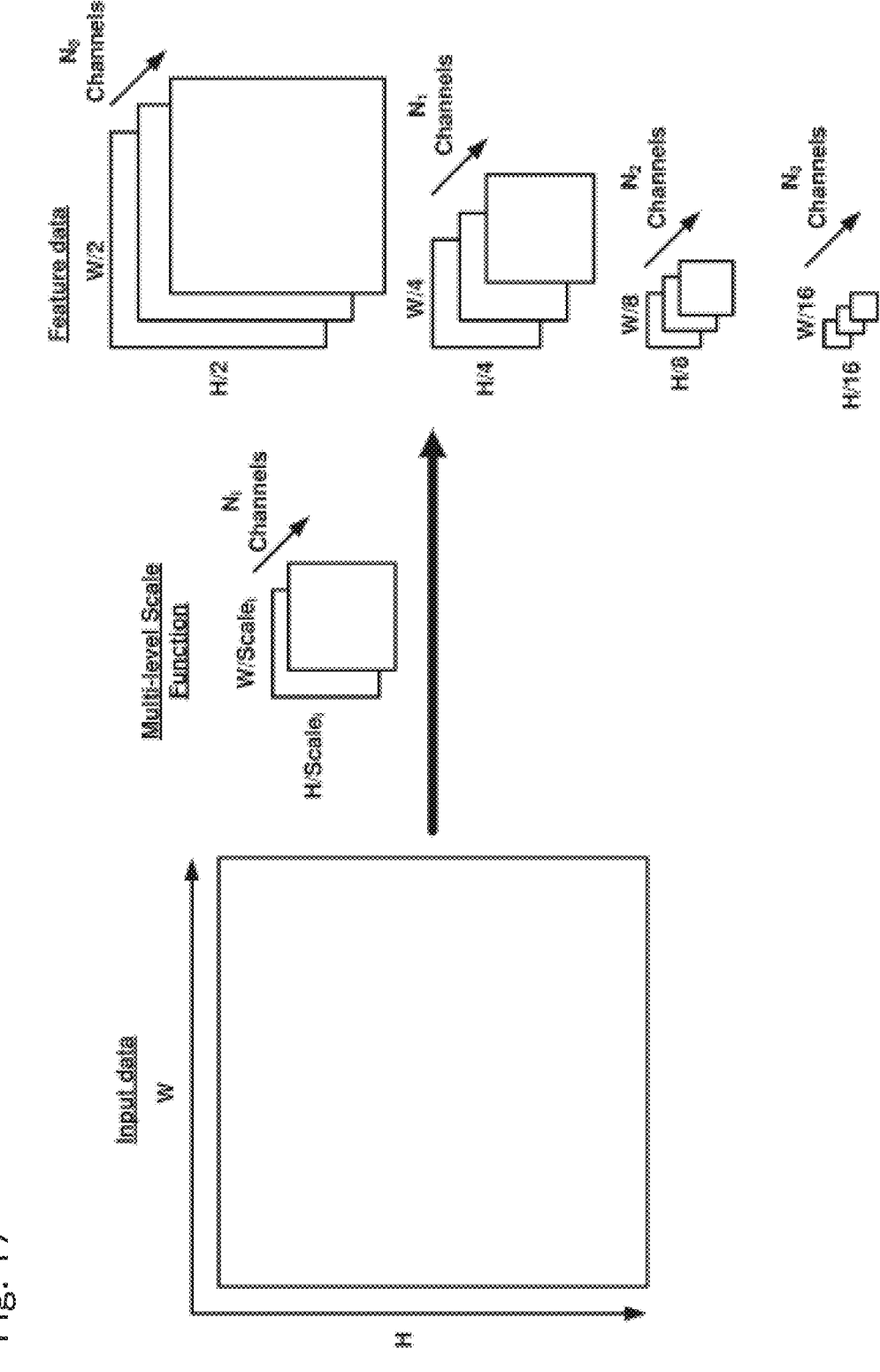
FIG. 17 is a conceptual diagram illustrating an examples of generating feature data in accordance with techniques which may be utilized with one or more techniques of this disclosure.

As described above, for explanation purposes, in some cases, the techniques described herein are described with specific example object detection systems, such as, Detectron2. FIG. 14 illustrates an example where the example image data, feature data, and inference data correspond to Detectron2. That is, in Detectron2, a Feature Pyramid Network (FPN), Base-RCNN-FPN, extracts feature maps from an BGR input image at different scales. It should be noted that for the sake of brevity a complete description of Detectron2 is not provided herein. However, Medium, Hiroto Honda, "Digging into Detectron 2—parts 1-5, Jan. 5, 2020-Jul. 7, 2020 provides an overview of Detectron2. Detectron2 generates features maps at ¼ scale, ⅛ scale, 1/16 scale, 1/32 scale, and 1/64 scale and at each scale 256 channels are output. That is, as described above, data is generated for each of 256 instances of kernels at each scale. In the particular, in the example of Detectron2 at each scale, one or more convolutions and operations are performed to generate feature data (e.g., 7×7 convolution with stride=2 and max pooling with stride=2). FIG. 17 is a conceptual diagram illustrating a general example of generating feature data. As illustrated in FIG. 17, for input data having a width, W, and a height, H, at each scale (i.e., ½ scale, ¼ scale, ⅛ scale, and 1/16 scale), there are a corresponding number of output channels $N_i$ of feature data. Further, at each scale, feature data may be generated according to one or more autoencoding techniques. For example, one or more of the autoencoding techniques described above. As described above, the particular autoencoding techniques may be specified according to a backbone model. The techniques described herein are generally applicable to compressing feature data regardless of the number of scales and number of output channels and/or techniques used to generate feature data.

In some cases, generated feature data may include data which is redundant and/or does not contribute significantly to the output. That is, some feature data may not significantly contribute to the subsequent generation of inference data. For example, referring to the example illustrated in FIG. 17, for some input data sets, numerous channels of the ½ scale feature data (and/or the ¼, ⅛, 1/16 scale feature data) may not significantly contribute to the subsequent generation of inference data. That is, in this case, the feature data from the other scales may provide a more significant contribution to inference data generation. For example, when inference data includes a bounding box only a subset of feature data may be needed for a particular inference data generation method to generate a particular bounding box. Thus, in these cases, according to the techniques herein, feature data may be compressed without degrading the overall performance of object detection for particular input data. As described in detail below, in one example, according to the techniques herein, channels of feature data may be pruned. It should be noted, that although, in some cases, redundant and/or insignificant feature data may be removed by modifying a backbone network, for example, by removing a stage from a backbone network, such an approach may be less than ideal. That is, for example, as described above, common/standardized backbone networks may be implemented and modification of such backbone networks may not be possible and/or practical, depending on the particular application. That is, for example, modifying a backbone network may require significant retraining and/or finetuning of the backbone network (and/or the inference network) to maintain overall performance. In other cases, modifying the backbone network may compromise future extensibility (i.e., the ability to use the same backbone output for a future task). Further, it should be noted that input data may vary significantly. For example, video clips depicting particular scenes may vary significantly (e.g., one large slow moving object vs. several small fast moving objects) and it may not be possible and/or practical to develop a backbone network that does not generate redundant feature data for at least some variations of input data.

As described above, in one example, according to the techniques herein, channels of feature data may be pruned. Pruning redundant and/or insignificant feature data may be particularly useful for compressing feature data for distribution over a communications network. That is, for example, referring to FIG. 16, according to the techniques herein compression engine 1100 may be configured to prune feature data according to one or more of the techniques described herein (e.g., to form a bitstream) such that less data is required to be transmitted across a communications network. Decompression engine 1200 may be configured to perform operations that are reciprocal to pruning operation to reconstruct the feature data for subsequent processing. As described above, some feature data may be redundant and/or contribute insignificantly to the generation of an output and as such, can be pruned (and reconstructed) while negligibly degrading the system performance (e.g., object detection performance).

In one example, according to the techniques herein, compression engine 1100 may be configured to determine which channels (or scales) to prune according to one or more of the algorithms described herein. Further, in one example, compression engine 1100 may be configured to signal which channels have been pruned. For example, with respect to the example of Detectron2, where a backbone network generates features data including 256 channels at ¼ scale, ⅛ scale, ¹⁄₁₆ scale, ¹⁄₃₂ scale, and ¹⁄₆₄ scale, compression engine 1100 may be configured to signal 256 bits for each scale (i.e., 1280 bits (256 bits×5 scales)) and a value (i.e., 1 or 0) corresponding to a channel may indicate whether a channel has been pruned, i.e., is not included in the feature data. It should be noted that in some examples, signaling bits may be encoded to reduce the amount of signaling data. For example, by using run-length coding or the like. In one example, decompression engine 1200 may be configured to pad zeros to pruned channels. In other examples, decompression engine 1200 may be configured to insert other values to pruned channels (e.g., median, a mean value, a calculated value for a channel, etc.). Further, in one example, compression engine 1100 may be configured to signal a data value (or a set of data values) which is to be inserted into pruned channels. Further, in one example, each of compression engine 1100 and decompression engine 1200 may store a look up table of data sets and compression engine 1100 may signal an index into the lookup table. The decompression engine 1200 may determine the data set to be inserted into pruned channels based on the stored lookup table and the received index.

As described above, compression engine 1100 may be configured to determine which channels to prune according to an algorithm. In one example, compression engine 1100 may be configured to prune a channel, when all tensor values (or a significant number of tensor values) in the channel are less than a threshold. For example, for feature data (e.g., feature data for a scale) having a tensor x[C, H, W], where C is number of channels, H is height, W is width, for a threshold of T, an example pruning algorithm may be as follows:

```
count[1..C] = 0
for c = 1 to C do
  for h = 1 to H do
    for w = 1 to W do
      if x[c, h, w] > T
        count[c] += 1
  if count[c] == 0
    prune channel c
```

It should be noted that the algorithm above provides a logical expression of the criteria for pruning and there may be numerous ways to implement such an algorithm to achieve computational efficiency. For example, the algorithm can be written in Pytorch as follows:

```
x_max = torch.max(x, dim = (1,2))
for c = 1 to C do
prune channel c if x_max[c] < T
Where x has a shape of [C, H, W], and x_max has a shape of [C].
```

It should be noted that PyTorch is an open source optimized tensor library for deep learning using GPUs and CPUs. PyTorch is based on the Torch library. Detailed descriptions of PyTorch functions are provided in detail in PyTorch documentation maintained by its developer Facebook's AI Research Lab (FAIR). The current stable release of PyTorch is v1.9.0, released 15 Jun. 2021. For the sake of brevity, detailed descriptions of PyTorch functions are not provided herein, however, reference is made to PyTorch documentation.

In the example above, if a channel does not contain a tensor value greater than the threshold, T, the channel is pruned. For example, according to the example algorithm above, for example feature data including 256 channels at an example scale, x[256, 20, 40], and a threshold, T=5.0 for channels 1 to 256, if all 800 (20×40=800) tensor values in the given channel are all smaller than 5.0, then the channel is pruned. As described above, compression engine 1100 may be configured to prune a channel, when all or a significant number of tensor values in the channel are less than a threshold. In the case where a channel is pruned if a significant number, M, of tensor values in the channel are less than a threshold, the following in the algorithm above:

```
if count[c] == 0
  prune channel c
``` may be modified as follows:

```
if count[c] < M
  prune channel c
```

In one example, compression engine 1100 may be configured to prune a predetermined number of channels based on a ranking. For example, compression engine 1100 may be configured to rank/sort channels based on the number of tensor values greater than a threshold in a channel and prune a number of channels having the fewest number of tensor values greater than the threshold. For example, for feature data having a tensor x[C, H, W], where C is number of channels, H is height, W is width, threshold of T, an example pruning algorithm may be as follows:

```
count[1..C] = 0
for c = 1 to C do
  for h = 1 to H do
    for w = 1 to W do
      if x[c, h, w] > T
        count[c] += 1
sort count[1..C] in ascending order
prune first N channels
```

It should be noted that the algorithm above provides a logical expression of the criteria for pruning and there may be numerous ways to implement such an algorithm to achieve computational efficiency. For example, the algorithm can be written in Pytorch as follows:

```
x_threshold = (x > T).float( )
x_count = torch.sum(x_threshold, dim = 0)
sort and prune first N channels
Where x has a shape of [C, H, W], and x_max has a shape of [C].
```

For example, according to the example algorithm above, for example feature data including 256 channels at an example scale x[256, 20, 40], and a threshold, T=5.0 and a number of channel to be pruned, N=3 for channel 1 to 256, all 800 (20×40=800) tensor values are compared with the threshold 5.0, and number of tensor values greater than 5.0 are counted, the channels are sorted according to the count and the bottom 3 channels that have the least number of tensor values greater than the threshold are pruning.

It should be noted that for a feature map tensor with C channels, if a target bit savings is m percent, then number of channels to prune is N=C*m/100. For example, for a feature map tensor x[256, 20, 40] and a target bit saving of 5%, the number of channels to prune is N=256*5/100=13 (12.8, roundup). It should be noted that there may be a tradeoff between bit savings and performance.

In one example, compression engine 1100 may be configured to rank/sort channels based on the a statistic corresponding to tensor values in a channel. For example, compression engine 1100 may be configured to determine a standard deviation of tensors values in a channel and prune a number of channels having the smallest standard deviation. For example, for feature data having a tensor x[C, H, W], where C is number of channels, H is height, W is width, threshold of T, an example pruning algorithm may be as follows:

```
s[1..C] = 0
for c = 1 to C do
  s[c] = std(x[c, 1..H, 1..W])
sort s[1..C] in ascending order
prune first N channels
where, std(x) returns the standard deviation of elements in x.
```

For example, according to the example algorithm above, for example feature data including 256 channels at an example scale x[256, 20, 40] and a number of channel to be pruned, N=3 for channel 1 to 256, a standard deviation of the tensor values in the channel is calculated, the channels are sorted according to the calculated standard deviations and the bottom 3 channels that have the smallest standard deviation are pruned. It should be noted that in one example, similar to the example described above, the standard deviation of a channel may be compared to a threshold and if the standard deviation is not greater than a threshold, the channel may be pruned. In this manner, one or more statistics of a channel may be compared to respective threshold and if one (or all, or a significant number of) of the statistics is not greater than the threshold the channel is pruned.

Figure 18:
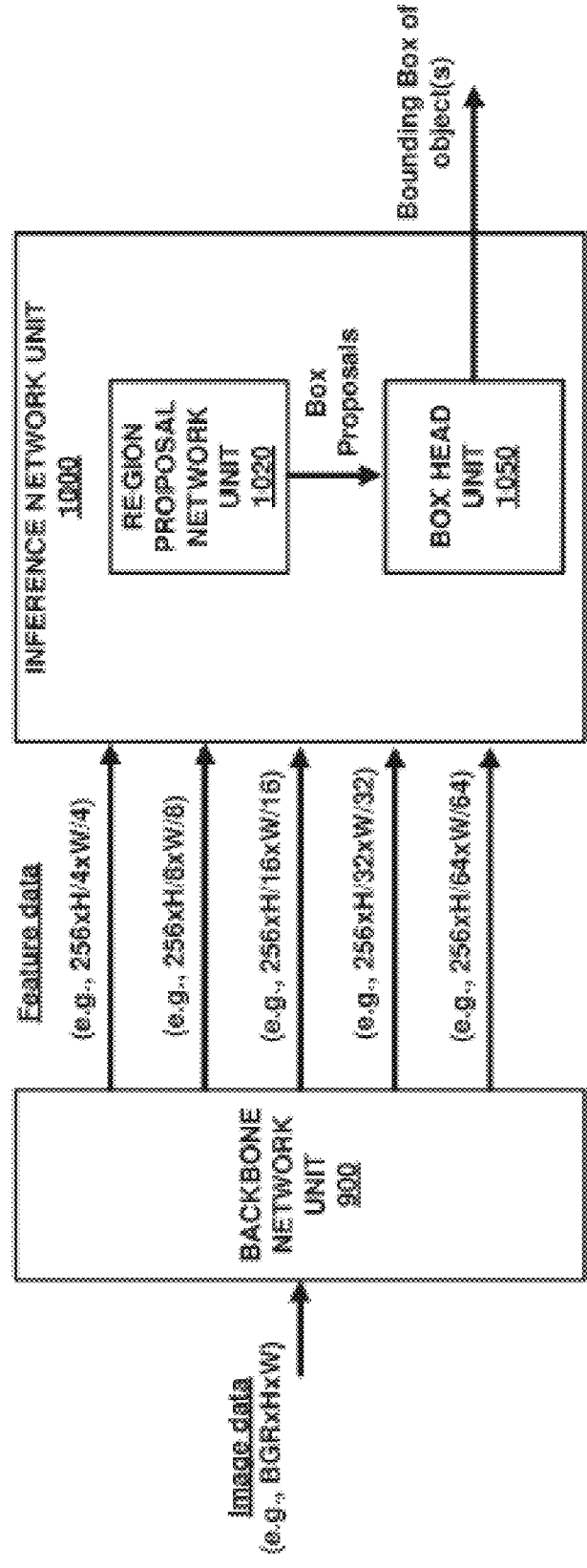
FIG. 18 is an example of a coding system that may encode a multi-dimensional data set in accordance with one or more techniques of this disclosure.
Figure 19:
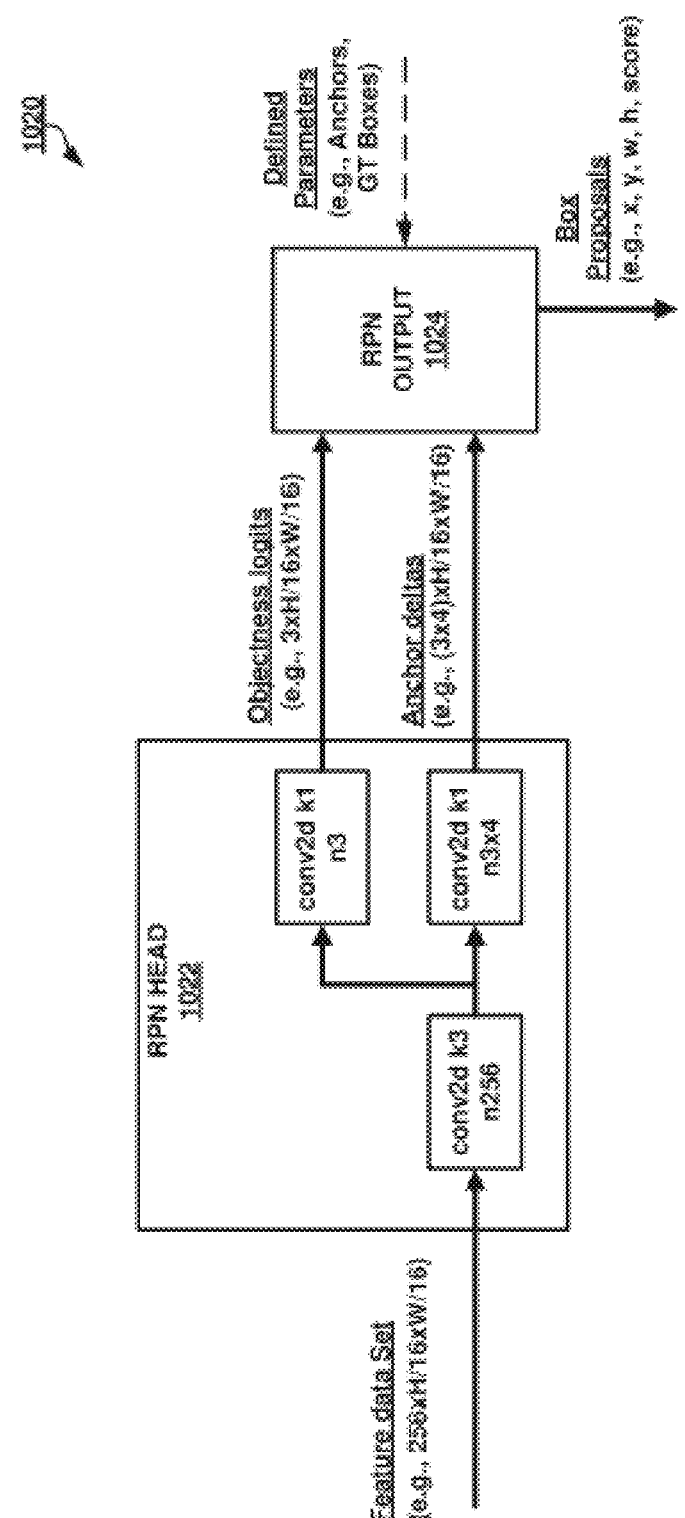
FIG. 19 is an example of a region proposal network in accordance with one or more techniques of this disclosure.

As described above, an inference network, (e.g, inference network unit 1000) receives feature data and generates inference data. With respect to Detectron2, and in general, in some examples, an inference network, may be described as including a region proposal network and sub-classes of ROI (regions of interest) heads, which may generally be referred to as a box head. FIG. 18 illustrates the coding system of FIG. 16 with inference network unit 1000 including region proposal network unit 1020 and box head unit 1050. Region proposal network unit 1020 may be configured to perform region proposal network functions, including for example, those described in Detectron2. In Detectron2, a region proposal network receives the features maps at ¼ scale, ⅛ scale, 1/16 scale, 1/32 scale, and 1/64 scale, each having 256 channels, as described above, and outputs 1000 box proposals (which is set as a default) with confidence scores. That is, each of the 1000 box proposals, includes an anchor coordinate, a height, a width, and a score. In general, a region proposal network in Detectron2 can be described as including a RPN head and an RPN output. FIG. 19 illustrates an example of region proposal network 1020 including RPN head 1022 and RPN output 1024. In Detectron2, for each feature scale, an RPN head generates objectness logits and anchor deltas. Objectness logits are a probability map of object existence and anchor deltas are a relative box shape and position to anchors. As illustrated in FIG. 19, an initial conv2d k3 n256 operation is performed on a feature map. To generate objectness logits a conv2d k1 n3 is performed after the initial conv2d k3 n256 operation. To generate anchor deltas a conv2d k1 n3×4 is performed data after the initial conv2d k3 n256 operation. As illustrated in FIG. 19, RPN output 1024 receives objectness logits and defined parameters including e.g., anchors and ground truth boxes, and generates box proposals. In Detectron2, the generation of box proposals includes anchor generation, ground truth preparation, loss calculation, and proposal selection. Essentially, in Detectron2, the output feature maps of the objectness logits and anchor deltas are associated with ground truth boxes to generate predicted boxes which are scored and the top 1,000 scored boxes are selected as output.

Figure 20:
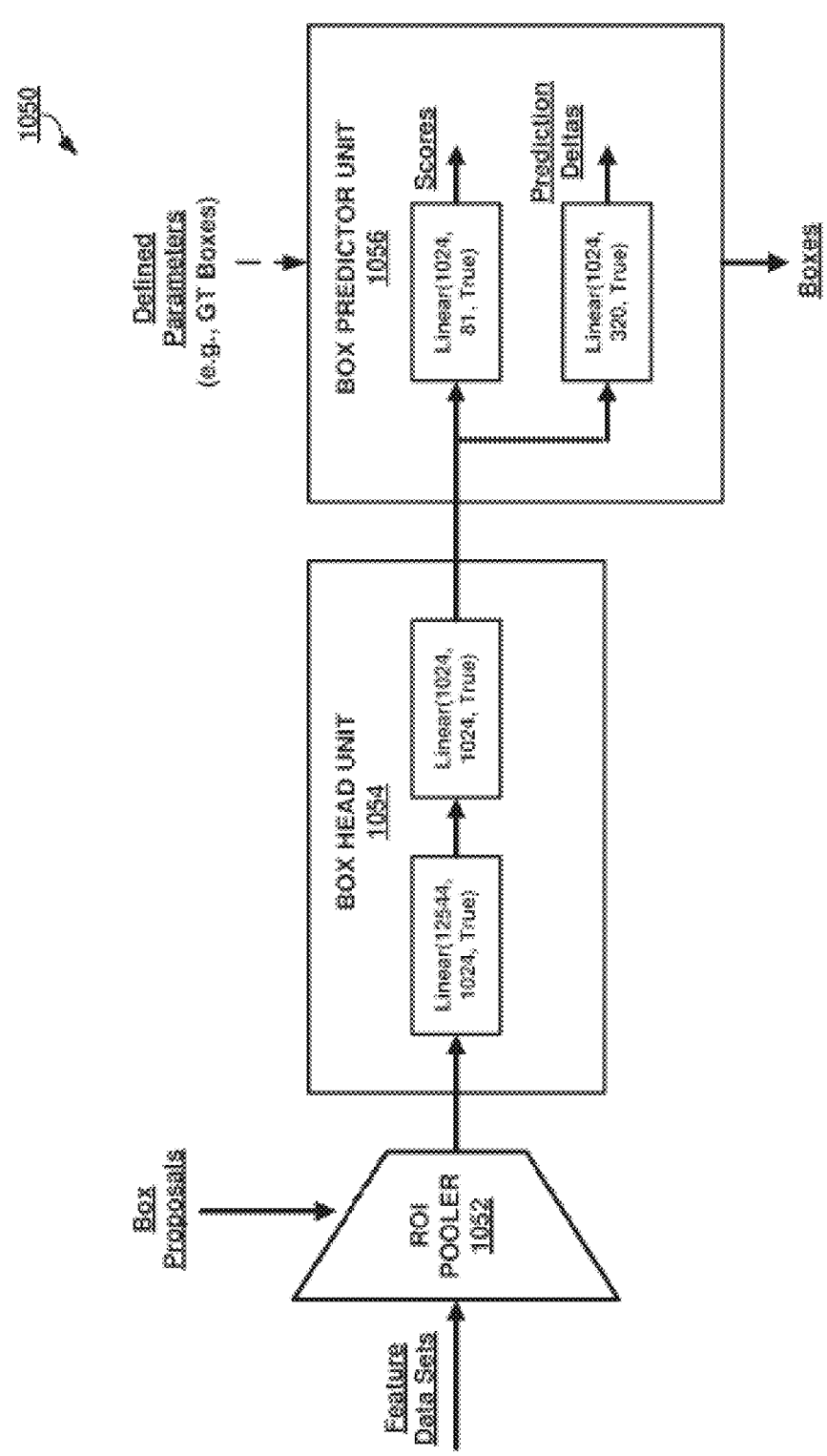
FIG. 20 is an example of a box head in accordance with one or more techniques of this disclosure.

As described above, an inference network may include a box head unit. In general, a box head in Detectron2 can be described as including a ROI pooler, a box head, and a box predictor. FIG. 20 illustrates an example of box head unit 1050 including ROI Pooler 1052, box head unit 1054, and box predictor unit 1056. In Detectron2, an ROI pooler pools the rectangular regions of the feature maps that are specified by the box proposals. Essentially, an ROI pooler, generates a tensor which is the collection of cropped instance features which include balanced foreground and background ROIs. In Detectron2, this tensor may have a size of [Nxbatch size, 256, 7, 7], where the ROI size is 7×7. In Detectron2, a box head may be a FastRCNNConvFCHead and a box predictor may be a FastRCNNOutputLayers. It should be noted that an ROI may generate tensors of other sizes. It should be noted although not shown in FIG. 20, prior to input into box head unit 1054, the tensor generated from ROI pooler is flattened to a 256×7×7=12,544 tensor.

As illustrated in FIG. 20, box head unit 1054 performs two Linear( ) operations. A Linear( ) operation is specified as follows:

Linear (in_features_count, out_features_count, bias)
Applies a linear transformation to the incoming data:

$$y = xA^T + b$$

Parameters
  in_features—size of each input sample
  out_features—size of each output sample
  bias—If set to False, the layer will not learn an additive
    bias. Default: True
Shape
  Input: (N, *, $H_{in}$) where * means any number of additional
    dimensions and Hin=in_features
  Output: (N,*,Hout) where all but the last dimension are
    the same shape as the input and Hout=out_features.
Variables
  ~Linear.weight—the learnable weights of the module of
    shape (out_features, in_features). The values are ini-
    tialized from U (−sqrt{k}, sqrt{k}), where k=1/in_fea-
    tures, and sqrt{ } is a square root operation
  ~Linear.bias—the learnable bias of the module of shape
    (out_features). If bias is True, the values are initialized
    from U (−sqrt{k}, sqrt{k}), where k=1/in_features
  Box head unit 1054 classifies an object within an ROI and fine-tunes the box position and shape. Box predictor unit 1056 generates classification scores and bounding box predictors. The classification scores and bounding box predictors may be used to output bounding boxes. Typically, in Detectron2, a maximum of 100 bounding boxes are filtered out using non-maximum suppression (NMS). It should be noted the maximum number of bounding boxes is configurable and it may be useful to change the number depending on a particular application.

Figure 21:
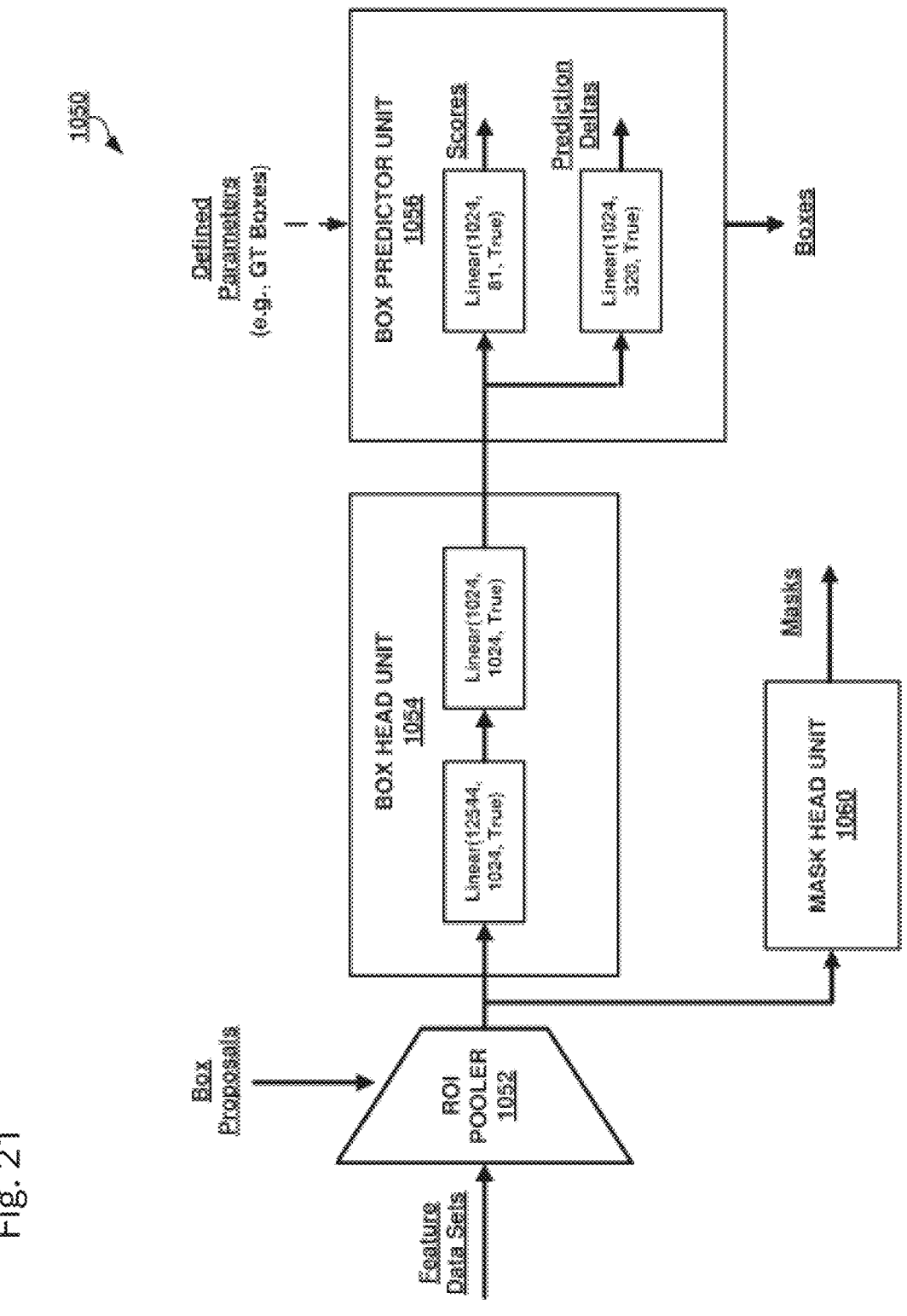
FIG. 21 is an example of a box head in accordance with one or more techniques of this disclosure.

As described above, in Detectron2, inference data includes bounding boxes. In some applications, it may be useful to have so-called instance segmentation information, which may, for example, provide a per-pixel classification for a bounding box. That is, instance segmentation information may indicate whether a pixel within a bounding box constitutes part of the object. Further, instance segmentation information may, for example, include a binary mask for a ROI. As described above, with respect to the example in FIG. 20, an ROI pooler essentially generates tensors which are the collection of cropped instance features and these tensors may be input a FastRCNNConvFCHead box head. In other implementations, where generation of semantic segmentation information is useful, a so-called mask head including, for example, a Mask R-CNN, may operate in parallel with a FastRCNNConvFCHead box head or the like. FIG. 21 illustrates an example where box head 1050 illustrated in FIG. 20 additionally includes mask head unit 1060. Mask head unit 1060 essentially receives a collection of cropped instance features and generates segmentation masks for an ROI. Mask head unit 1060 may be configured to generate masks, according to a mask head, e.g., Mask R-CNN. It should be noted, that as provided above, box head 1050 is a general term for sub-classes of ROI (regions of interest) heads. Thus, a mask head may be considered a sub-class of a ROI head. Further, as described above, an ROI pooler may generate tensors of other sizes than a [Nxbatch size, 256, 7, 7], where the ROI size is 7×7. With respect to a tensor input into mask head unit 1060, this tensor may have a size of [Nxbatch size, 256, 14, 14], where the ROI size is 14×14. Further, it should be noted that channel count C, height H, and width W are all configurable parameters for a ROI pooler.

Figure 22:
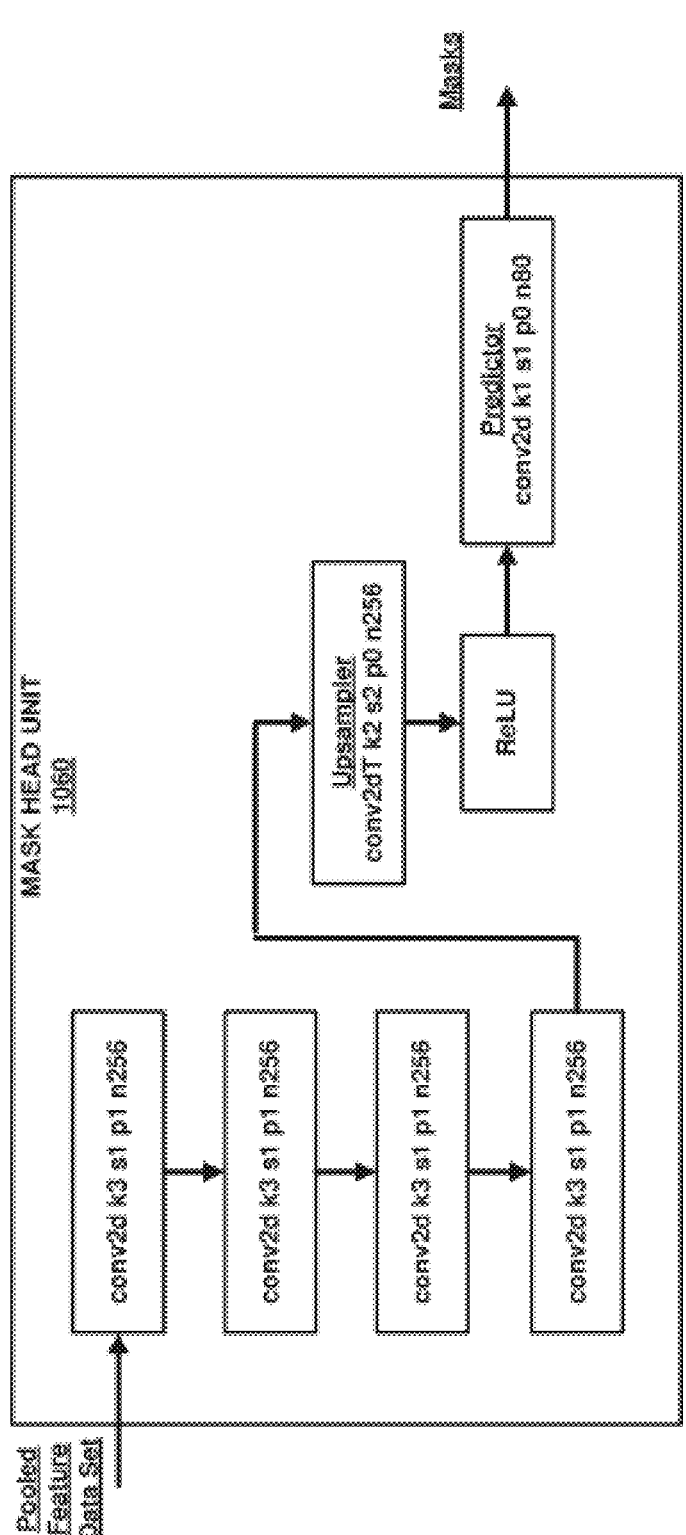
FIG. 22 is an example of a mask head in accordance with one or more techniques of this disclosure.

FIG. 22 illustrates an example of a mask head unit 1060. As illustrated in FIG. 22, mask head unit 1060 performs four successive conv2d k3 s1 p1 n256 operations prior to a conv2dT k2 s2 p0 n256 upsampling operation being performed. Further, in the example illustrated in FIG. 22, ReLU refers to an operation where ReLU (x)=max (0, x). That is, if an output is negative, it is set to 0. Finally, a conv2d k1 s1 p0 n80 predictor operation generates masks. Thus, as illustrated in FIG. 22, mass are made with a final 1×1 convolution layer with n80 specifying a number of classes.

Figure 23:
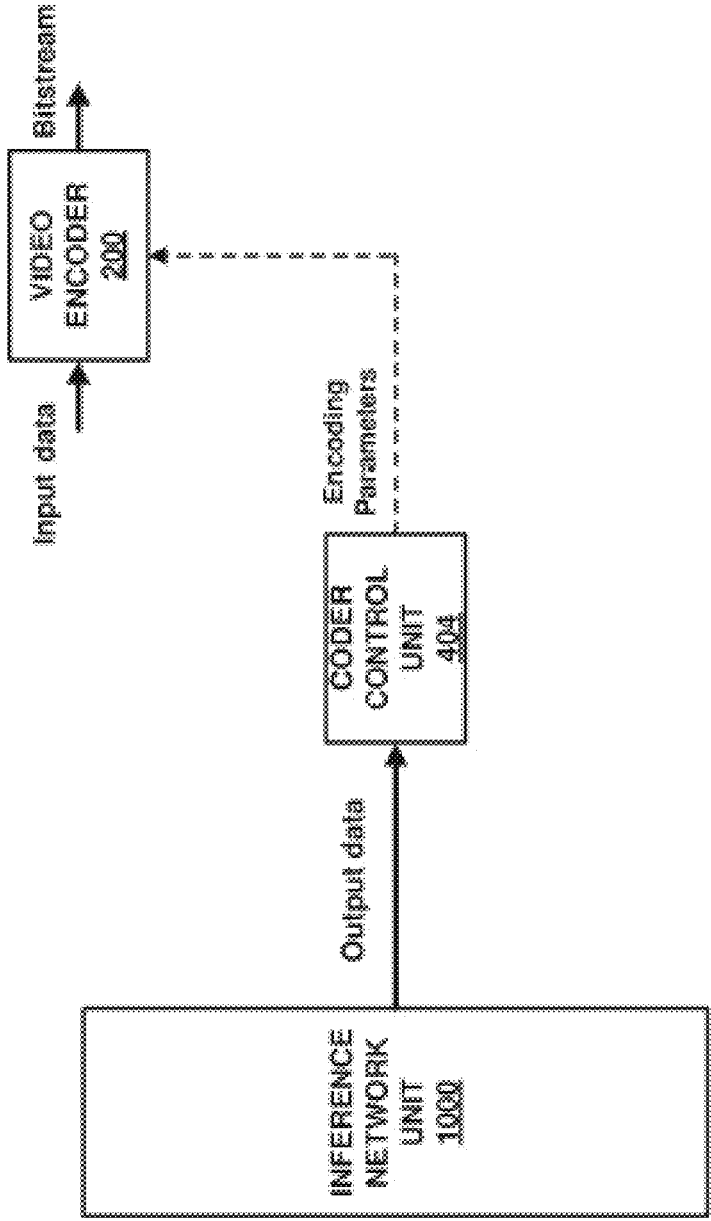
FIG. 23 is an example of a coding system that may encode a multi-dimensional data set in accordance with one or more techniques of this disclosure.

As described above, inference data (e.g., spatial locations of objects within an image) may be used to optimize encoding of video data, (e.g., adjust coding parameters to improve relative image quality in regions where objects of interest are present and the like). FIG. 23 illustrates an example where output data output by inference network unit 1000 is input into coder control unit 404 for generating encoding parameters for video encoder 200. As further described above, there may be several ways to compress/decompress feature data for communication over a communications network, e.g., quantization, channel pruning, etc. In addition to directly compressing feature data (e.g., by channel pruning), there may be several ways to compress the amount of data required to be transmitted across a communications network. In one example, according to the techniques herein, the amount of feature data may be reduced by reducing the amount of input data processed by an autoencoder, e.g., a backbone network. That is, referring to the example in FIG. 16, the amount of feature data input into compression engine 1100 may be reduced (resulting in the generated bitstream being reduced) by reducing the amount of input data input into backbone network unit 900. For example, according to the techniques herein, in the case of video data, video data may be temporally downsampled prior to processing by a backbone network. For example, every X pictures (e.g., 10) may be input into a backbone network. For example, in the case of 60 Hz video, instead of 60 pictures of being input every second, 6 pictures may be input every second. In another example, pictures in a sequence may be partitioned into groups and each group is assigned a group ID. For each group, a different process may be used for temporal downsampling. For example, a Group 0 may contain pictures with indices 5*m and 5*(m+1)−1, where m=0, 1, 2, . . . k while rest of the pictures belong to Group 1. In one example, only pictures in a group or only a subset of pictures within a group's pictures may be processed by the backbone. In one example, for the example group assignment processes described above, the group assignment for pictures with indices greater than 5*(k+1)−1 may not be regular, if for example, the number of remaining pictures is below a certain threshold (e.g., 5). In another example, Group 0 may contain pictures with indices 4*m, where m=0, 1, 2, . . . k while rest of the pictures belong to Group 1. The group assignment for pictures with indices greater than 4*k may not be regular, if for example, the number of remaining pictures is below a certain threshold (say, 4).

Figure 24:
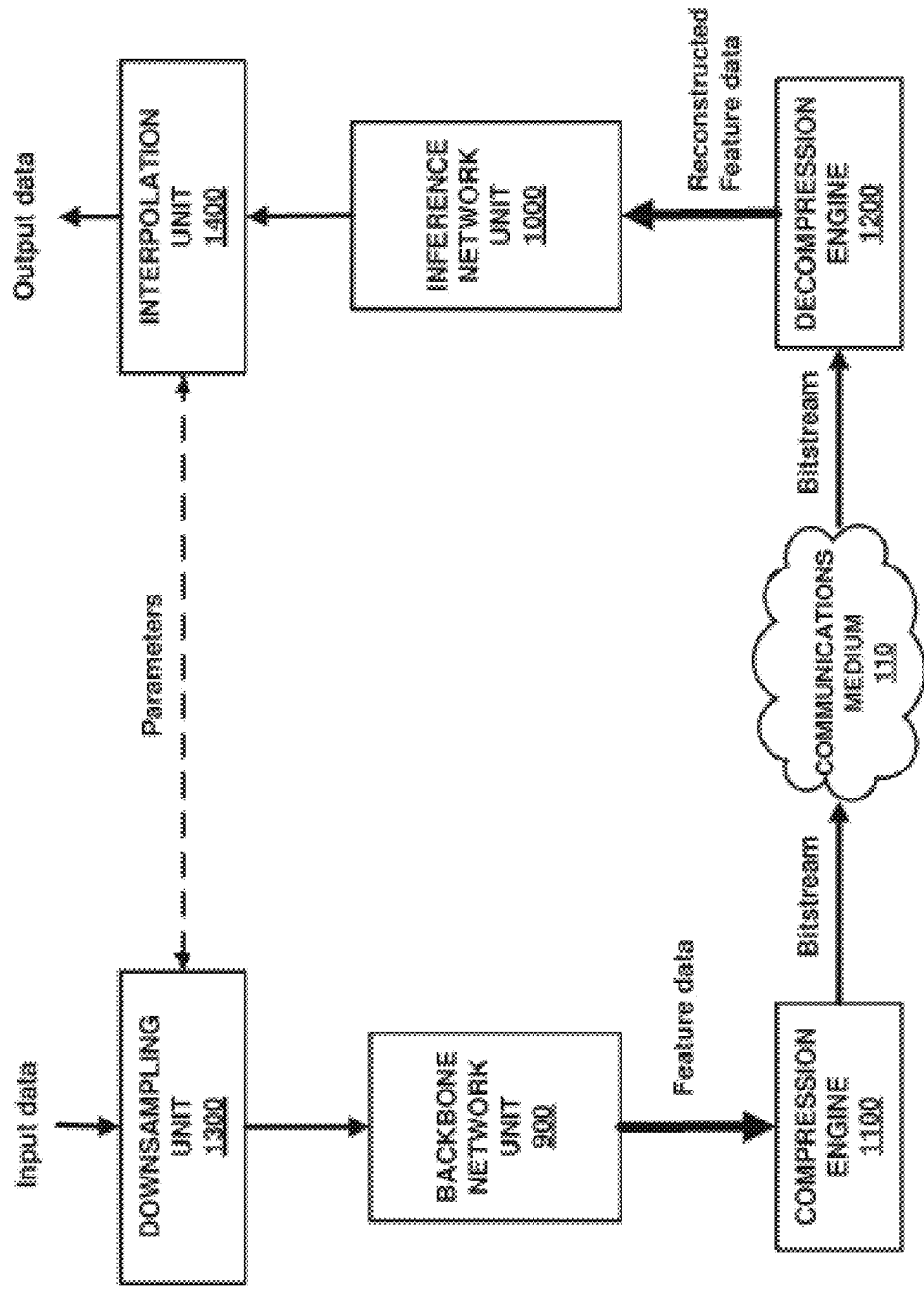
FIG. 24 is an example of a coding system that may encode a multi-dimensional data set in accordance with one or more techniques of this disclosure.

FIG. 24 illustrates an example where the coding system illustrated in FIG. 16 additionally includes downsampling unit 1300 and interpolation unit 1400. Downsampling unit 1300 is configured to downsample input data. For example, as described above, downsampling unit may be configured to temporally downsample video data at a fixed interval. It should be noted that in addition to reducing feature data, for some implementations, temporally downsampling input data may reduce the processing requirement and thus, increase the throughput of backbone network 900.

Interpolation unit 1400 is configured to interpolate inference data corresponding to information removed due to downsampling information. For example, in an example of video data, where feature data is generated such that inference data includes a bounding box for every picture input into backbone network, interpolation unit 1400 may be configured to interpolate a bounding box for downsampled (i.e., intermediate) picture. In one example, according to the techniques herein, generating (i.e., predicting) an intermediate bounding box may be based on the following equations:

$$x_{intermediate,i} = x_{0,i} + \frac{(t_{intermediate} - t_0)(x_{1,i} - x_{0,i})}{t_1 - t_0}$$

$$y_{intermediate,i} = y_{0,i} + \frac{(t_{intermediate} - t_0)(y_{1,i} - y_{0,i})}{t_1 - t_0}$$

where, i=0.1

$(x_{0,0}, y_{0,0}, x_{0,1}, y_{0,1})$ is bounding box of an object in picture 0, and $(x_{1,0}, y_{1,0}, x_{1,1}, y_{1,1})$ is corresponding bounding box of the object in picture 1. $(x_{0,0}, y_{0,0}, x_{0,1}, y_{0,1})$ and $(x_{1,0}, y_{1,0}, x_{1,1}, y_{1,1})$ may be referred to as reference bounding box.

$t_0$ and $t_1$ are time-instances (e.g. picture count in display order) corresponding to picture 0 and picture 1 respectively $t_{intermediate}$ is time-instance (e.g. picture count in display order) corresponding to intermediate picture.

In one example, correspondence may be establish by: (1) Measuring displacement between each pair of object bounding box from picture 0 and picture 1, and pruning the list of pairs based on a threshold value of displacement; and (2) Identifying a closest bounding box for each bounding box in picture 0 and discarding remaining pairs corresponding to the bounding box in picture 0, where closest can be determined, for example, by spatial displacement and content contained within the bounding box (e.g. object type, SAD between sample of bounding box). In one example, multiple bounding boxes may be chosen from picture 1, e.g., n-closest and averaging/median may be used to get a single representative bounding box in picture 1. It should be noted that interpolation can be extended to be based on M bounding boxes where M is more than two, more generically:

$$x_{intermediate,i} = \frac{1}{M-1} \sum_{m=1,\ldots,(M-1)} x_{0,i} + \frac{(t_{intermediate} - t_0)(x_{m,i} - x_{0,i})}{t_m - t_0}$$

$$y_{intermediate,i} = \frac{1}{M-1} \sum_{m=1,\ldots,(M-1)} y_{0,i} + \frac{(t_{intermediate} - t_0)(y_{m,i} - y_{0,i})}{t_m - t_0}$$

where, picture 0 is the earliest picture amongst all M. In some cases, there may be more than one reference bounding box in a picture.

Thus, for an intermediate bounding box may be generated for one of more downsampled pictures. For example, in an example where 60 Hz video is downsampled to 3 Hz video, a bounding boxes may be interpolated for the 15<sup>th</sup> and 45<sup>th</sup> pictures in the original sequence. Further, in the example, described above, where pictures are downsampled according to a group assignment the interpolation may adapt based on temporal picture distance. For example, interpolation rules may be specified for temporal distance sizes. That is, for a temporal picture distance a number and space between bounding boxes to be interpolated for pictures may be defined. It should be noted that the rate of downsampling and interpolation may be determined based on a desired data compression and/or how interpolation data is being used to modify video encoding. Further, downsampling may be determined based on a desired throughput for a particular backbone network implementation. For example, in a case where interpolation data is being used to ensure a low-level of quantization and/or turn off coarse filtering for a ROI, i.e., to ensure detail is preserved, the rate of downsampling may be relatively high and the rate at which interpolation occurs may be relatively low, i.e., e.g., as described above (60 Hz downsampled to 3 Hz and 15<sup>th</sup> and 45<sup>th</sup> picture interpolated). In another example, in a case where interpolation data is being used for motion prediction the rate of downsampling may be relatively low and the rate at which interpolation occurs may be relatively high. It should be noted that a picture and ROIs therein may be used as a reference during bounding box interpolation and may be used as a reference during inter prediction. In one example, the frequency at which a picture/ROI is used for reference may be used to determine the quality at which the picture is encoded. It should be noted that the frequency may include indirect reference where a picture is used for bounding box interpolation and the interpolated bounding box is used for reference during inter prediction.

It should be noted that information regarding the movement of a bounding box may be used to assist a video encoder in selecting motion vectors for inter prediction. This may improve encoder performance. For example, the process of establishing correspondence between bounding boxes, described above, results in generation of motion vectors between regions of corresponding pictures. In one example, according to the techniques herein, these derived motion vectors can anchor the motion search space used in traditional video coding for regions in the pictures containing the reference bounding boxes and the intermediate/interpolated bounding boxes. In one example, BDOF (i.e., bi-directional optical flow) and/or MVR (motion vector refinement) techniques may be used to search around a corresponding motion vector determined while establishing correspondence between bounding boxes. Further, in one example, a motion vector determined while establishing correspondence between bounding boxes may be added to motion vector predictor list, e.g., a merge list. In a video encoder, motion estimation for a region within a picture may be performed within a reference picture determined by the motion vectors derived while establishing correspondence between bounding boxes.

As described above, discrete convolution may be performed on video data, such a convolution may downsample video in both the spatial and temporal dimensions. Such a process may also be used to reduce feature data prior to input into a compression engine. Further, temporal downsampling may be achieved using pooling. It should be noted that the interpolation techniques described herein may be generally applicable regardless of how temporal downsampling is achieved.

As illustrated in the example of FIG. 24, parameters may be communicated to down-sampling unit 1300 and interpolation unit 1400. Such parameters may include downsampling/interpolation rates. It should be noted that in some examples, a common set of parameters may be stored at each of downsampling unit 1300 and interpolation unit 1400. For example, in one example, downsampling unit 1300 may operate according to a predefined downsampling process and interpolation unit 1400 may operate according to a corresponding predefined interpolation process. Further, in one example, parameters used for downsampling/interpolation may be communicated to each of down-sampling unit 1300 and interpolation unit 1400 out-of-band. For example, a down-sampling rate may be determined based on a communicated interpolation process and vice-versa. Further, in one example, parameters used for downsampling/interpolation may be communicated to each of downsampling unit 1300 and interpolation unit 1400 using the bitstream, i.e., e.g., via multiplexing.

Figure 25:
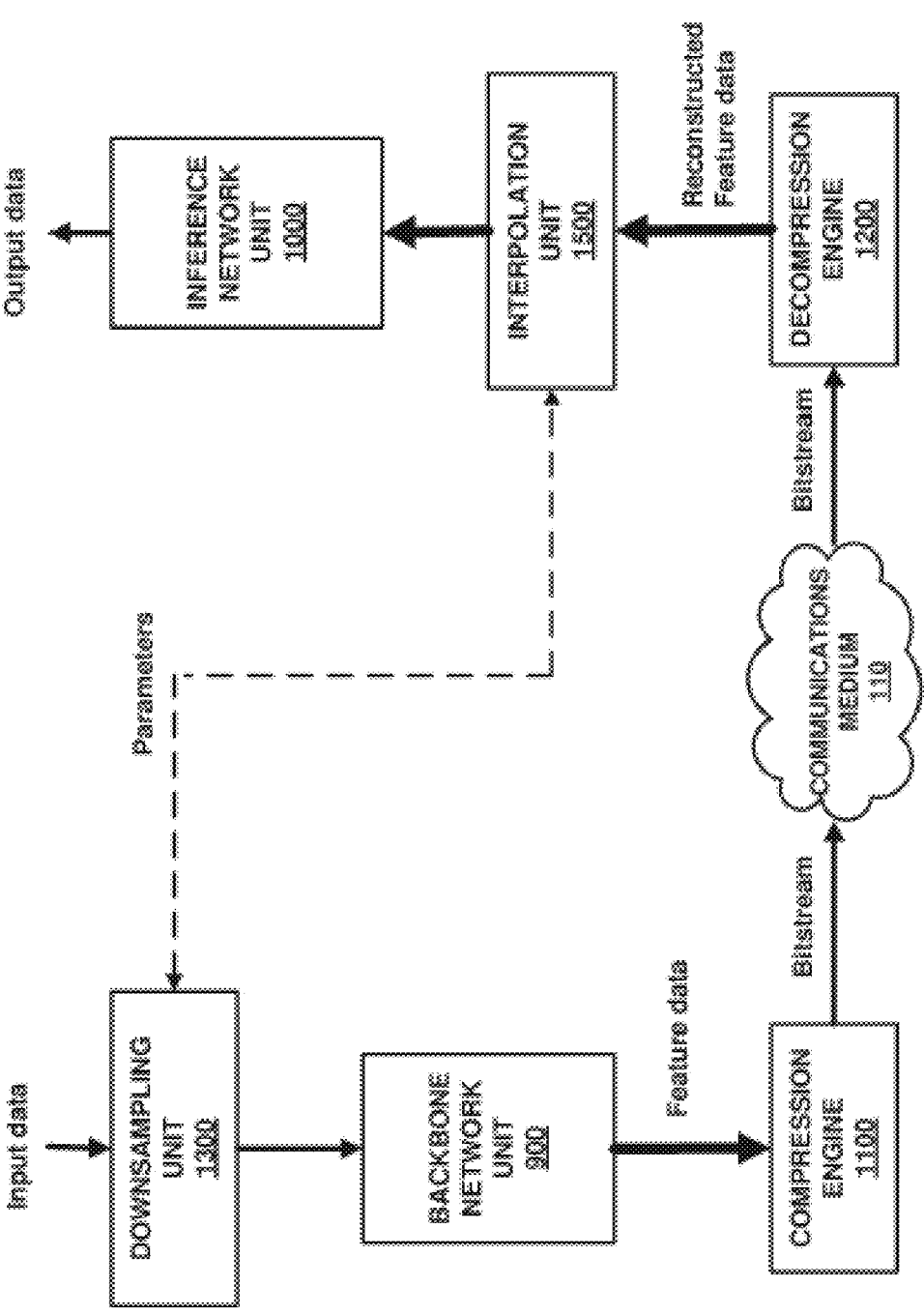
FIG. 25 is an example of a coding system that may encode a multi-dimensional data set in accordance with one or more techniques of this disclosure.
Figure 26:
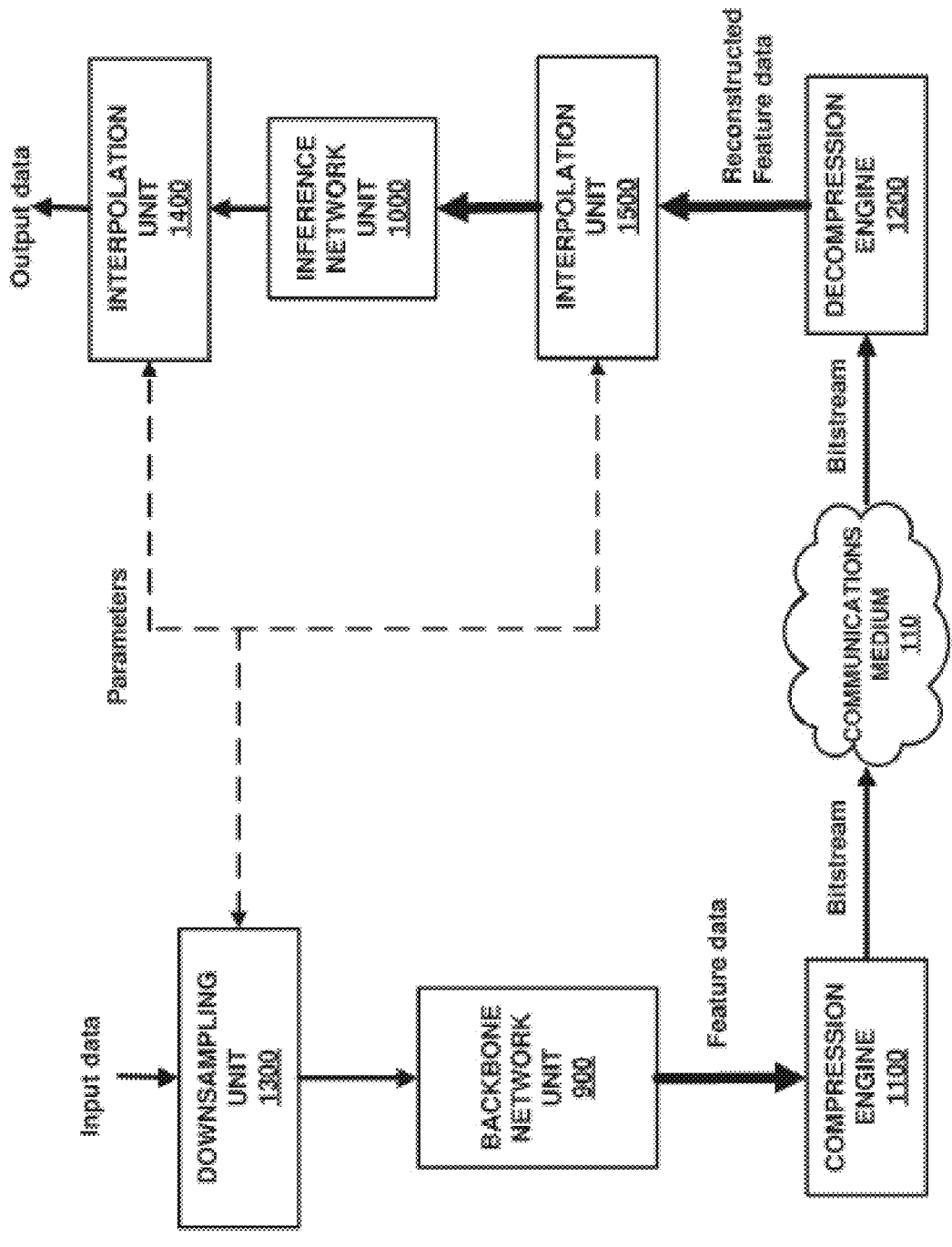
FIG. 26 is an example of a coding system that may encode a multi-dimensional data set in accordance with one or more techniques of this disclosure.

It should be noted that in one example, according to the techniques herein, in addition to and alternatively to performing interpolation on inference data, reconstructed feature data may be interpolated. FIG. 25 illustrates an example where the coding system illustrated in FIG. 16 additionally includes downsampling unit 1300 and interpolation unit 1500. FIG. 26 illustrates an example where the coding system illustrated in FIG. 16 additionally includes downsampling unit 1300, interpolation unit 1400 and interpolation unit 1500. Interpolation unit 1500 is configured to interpolate feature data corresponding to information removed due to downsampling. As described above, for example with respect to FIG. 12, output features maps may be predictively coded in a manner similar to that of video data i.e., using typical video coding techniques. Similarly, typical interpolation techniques used for video coding may be used for interpolating output feature maps, i.e., e.g., Frame rate up-conversion (FRUC) techniques. Further, typical BDOF and MVR techniques may be utilized. Interpolation unit 1500 may be configured to interpolation reconstructed feature data for example using techniques similar to typical video coding interpolation techniques.

As described above, for example, with respect to FIG. 16, a compression engine may be configured to compress feature data and a decompression engine may be configured to perform reciprocal operations to reconstruct the feature data. For example, as described above, a compression engine may be configured to prune feature data and a decompression engine may be configured to perform operations that are reciprocal to pruning operations to reconstruct the feature data for subsequent processing. In one example, according to the techniques herein, channels of feature data may be partitioned into non-overlapping sets (e.g., corresponding to images in a sequence) and the non-overlapping sets may be coded according to joint coding. That is, for example, in the case of 60 Hz video, one second of video may be partitioned into the following non-overlapping sets of pictures [$Pic_0$ . . . $Pic_9$], [$Pic_{10}$ . . . $Pic_{19}$], [$Pic_{20}$ . . . $Pic_{29}$], [$Pic_{30}$ . . . $Pic_{39}$], [$Pic_{40}$ . . . $Pic_{49}$], and [$Pic_{50}$ . . . $Pic_{59}$] and the resulting feature data corresponding to each picture in a set may be jointly coded.

Figure 27:
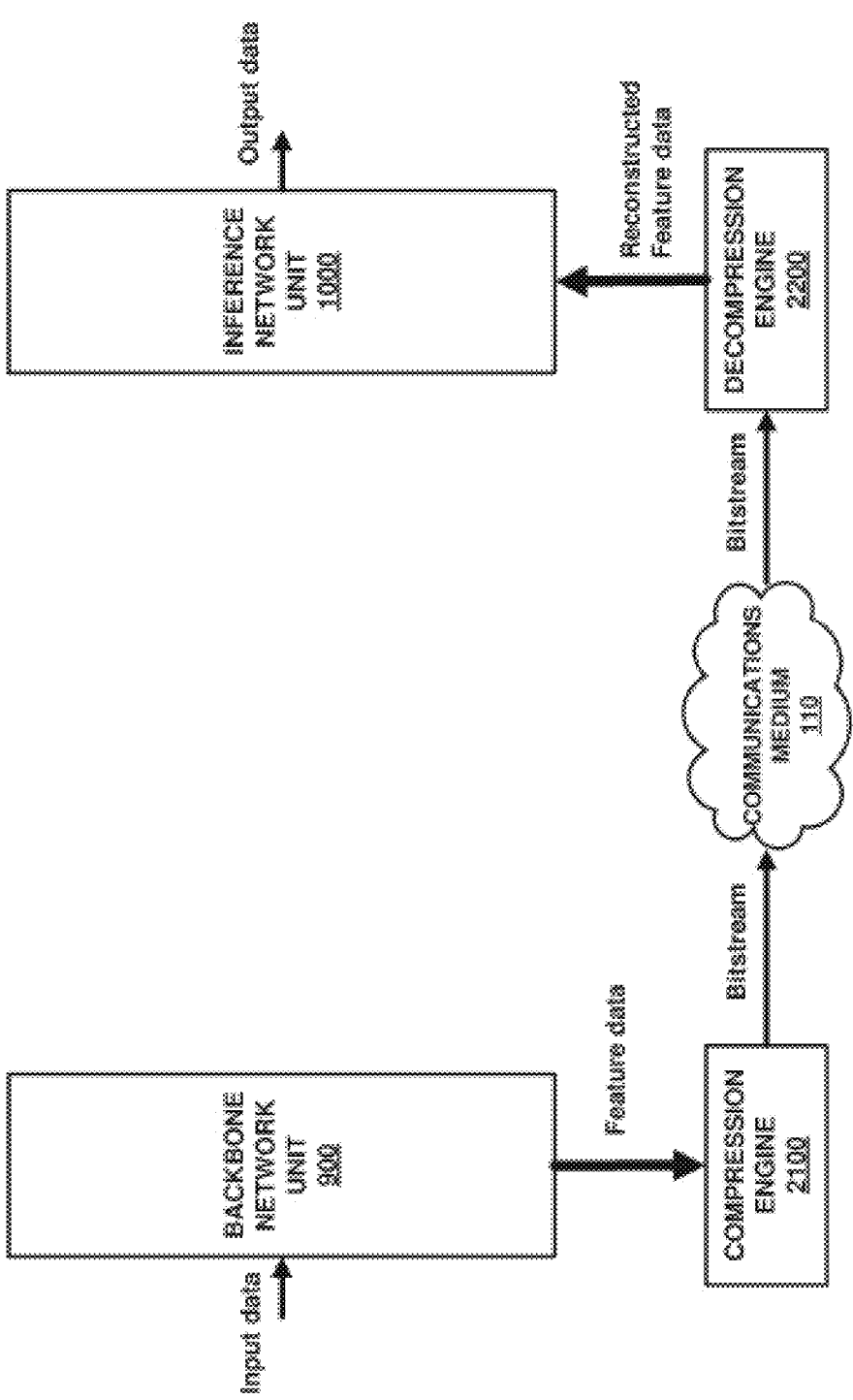
FIG. 27 is an example of a coding system that may code a multi-dimensional data set in accordance with one or more techniques of this disclosure.
Figure 28:
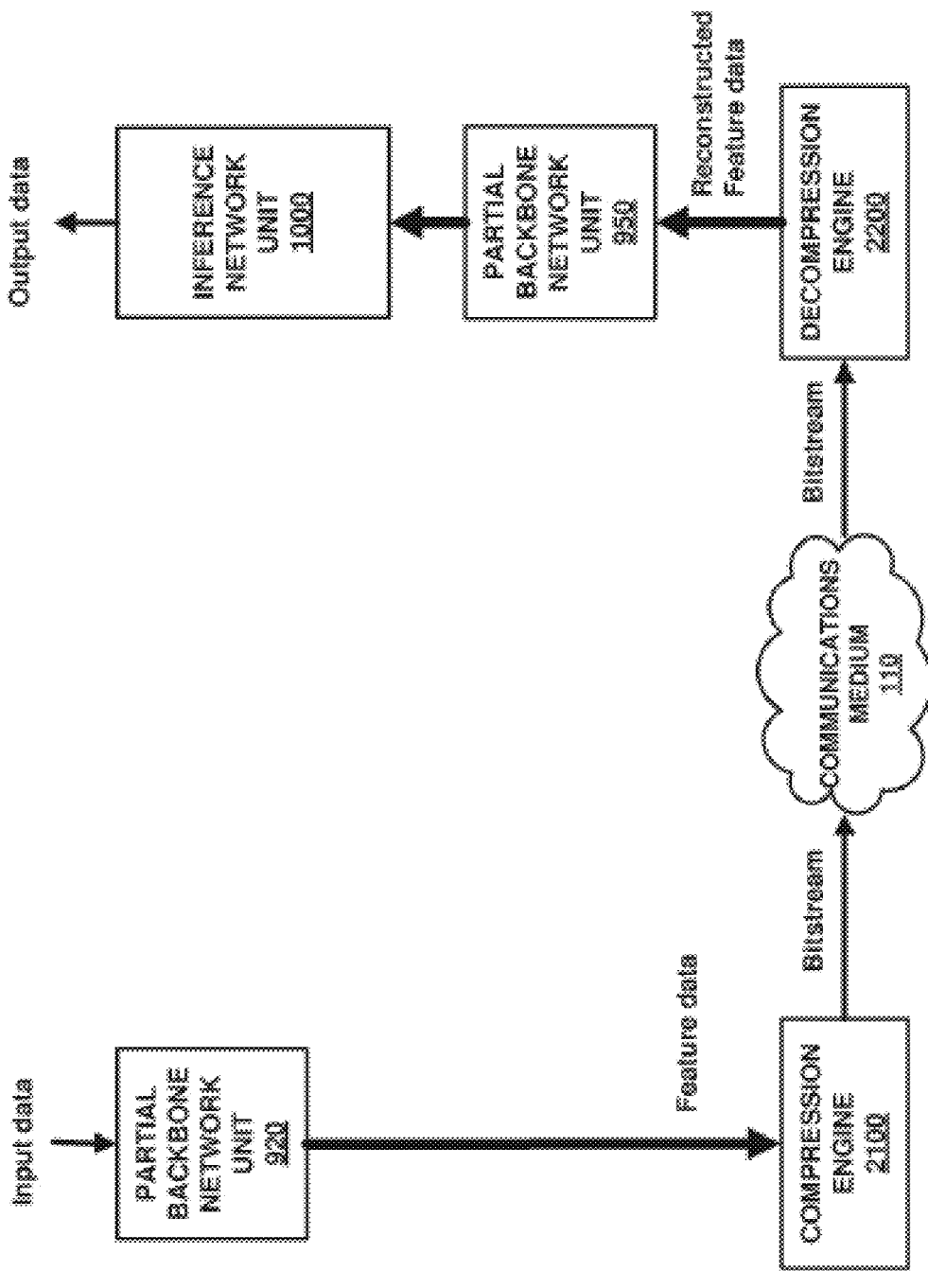
FIG. 28 is an example of a coding system that may code a multi-dimensional data set in accordance with one or more techniques of this disclosure.

FIG. 27 illustrates an example where a system includes compression engine 2100 and decompression engine 2200. Compression engine 2100 may be configured to compress a non-overlapping set of feature data according to joint coding and decompression engine 2200 may be configured perform reciprocal operations to reconstruct the feature data. As described above, a backbone network unit 900 (e.g., ResNet-101-C4, ResNet-101-FPN, Inception-ResNet-v2, Inception-ResNet-v2-TDM, DarkNet-19, ResNet-101-SSD, ResNet-101-DSSD, ResNet-101-FPN, ResNeXt-101-SSD, Darknet53, etc.) may receive image data and generating feature data. As further described above, a backbone network may include stages that include multiple bottlenecks to generate data for a scale. Stages of a backbone network may operate in series, that is, for example, the output of ¼ scale stage may be input into a ⅛ scale stage, the output of a ⅛ scale stage may be input into a 1/16 scale stage, and so on. Further, feature data generated from a stage may be additionally processed. For example, as described above, Base-RCNN-FPN includes up-samplers and a last-level max pool layer. Thus, according to the techniques herein, a backbone network may be partitioned across a communications network. That is, for example, a stage generating feature data may be at one location of a communications network and additional processes may be at another location of a communication network. FIG. 28 illustrates an example where a backbone network is partitioned into two partial backbone networks, partial backbone network 920 and partial backbone network 950. For example, according to the techniques herein, a backbone network (e.g., BaseRCNN-FPN) may be partitioned between the ¼ scale stage (referred to as res2) and the ⅛ scale stage (referred to as res3). That is, referring to FIG. 28, partial backbone network 920 may include processes up to, and including, the generation the ¼ scale data and partial backbone network 950 may include processes subsequent to the generation the ¼ scale data.

Figure 29:
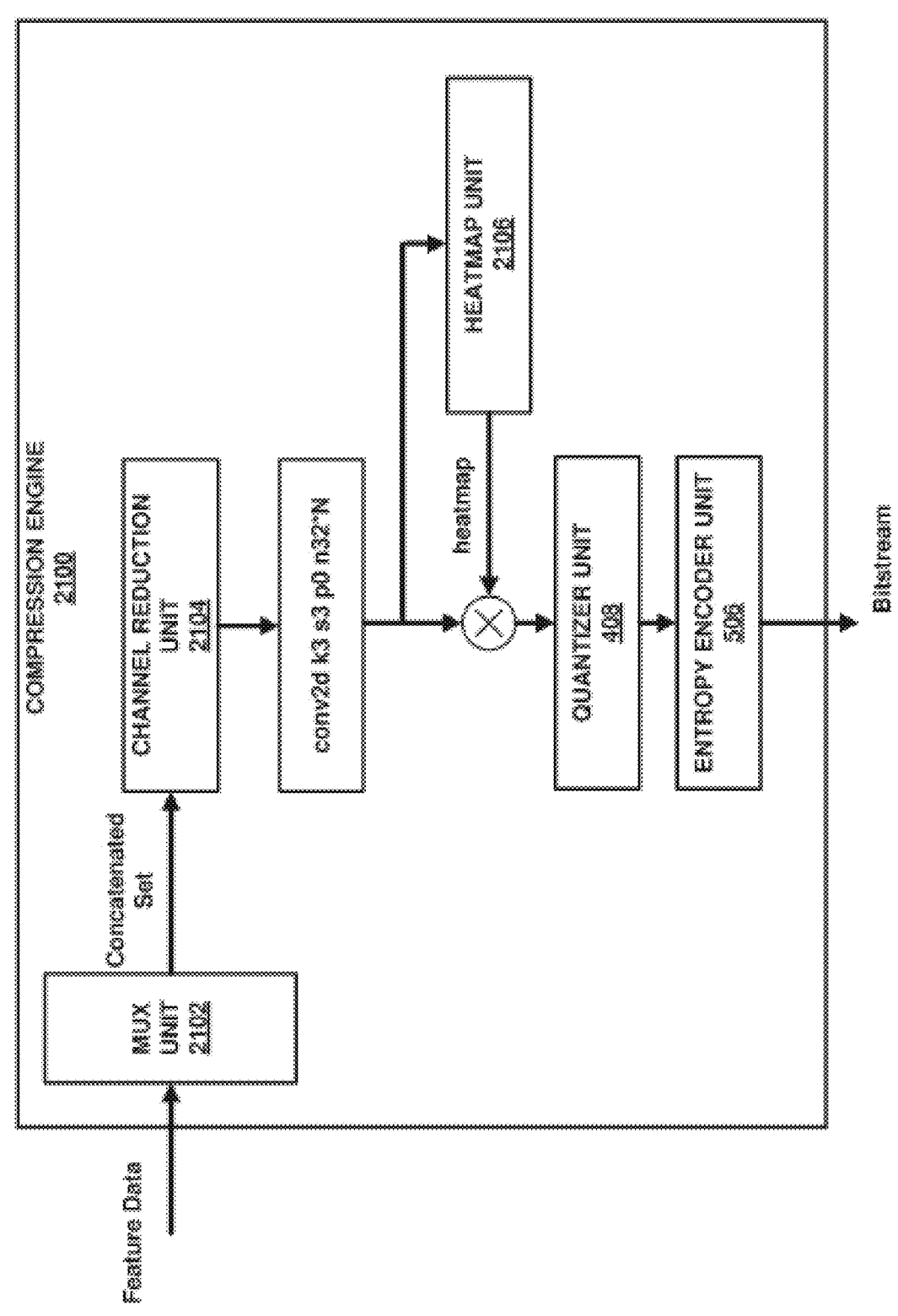
FIG. 29 is a block diagram illustrating an example of a compression engine that may be configured to encode a multi-dimensional data set in accordance with one or more techniques of this disclosure.
Figure 30:
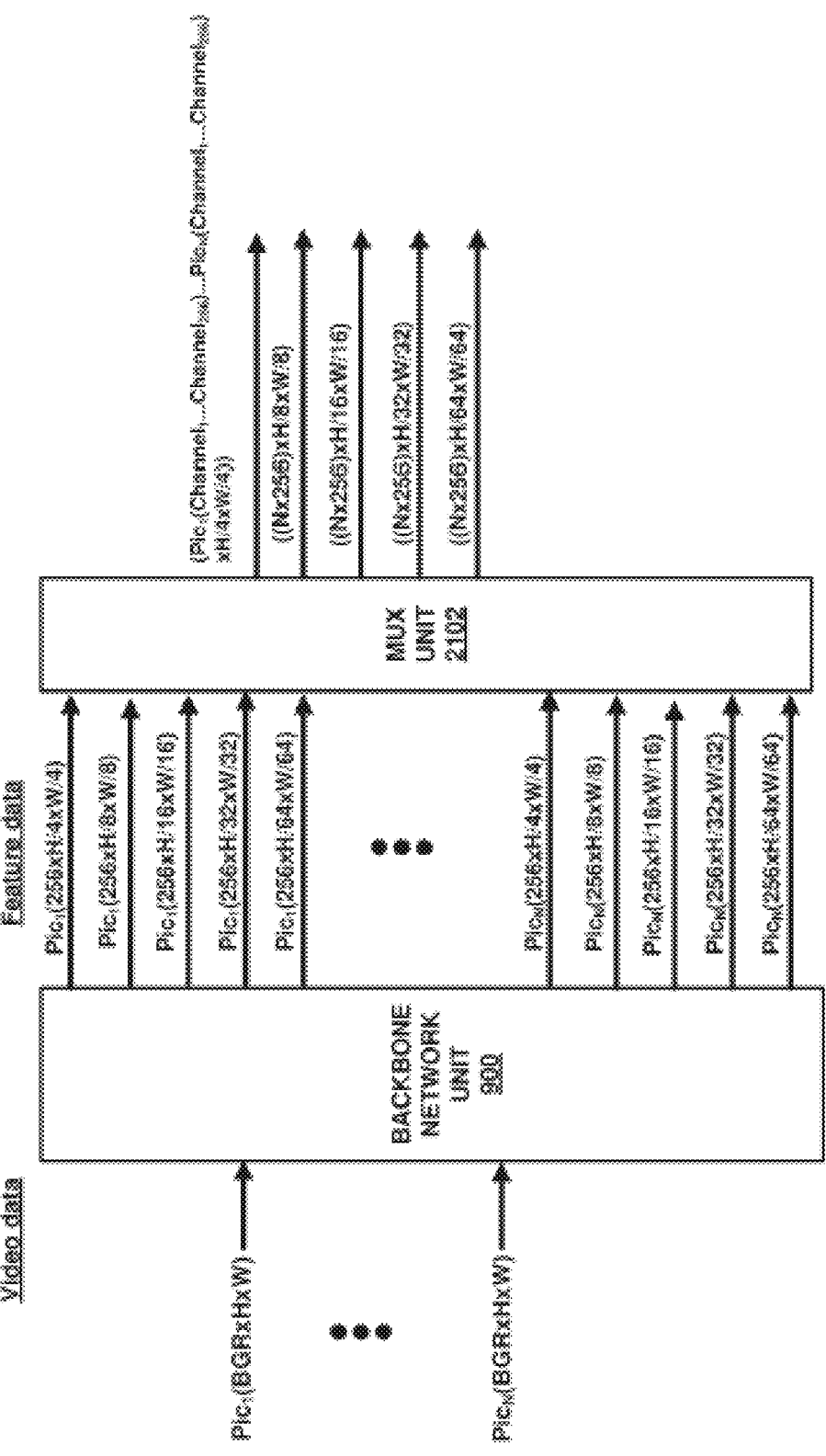
FIG. 30 is an example of a coding system that may encode a multi-dimensional data set in accordance with one or more techniques of this disclosure.
Figure 32:
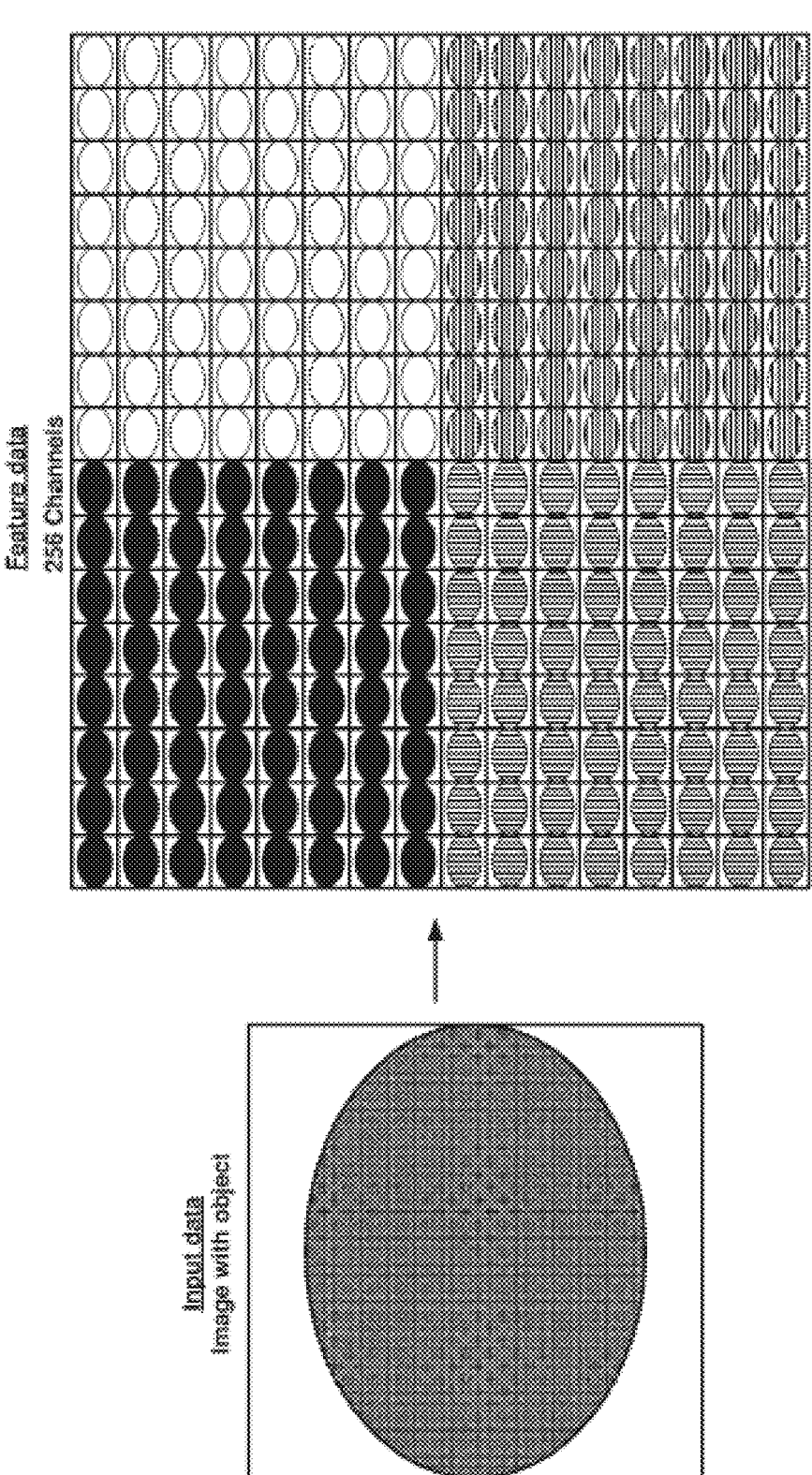
FIG. 32 is a conceptual diagram illustrating an example of coding input data in accordance with one or more techniques of this disclosure.

FIG. 29 illustrates an example of a compression engine configured to perform joint coding of a non-overlapping set of feature data according to the techniques herein. As illustrated in FIG. 28, compression engine 2100 includes MUX unit 2102. MUX unit 2102 may be configured to multiplex and/or concatenate a non-overlapping set of feature data. For example, FIG. 30 illustrates an example where for each of N pictures in a sequence (e.g., $Pic_1$ . . . $Pic_9$), feature maps at ¼ scale, ⅛ scale, 1/16 scale, 1/32 scale, and 1/64 scale, each having 256 channels, as described above, are generated. It should be noted for a picture, the 256 channels of a scale may be visualized as 16×16 tiles which are downsampled thumbnails of the image. FIG. 32 is a conceptual example where input data is an image with a distinct object and 256 channels are illustrated as 16×16 tiles of the downsampled input image. It should be noted that the example illustrated in FIG. 32 may correspond to an example where input data is a grayscale (or monochrome) image or a channel of an image (e.g., luma) and each tile may be visualized as a corresponding downsampled grayscale tile. Further, in a typical case, the input data may include a RGB image, which results in a feature tensor of floating point values with 256 channels. For visualization, each channel may be converted to a grayscale representation, tiled in a 16×16 configuration, and stored in a PNG file.

Referring again to FIG. 30, in the example illustrated in FIG. 30, MUX unit 2102 concatenates feature maps at each scale about the channel dimension. That is, at each scale, for each picture in a set, there is a 3D feature tensor [channels, height, width] and concatenation of the feature tensors results in a tensor of [channels*number of pictures, height, width]. With respect to the example described above with respect to FIG. 30, such concatenation may be visualized in as generating an image (or sequence) including the 16×16 tiles for each picture. FIG. 33 is a conceptual example illustrating a visual example of such a concatenation. It should be noted that in the example illustrated in FIG. 33, the 256 channels of $Pic_1$ and $Pic_N$ are illustrated as identical for simplicity and in practice the channels would be different based on the differences of the respective pictures and possibly differences in processing, as each picture may be coded using different backbone networks and/or parameters thereof. It should be noted that in the example illustrated in FIG. 30, the concatenation operation concatenates channels in sequential order. That is, the concatenation is $Pic_1Channel_1$, . . . $Pic_1Channel_{256}$, $Pic_2Channel_1$, . . . $Pic_2Channel_{256}$, . . . , $PicNChannel_1$, . . . $Pic_NChannel_{256}$. It should be noted that in other examples, MUX unit 2102 may be configured to perform other types of concatenation. For example, MUX unit 2102 may be configured to analyze channels for correlation and arrange the channels accordingly. That is, for example, referring to the conceptual example in FIG. 32 visually similar channels may be grouped spatially. Further, it should be noted that although the example illustrated with respect to FIG. 30 describes 3D feature tensors, in other examples, an additional dimension corresponding to batch size (e.g., (batch_dimension×channel_dimension×height_dimension×width_dimension)) may be included in a feature tensor and in this case, MUX unit 2102 would apply concatenation about the channel dimension for each element of a batch.

Figure 31A:
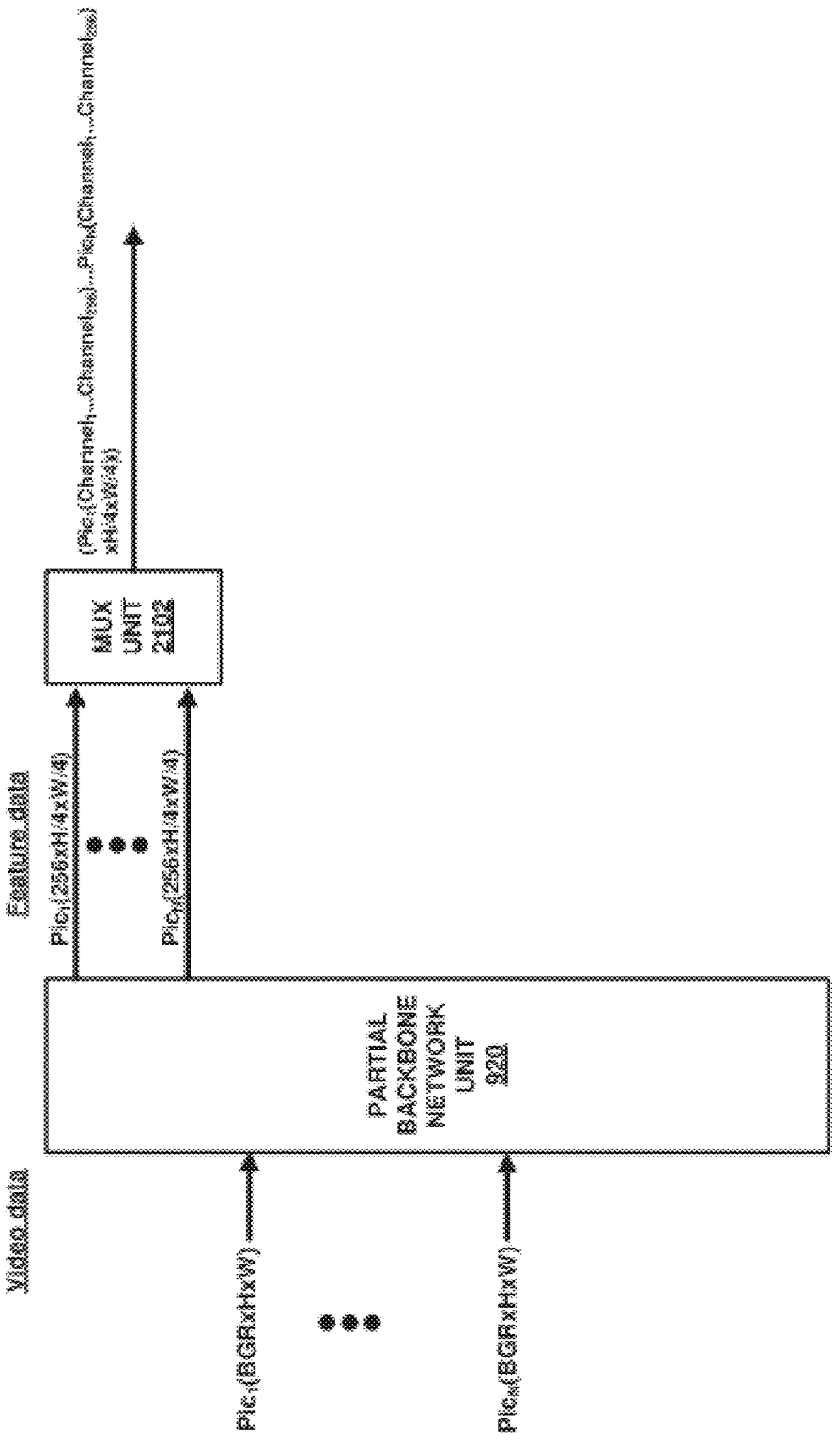
FIG. 31A is an example of a coding system that may code a multi-dimensional data set in accordance with one or more techniques of this disclosure.
Figure 31B:
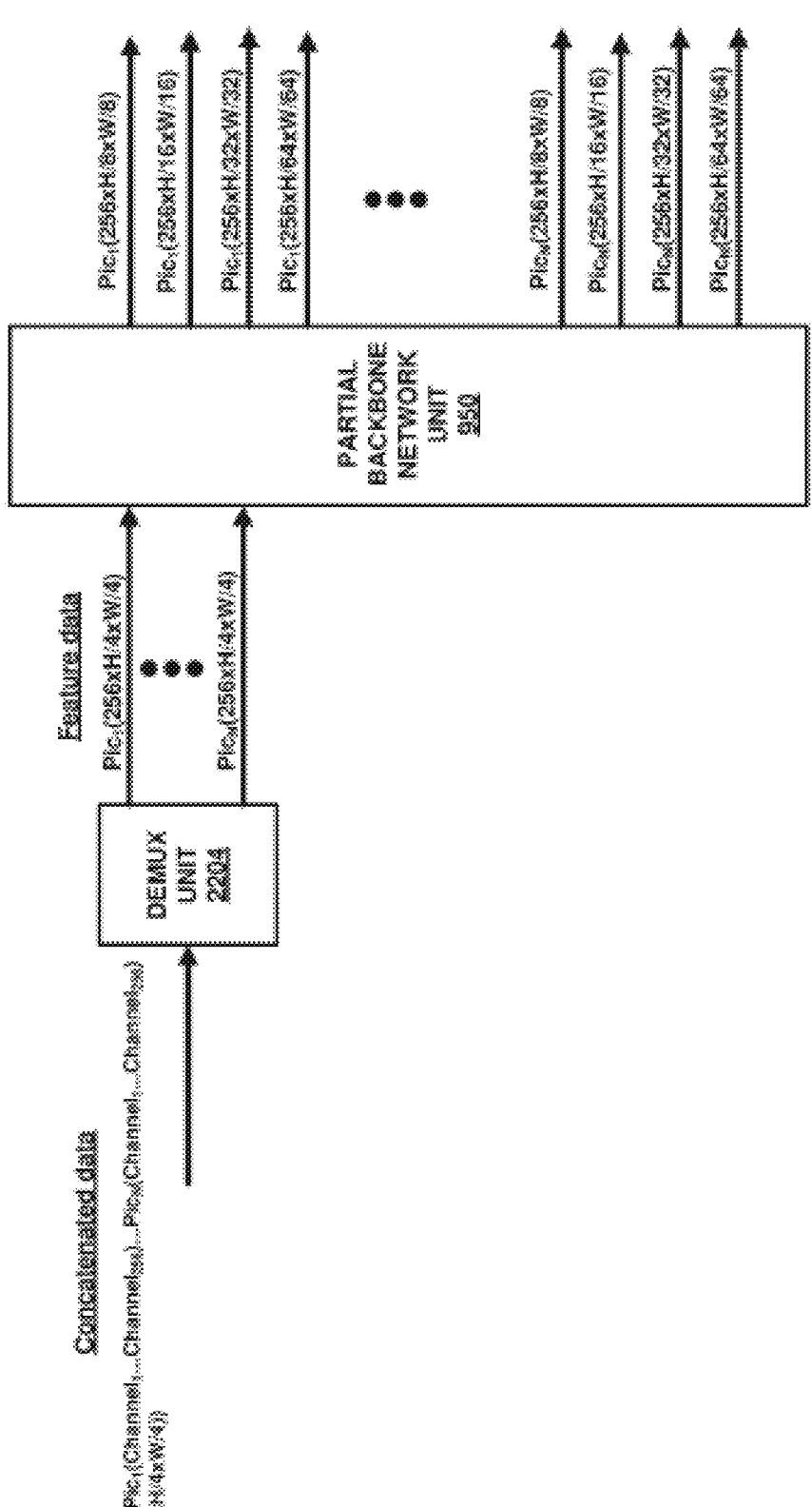
FIG. 31B is an example of a coding system that may code a multi-dimensional data set in accordance with one or more techniques of this disclosure.

As described above, according to the techniques herein, a backbone network may be partitioned across a communications network. FIG. 31A-31B illustrate an example where MUX unit 2102 operates with a backbone network that has been partitioned. That is, in the example illustrated in FIG. 31A, partial backbone network 920 generates ¼ scale feature data and MUX unit 2102 concatenates feature maps about the channel dimension. FIG. 31B illustrates where a DEMUX unit 2204, which is described in further detail below, recovers the ¼ scale feature data and partial backbone network 950 generates feature data for the additional scales from the recovered ¼ scale feature data. It should be noted that although ¼ scale feature data is not shown as output from partial backbone network, as described above, the partition may be between res2 and res3, and in this case, the ¼ scale feature data would be additionally processed and output.

Figure 34B:
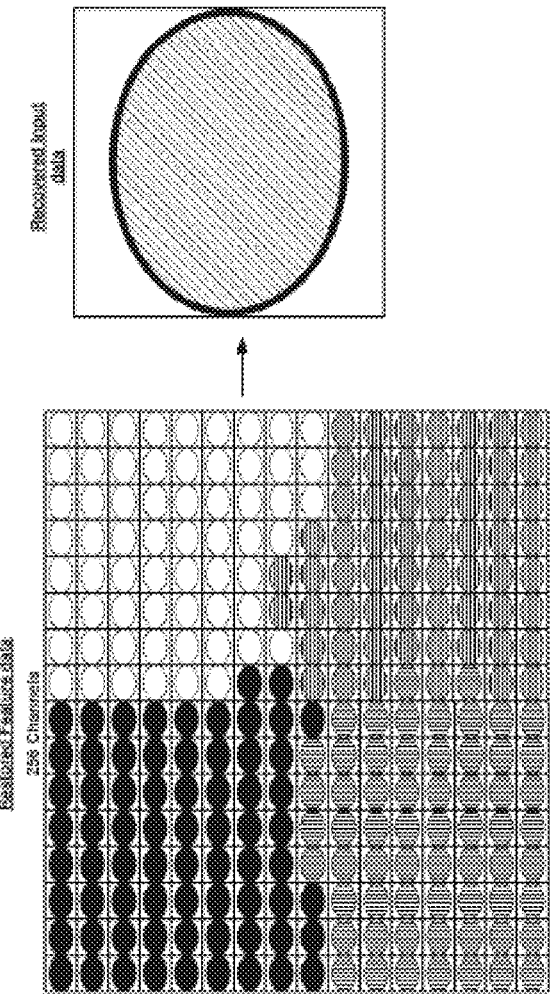
FIG. 34B is conceptual diagrams illustrating an example of recovering input data from compressed feature data in accordance with one or more techniques of this disclosure.

Referring again to FIG. 32, it should be noted that the 256 channels are visually similarly. Thus, some of the channels may be redundant and/or unnecessary for determining the position of the object in the image. Further, the object may be identified in each of the tiles when the tiles are spatially compressed. FIGS. 34A-34B are a conceptual diagram illustrating an example where the feature data illustrated FIG. 32 is spatially compressed and the number of channels is reduced (i.e., from 256 to 16) and image data is recovered from the compressed feature data. In the example, illustrated in FIGS. 34A-34B, recovered input data is illustrated, where the object can be visual identified from the recovered input data. It should be noted that the restored featured data in FIG. 34A and the recovered input data illustrated in FIG. 34B are visually distinct from the input data and feature data illustrated in FIG. 32. As described in detail below, such a distinction may be due to edge loss during compression and noise resulting from decompression. It should be noted however that the differences in the input data and recovered input data may be acceptable for machine consumption (e.g., object recognition, etc.). Referring again to FIG. 33, similar to FIG. 32, the N×256 channels are visually similarly. Thus, according to the techniques herein, concatenated feature data corresponding to non-overlapping sets of pictures may be compressed. That is, $Pic_1 \ldots Pic_N$ in FIG. 30B and FIG. 31A may be a non-overlapping set of pictures and the resulting feature data corresponding to each picture in a set may be jointly coded.

It should be noted that although concatenated data corresponding to each non-overlapping set may be independently coded, there may be temporal correlation between the concatenated data corresponding to non-overlapping set. In this case, coding efficiency may be further improved by exploiting temporal correlation. In one example, a decoded feature of a previous concatenated data may be used for coding a subsequent concatenated data set. For example, in one example, a recovered (i.e., decoded) feature map of a picture (e.g., ¼ scale feature map of $Pic_9$) may be concatenated with the next non-overlapping set (e.g., $Pic_9$ is concatenated with $Pic_{10} \ldots Pic_{18}$) and the resulting concatenated data may be coded. It should be noted that although the introduction of such a coding dependency may improve coding efficiency, one possible drawback is that a group of features without any prediction from previous group of features (e.g., the first group, $Pic_1 \ldots Pic_9$) may use a different network (and/or parameter values) than the subsequent group, which may lead to deeper networks which are harder to train. Further, this approach introduces causal dependency between groups of features that are being coded.

Figure 35:
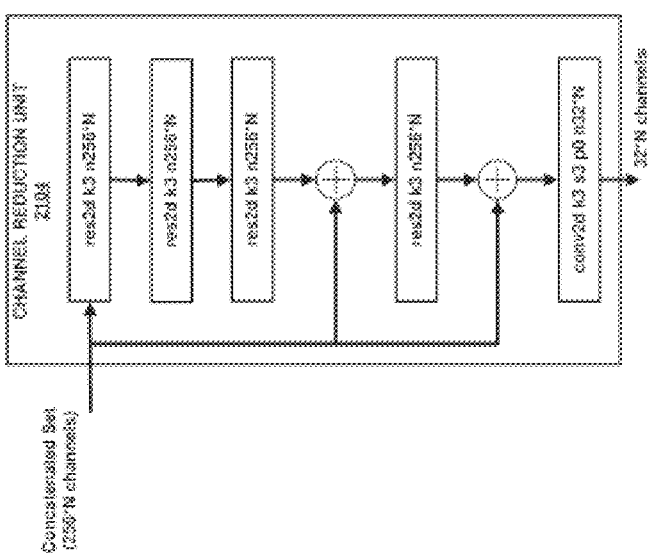
FIG. 35 is an example of a channel reduction unit in accordance with one or more techniques of this disclosure.
Figure 36:
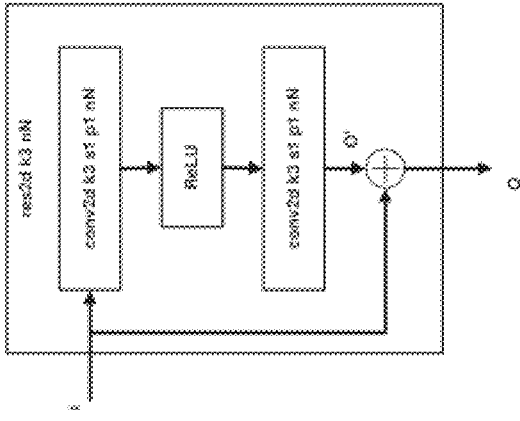
FIG. 36 is an example of a residual block of a channel reduction unit in accordance with one or more techniques of this disclosure.
Figure 37:
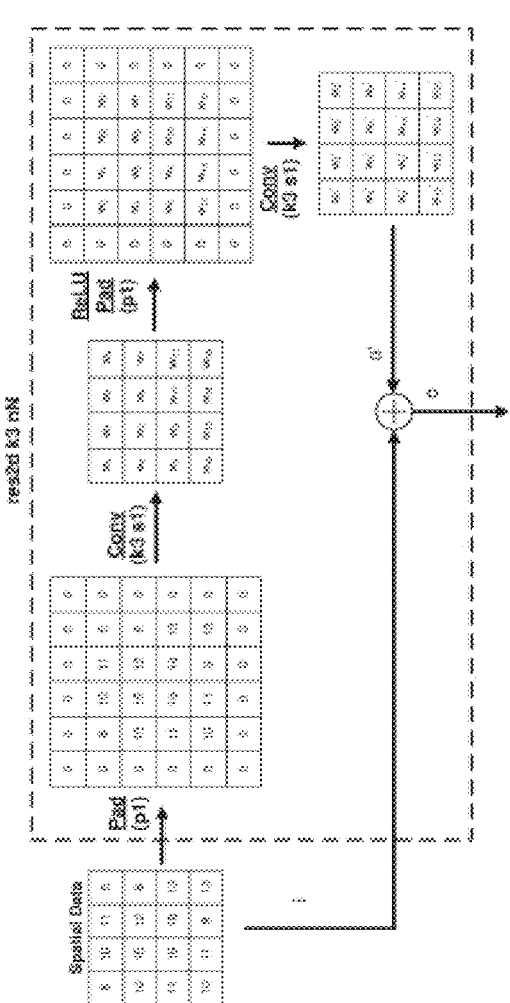
FIG. 37 is a conceptual example of a residual block of a channel reduction unit in accordance with one or more techniques of this disclosure.

Referring again to FIG. 29, the output of MUX UNIT 2102, that is, for example, concatenated feature data is input into a channel reduction unit 2104. Channel reduction unit 2104 may be configured to receive concatenated feature data, for example, a [256×N, H/4, W/4] feature tensors which correspond to 256 channel features maps at ¼ scale of N pictures concatenated about the channel dimension, and compress concatenated data into fewer channels (e.g., 32*N channels). With respect to the example channel reduction unit illustrated in FIG. 35, a final conv2d k3 s3 p0 n32*N operation is used to reduce 256*N channels to 32*N channels. As further illustrated in FIG. 35, prior to this operation, a sequence of res2d k3 n256*N operations and summations are performed resulting in a refinement value being added to the input prior to the channel reduction. It should be noted that a res2d operation may be described as residual blocks of a compressive autoencoder. Typically, a residual block of a compressive autoencoder downsamples input data while increasing a number of channels. For example, Theis, et al., "Lossy Image Compression with Compressive Autoencoders," arXiv:1703.00395, 1 Mar. 2017, describes an example of residual blocks of a compressive autoencoder for compressing an input image. In this example of lossy compression of an input image, the image is spatially downsampled while a number of channels is increased by using convolution operations. It should be noted that this type of downsampling is similar to generating scale data as described above. Further, a compressive autoencoder may include a sequence of residual blocks in cascade (e.g., 3) with a skip connection. FIG. 36 illustrates a res2d k3 nN operation that may be used according to the techniques herein. As illustrated in FIG. 36, for an N channel input a refinement O' is generated using subsequent convolutions and a ReLU operation and the refinement O' is added to the input. FIG. 37 illustrates a conceptual example where for input data, i, a res2d k3 nN operation, provides where output data, o, which is generated by adding an intermediate output, o', to the input data. It should be noted that in the example illustrated in FIG. 35 $w_i$ and $w_i'$ represent the weighted averages at the output of the respective convolution stages. Further, in the example illustrated in FIG. 34, ReLU refers to an operation where ReLU (x)=max (0, x). That is, if an output at the first convolution stage is negative, it is set to 0.

It should be noted that the res2d k3 nN function can serve different purposes in different architectures. For example, it can function as: (1) a residual computation block: where i is an input signal, o' corresponds to a prediction, and o is a difference between input and prediction; (2) prediction block: where i is an input signal that has lost high frequency/detail information, o' is high frequency computed based on input, and o is the output where details have been added back to input; and/or (3) feature/edge enhancement, i.e., in case where a subsequent block down-samples a tensor, it may be desirable that features/edges survive the down-sampling operation, in this case, res2d k3 nN may sharpen the features/edges. Referring again to the example illustrated in FIG. 35, the sequence of res2d k3 n256*N operations and summations essentially operate to enhance edges and features. That is, since the conv2d k3 s3 p0 n32*N downsamples the input feature tensor, about the channel dimension, it is desirable that features and/or edges survive the downsampling operation, in this case, the sequence of res2d k3 n256*N operations and summations may sharpen the features/edges, for example for purposes of object detection. It should be noted that a number of (or sets of) residual blocks in a channel reduction unit may be selected in order to bound training complexity. For example, although additional sets of residual blocks may further sharpen features/edges, it may be undesirable to increase the training complexity required with the introduction of additional sets.

Figure 38:
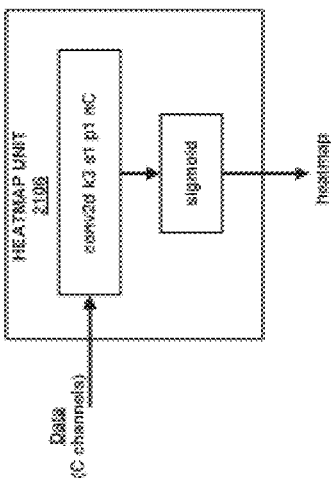
FIG. 38 is an example of a heatmap unit that may generate a heatmap for a multi-dimensional data set in accordance with one or more techniques of this disclosure.
Figure 39:
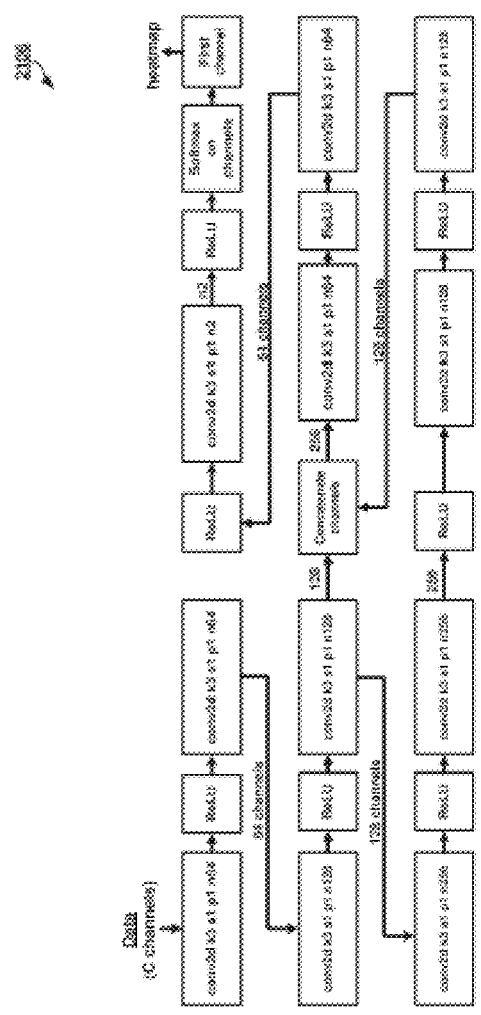
FIG. 39 is an example of a heatmap unit that may generate a heatmap for a multi-dimensional data set in accordance with one or more techniques of this disclosure.

Referring again to FIG. 29, after the number of channels have been reduced, e.g., from 256*N channels to 32*N channels, a conv2d is performed on the reduced number of channels. It should be noted that in some examples, performance of the conv2d operation on the reduced number of channels may be skipped. The result of the conv2d operation is then multiplied by a heatmap prior to quantization by quantizer unit 408 and entropy encoder unit 506. Quantizer unit 408 and entropy encoder unit 506 may respectively perform quantization and entropy encoding as described above. As illustrated in FIG. 29, heatmap unit 2106 receives the result of the conv2d operation and generates a heat map. There may be numerous ways in which heatmap unit 2106 may be configured to generate a heatmap. FIG. 38 and FIG. 39 illustrate examples of heatmap units. FIG. 38 provides a simple implementation of a heatmap unit and FIG. 39 provides a more complex implementation of a heat map unit which provides a measurable improvement in coding efficiency (e.g. ~10%).

It should be noted that in FIG. 38, a sigmoid block corresponds to the following operation:

$$\text{sigmoid}\,(x) = \sigma(x) = \frac{1}{1 + e^{-x}}$$

Thus, the heatmap unit in FIG. 38 provides a weight value from 0 to 1 (non-inclusive), which when multiplied by the input to heatmap unit 2106 effectively suppresses data without impacting subsequent machine task(s) and enhances data for machine task(s). That is, the heatmap can identify spatial locations where a signal can be suppressed safely without impacting machine task(s) under consideration. For example, data at a border of a picture may be suppressed. The suppression of a signal can lead to lower bit consumption. The heatmap can also increase the magnitude of signal at certain spatial locations such that it is beneficial to machine task(s) e.g., object detection.

Referring to FIG. 39, it should be noted that the Softmax on channels block illustrated in FIG. 39, represents an activation function that takes vectors of real numbers as inputs, and normalizes them into a probability distribution proportional to the exponentials of the input numbers. When Softmax is applied, each element will be in the range of 0 to 1, and the elements will add up to 1. It should be noted that Softmax may be referred to as a normalized exponential function. The two output channels of Softmax may correspond to probability a spatial location in a tensor deserves attention (first channel) and probability a spatial location in a tensor does not deserve attention (second channel). Further, the first channel at output of Softmax is used to weight values for each channel within a tensor. With respect to FIG. 39, it should be noted that channel size, C, is increased/decreased in multiples of 2. Further, in an example, if C is greater than 64, the next largest power of 2 may be selected as a starting point. For example, if C=72, then the starting point may be n128 and multiples of 2 may be used throughout. In some cases, for the example illustrated in FIG. 39, the final ReLU operation may be skipped and/or the ReLU operation receiving 256 channels may be skipped. It should be noted that in one example, a heatmap may be the same for all channels, which provides for easier training. In other examples, g heatmaps for groups of channels may be generated by changing "conv2d k3 s1 p1 n2" to "conv2d k3 s1 p1 n2*g." Softmax can then operate on 2 channels for each g at a time.

Figure 40:
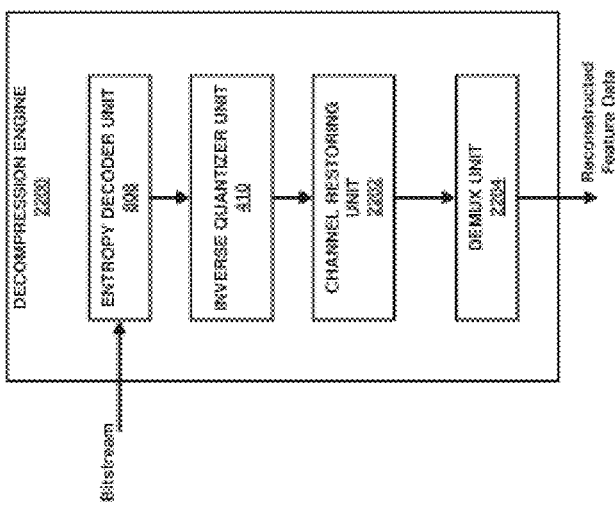
FIG. 40 is a block diagram illustrating an example of a decompression engine that may be configured to decode a multi-dimensional data set in accordance with one or more techniques of this disclosure.
Figure 41:
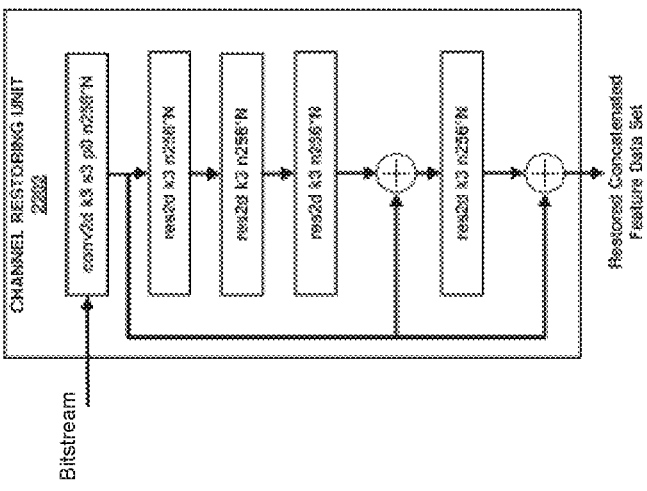
FIG. 41 is an example of a channel restoring unit in accordance with one or more techniques of this disclosure.
Figure 42:
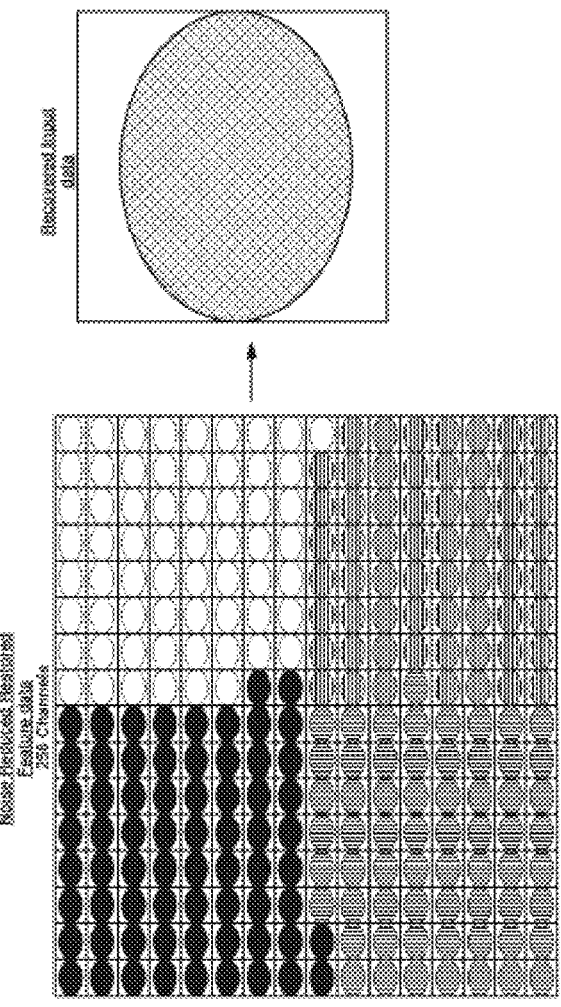
FIG. 42 is a conceptual diagrams illustrating an example of recovering input data from restored feature data in accordance with one or more techniques of this disclosure.

As described above, decompression engine 2200 may be configured to perform reciprocal operations to compression engine 2100 to generate reconstructed feature data. FIG. 40 illustrates an example of a decompression engine configured to generate reconstructed feature data according to the techniques herein. Entropy decoding unit 808 and inverse quantizer unit 410 illustrated in FIG. 40 may respectively operate in a reciprocal manner to entropy encoding unit 506 and quantizer unit 408 described above with respect to FIG. 29. As illustrated in FIG. 40, the output of inverse quantizer unit 410, which may, for example, include 32*N channels of feature data, is input into channel restoring unit 2202. As described above, channel reduction unit 2104 compresses concatenated data into fewer channels (e.g., 256*N channels into 32*N channels), channel restoring unit 2202 is configured to restore the number of channels. In the example channel restoring unit 2202 illustrated in FIG. 41, a conv2d k3 s3 p0 n32*N operation is used to restore the 32*N channels to 256*N channels. As further illustrated in FIG. 41, after this operation, a sequence of res2d k3 n256*N operations and summations are performed resulting in a refinement value being added to the restored set of channels. As described above, res2d k3 nN function can operate to add detail back into an input. In the example illustrated in FIG. 41, the sequence of res2d k3 n256*N operations and summations each essentially operate to add detail (e.g., lost due to noise) into the upsampled data. That is, since the conv2d k3 s3 p0 n256*N performs upsampling, it is desirable that any noise introduced during this process is removed. FIG. 42 is a conceptual diagram illustrating an example where noise has been removed from the restored feature data illustrated in FIG. 34B resulting in the recovered input data illustrated in FIG. 42 appearing more visually similar to the input data illustrated in FIG. 32 than the recovered input data illustrated in FIG. 34B.

Referring again to FIG. 40, after the number of channels have been restored, the restored concatenated data is input into DEMUX unit 2204. DEMUX unit 2204 may operate in a reciprocal manner to MUX unit 2102 described above. That is, DEMUX unit 2204 may perform an inverse operation to a concatenation operation such that a feature data set (e.g., ¼ scale data) may be recovered. As described above, a recovered feature set may be input in an inference network unit or in the case of a partitioned backbone network, into a partial backbone network. It should be noted that partitioning a backbone network may provide for more efficiency in terms of number of bits required in a bitstream while not partitioning a backbone network may have advantages such as lower complexity at a receiving location (e.g., partial backbone implementation not required). Thus, according to the techniques herein, a backbone network may be partitioned and distribution across a communications medium may be based on a desired bit-rates and/or desired complexity at each location.

In this manner, coding systems described herein represent an example of a device configured to generate feature data corresponding to a scale having a number of channels for each picture included in video data, concatenate the generated feature data about a channel dimension, reduce the number of channels in the concatenated data, and encode the reduced concatenated data into a bitstream.

Figure 43A:
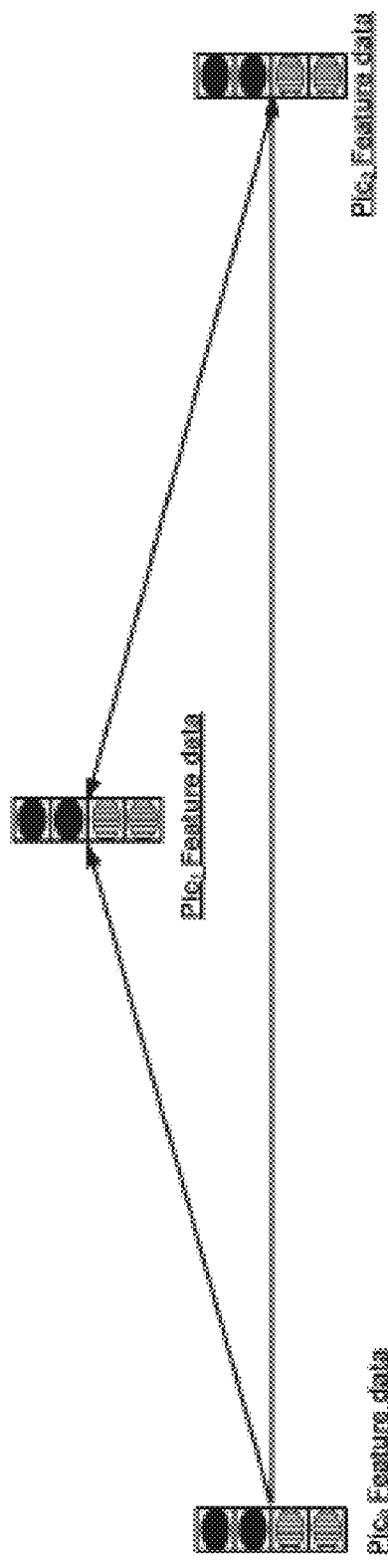
FIG. 43A is conceptual diagrams illustrating examples of hierarchical coding in accordance with one or more techniques of this disclosure.
Figure 43B:
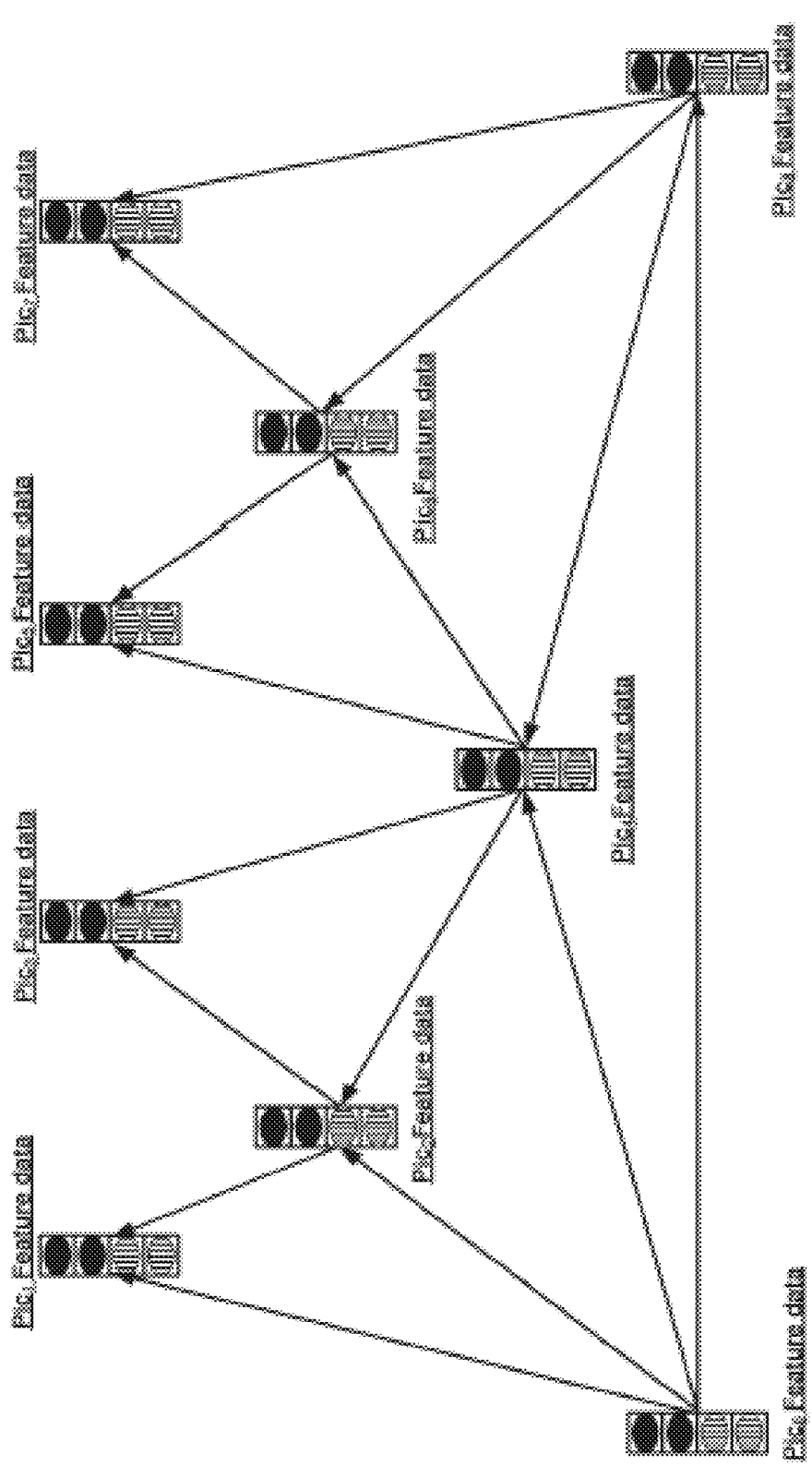
FIG. 43B is conceptual diagrams illustrating examples of hierarchical coding in accordance with one or more techniques of this disclosure.

Referring again to FIG. 33, as described above, for pictures of a non-overlapping set, the 256 channels of feature data may be similar. Thus, according to the techniques herein, feature data corresponding to a picture in a set (e.g., a non-overlapping set or an overlapping set) may be coded based on hierarchical coding. That is, one or more feature sets may be used to predictively code another feature set. It should be noted that compared to joint coding described above, the number of parameters may be reduced for hierarchical coding, because, for joint coding, features for all pictures are processed simultaneously within residual layers. This simultaneous processing requires a larger number of channels to be processed and therefore, the 2d convolution kernels require a larger support region. FIGS. 43A-43B are conceptual diagrams illustrating examples of hierarchical coding in accordance with one or more techniques of this disclosure. In the example illustrated in FIG. 43A, feature data for $Pic_0$ is coded without reference to $Pic_1$ or $Pic_2$, feature data for $Pic_2$ is coded with reference to $Pic_0$, and feature data for $Pic_1$ is coded with reference to $Pic_0$ and $Pic_2$. In the example illustrated in FIG. 43B, a similar hierarchical coding structure is presented for a case of nine pictures, where feature data is coded by referencing zero, one, or two sets of feature data. It should be noted that there may be numerous ways to generate hierarchical coding structures when zero, one, or two sets of feature data may be used for reference. In one example, features corresponding to, at most two pictures, are processed simultaneously in the residual layers. It should be noted that this limits the number of channels to be processed and reduces the support region needed for 2d convolution kernels thereby reducing the number of parameters, compared to joint coding.

FIG. 44 is an example of a coding system that may encode a multi-dimensional data set in accordance with one or more techniques of this disclosure. It should be noted that the example illustrated in FIG. 44 corresponds to the example illustrated in FIG. 43A. In the case of the example illustrated in FIG. 43B, and other example hierarchical coding structures, the type and number of compression/decompression engines would be arranged based on the hierarchical structure. For example, with respect to $Pic_5$ feature data in FIG. 43B, a compression engine corresponding to $Pic_5$ feature data would receive reconstructed feature data corresponding to $Pic_4$ and $Pic_6$. Referring again to FIG. 44, it should be noted that feature data corresponding to $Pic_0$ is encoded without reference to other sets of feature data. Thus, compression engine 3100 and decompression engine 3300 may be referred to as intra prediction engines. Similarly, since feature data corresponding to $Pic_1$ is encoded with reference to Reconstructed Feature $Data_0$ and Reconstructed Feature $Data_2$, compression engine 3200 and decompression engine 3400 may be referred to as inter prediction engines. As described in further detail below, it should be noted that for a particular hierarchical coding structure, each compression/ decompression engine and components thereof, may have unique/independent trainable parameters. That is, for example, like numbered blocks in FIG. 44 (e.g., 3200) may operate using distinct parameters.

FIG. 45 is an example of a coding system that may decode a multi-dimensional data set in accordance with one or more techniques of this disclosure. The example illustrated in FIG. 45 corresponds to the example illustrated in FIG. 44. Similar to the example illustrated in FIG. 44, the type and number of decompression engines would be arranged based on the hierarchical structure. It should be noted that the example illustrated in FIG. 44 and FIG. 45 may be distributed across a communications medium as described above. For example, they may be distributed according to a backbone network being partitioned across a communications medium or a backbone network and an inference network being distributed across a communications network, as described above.

Figure 46:
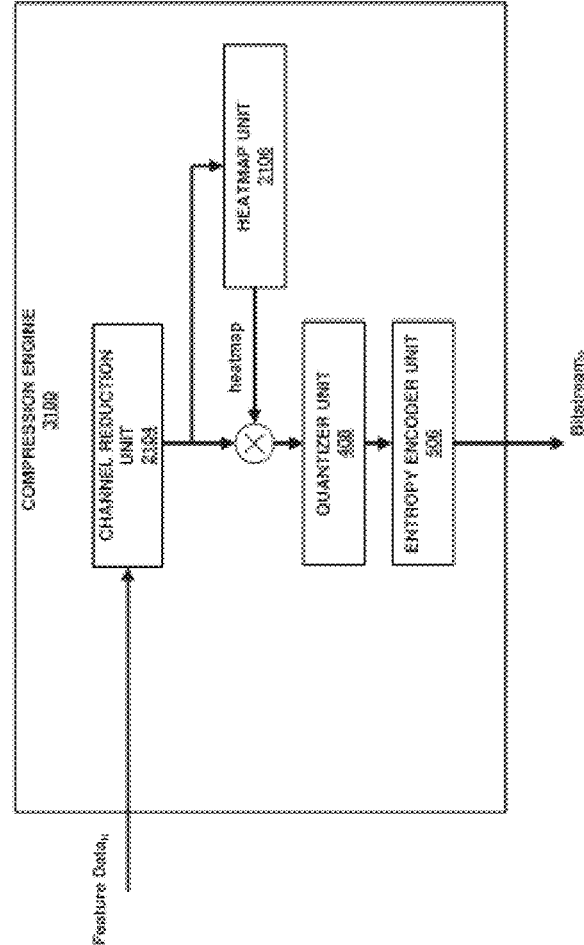
FIG. 46 is a block diagram illustrating an example of a compression engine that may be configured to encode a multi-dimensional data set in accordance with one or more techniques of this disclosure.

FIG. 46 illustrates an example of compression engine 3100, i.e., an intra prediction compression engine. As illustrated in FIG. 46, the compression engine operates in a similar manner to compression engine 2100 illustrated in FIG. 29 and similarly includes entropy encoder unit 506, quantizer unit 408, heatmap unit 2106, and channel reduction unit 2104. Entropy encoder unit 506, quantizer unit 408, and heatmap unit 2106 may operate as described above.

Channel reduction unit 2104 may operate as described above with respect to FIG. 35, it should be noted, however, for the example illustrated in FIG. 46, N would be equal to 1. Thus, 256 channels of feature data corresponding to $Pic_0$ are essentially, spatially downsampled to 32 channels, after features/edges have been enhanced. It should be noted that in other examples, instead of 32 channels, another number could be used (e.g., 16 channels), for example, based on a rate constraint. Further, it should be noted that since compression engine 3200 operates in an encode/decode loop, in some cases entropy encoder unit 506 (and a corresponding entropy decoder unit) may be bypassed for operation in an encoder side encode/decode loop.

Figure 47:
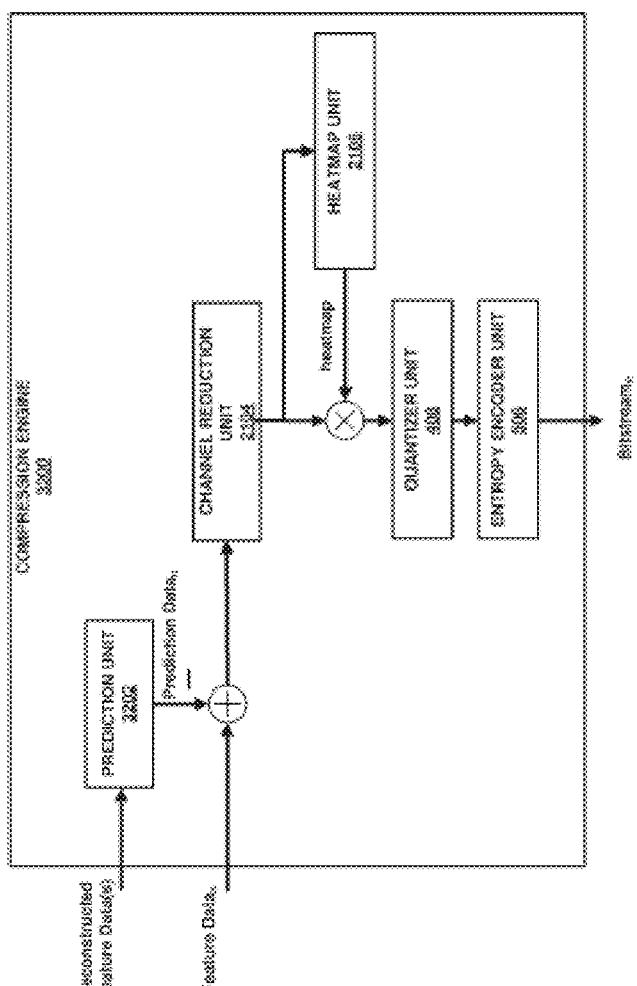
FIG. 47 is a block diagram illustrating an example of a compression engine that may be configured to encode a multi-dimensional data set in accordance with one or more techniques of this disclosure.
Figure 48A:
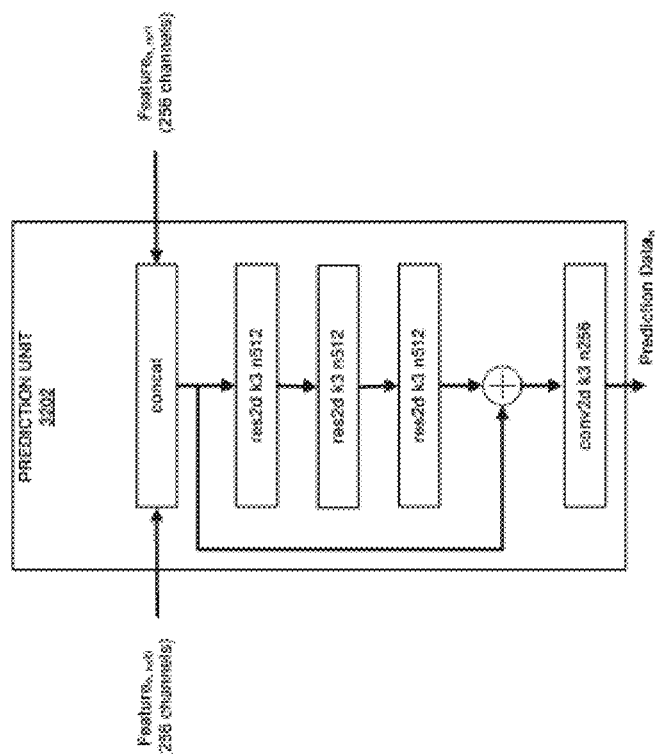
FIG. 48A is block diagrams illustrating an examples of prediction units that may be configured to code feature data in accordance with one or more techniques of this disclosure.
Figure 48B:
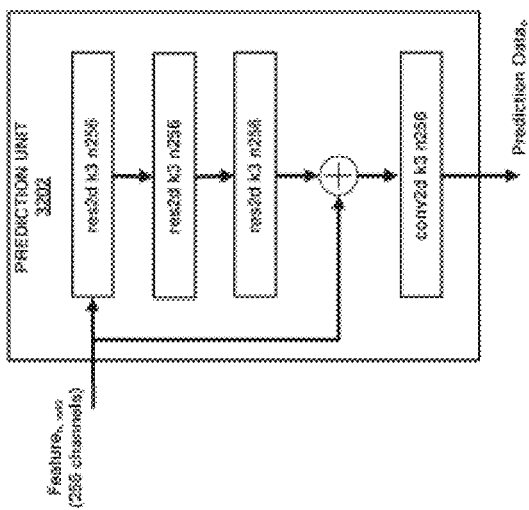
FIG. 48B is block diagrams illustrating an examples of prediction units that may be configured to code feature data in accordance with one or more techniques of this disclosure.

FIG. 47 illustrates an example of compression engine 3200, i.e., an inter prediction compression engine. As illustrated in FIG. 47, the compression engine operates in a similar manner to compression engine 3100. However, compression engine 3200 additionally includes prediction unit 3202 which receives reconstructed feature data which is subtracted from the feature data to be compressed. For example, referring to the example illustrated in FIG. 43A, reconstructed feature data may include reconstructed feature data for $Pic_0$ and $Pic_2$ and feature data may include the feature data for $Pic_1$. FIG. 48A illustrates an example of a prediction unit 3202. In the example illustrated in FIG. 48A, the two sets of reconstructed feature data are concatenated about the channel dimension. For example, in a manner similar to that described above with respect to MUX unit 2102. The concatenated channels are refined using residual blocks, the operation of which is described above, and downsampled to 256 channels. As illustrated in FIG. 47, this output of prediction unit 3202 is subtracted from the feature data to be compressed. As described above, one set of reconstructed feature data may be used to compress feature data. In one example, according to the techniques herein, the prediction unit illustrated in FIG. 48B may be used with the one set of reconstructed feature data being used for both inputs. In another example, the residual unit illustrated in FIG. 48B may be used with the one set of reconstructed feature data being used for the single input. As illustrated in FIG. 48B, the number of channels of the residual blocks is 256, as opposed 512 channels in FIG. 48A. It should be noted that the single input design would be expected to have lower coding efficiency, but also have lower complexity.

Figure 49:
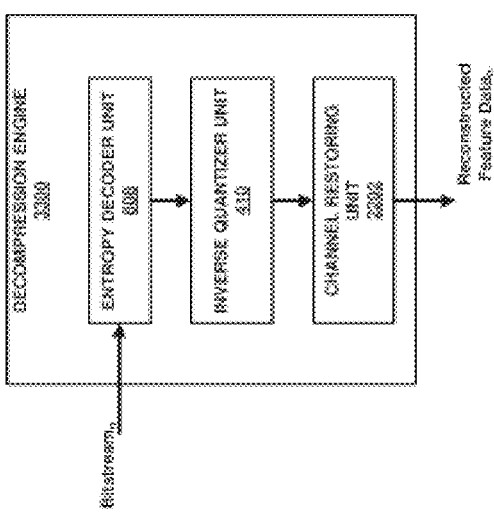
FIG. 49 is a block diagram illustrating an example of a decompression engine that may be configured to decode a multi-dimensional data set in accordance with one or more techniques of this disclosure.

FIG. 49 illustrates an example of decompression engine 3300, i.e., an intra prediction decompression engine. As illustrated in FIG. 49, the compression engine operates in a similar manner to decompression engine 2200 illustrated FIG. 40 and similarly includes entropy decoder unit 808, inverse quantizer unit 410, and channel restoring unit 2202. Entropy decoder unit 808 and inverse quantizer unit 410 may operate as described above. Channel restoring unit 2202 may operate as described above with respect to FIG. 41, it should be noted, however, for the example illustrated in FIG. 49, N would be equal to 1. Thus, 32 channels of compressed feature data corresponding to $Pic_0$ are essentially, spatially upsampled to 256 channels, and noise is reduced. It should be noted that in other examples, instead of 32 channels, another number could be used (e.g., 16 channels). For example, the number of channels may be selected based on a rate constraint.

Figure 50:
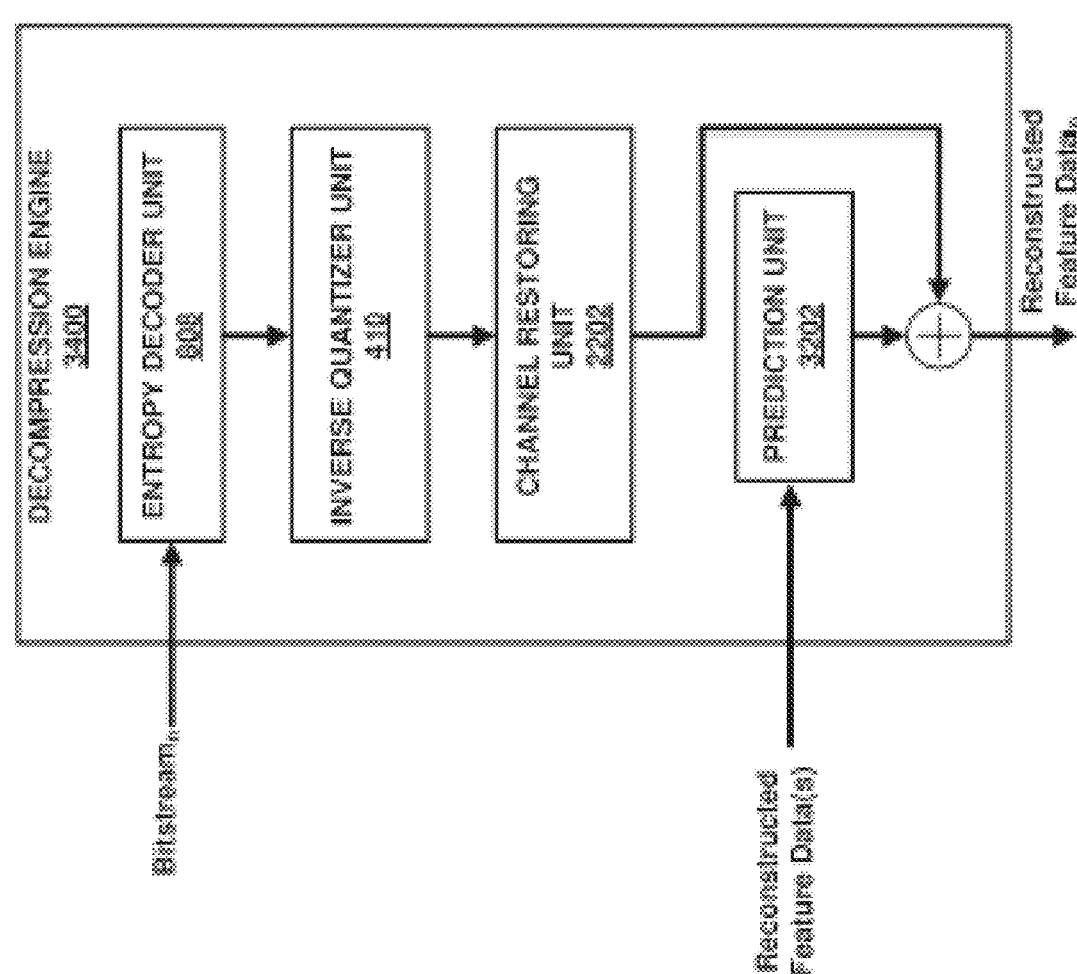
FIG. 50 is a block diagram illustrating an example of a decompression engine that may be configured to decode a multi-dimensional data set in accordance with one or more techniques of this disclosure.

FIG. 50 illustrates an example of decompression engine 3400, i.e., an inter prediction compression engine. As illustrated in FIG. 50, the decompression engine operates in a similar manner to decompression engine 3300. However, decompression engine 3400 additionally includes prediction unit 3202 which, as described above, receives reconstructed feature data which is added to the restored feature data. For example, referring to the example illustrated in FIG. 43A, reconstructed feature data may include reconstructed feature data for $Pic_0$ and $Pic_2$ and restored feature data may include the feature data for $Pic_1$. As illustrated in FIG. 50, the output of prediction unit 3202 is added to the restored channels, resulting in reconstructed feature data. It should be noted that a prediction unit in a compression engine and a prediction unit in a decompression engine may have different structures. For example, as described above, a number of (or sets of) residual blocks may be selected based on a particular application or in order to bound training complexity. Thus, for example, a compression engine and a prediction unit in a decompression engine may have a different number of residual blocks.

It should be noted that for a particular hierarchical coding structure, each compression/decompression engine and components thereof, may have unique/independent trainable parameters. Further, for each set, there may be a particular hierarchical coding structure, with each compression/decompression engine and components thereof, having unique/independent trainable parameters. Having unique/independent trainable parameters may increase processing and/or memory requirements. In one example, according to the techniques herein, trainable parameters may be shared to alleviate processing and/or memory requirements. In one example, according to the techniques herein, a hierarchical structure and parameters for compression/decompression engines may be the same for each non-overlapping set. In one example, according to the techniques herein, a hierarchical structure and parameters for compression/decompression engines may be unique and/or shared on a set-by-set basis. For example, for five non-overlapping sets, the hierarchical structure may be the same for each set, and for the first non-overlapping set, a first set of parameters may be used; for the second and third non-overlapping sets, a second set of parameters may be used; and for the fourth and fifth set, a third set of parameters may be used. It should be noted that a hierarchical structure and parameters for compression/decompression engines may be based on the number of pictures in a non-overlapping set. Referring to FIG. 43B, it should be noted that pictures at each level may described as a layer, which may correspond to, for example, a temporal sub-layer. That is, the example illustrated in FIG. 43B may correspond to the following temporal sublayers: $sublayer_0$ [$Pic_0$, $Pic_8$], $sublayer_1$[$Pic_4$], $sublayer_2$[$Pic_2$, $Pic_6$], $sublayer_3$ [$Pic_1$, $Pic_3$, $Pic_5$, $Pic_7$,]. In one example, according to the techniques herein, parameters of compression/decompression engines and/or sub-components thereof may be shared for a sublayer. For example, in one example, parameters of prediction units may be shared for a sublayer. In one example, parameters of compression/decompression engines may be shared for a sublayer. As described above, whether/how parameters are shared may be based on memory requirements.

In this manner, coding systems described herein represent an example of a device configured to receive a bitstream including concatenated data with a reduced number of channels, restore a number of channels in the concatenated data, and perform an inverse concatenation operation, such that the concatenated data is separated into feature data corresponding to a scale having a number of channels for each picture included in video data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

CROSS REFERENCE

This Nonprovisional application claims priority under 35 U.S.C. § 119 on provisional Applications No. 63/247,111 on Sep. 22, 2021 and No. 63/248,733 on Sep. 27, 2021, the entire contents of which are hereby incorporated by reference.

The invention claimed is:

1. A method of compressing feature data corresponding to video data, the method comprising:

for each of N pictures included in video data, generating feature data including a number of channels, C, corresponding to a scale, such that the generated feature data for each of the N pictures includes a feature tensor including a channel dimension, a height dimension, and a width dimension, (C×H×W);

concatenating the generated feature data about the channel dimension, such that the concatenated feature data includes a concatenated feature tensor including a channel dimension, wherein the number of channels in the concatenated feature tensor is given by N multiplied by the number of channels corresponding to the scale (N×C);

reducing the number of channels in the concatenated feature tensor to generate reduced concatenated feature data, wherein reducing the number of channels in the concatenated feature tensor includes:

performing a sequence of res2d operations on the concatenated feature tensor to generate a refinement value, wherein each of the res2d operations is a residual block of a compressive autoencoder, adding the refinement value to the concatenated feature tensor to generate an enhanced concatenated feature tensor, and performing a 2D convolution operation on the enhanced concatenated feature tensor to reduce the number of channels in the enhanced concatenated feature tensor from (N×C) to (N×M), wherein M is less than C; and encoding the reduced concatenated feature data into a bitstream.

2. The method of claim 1, wherein the number of channels, C, is equal to 256 channels and the scale corresponds to a ¼ scale.

3. The method of claim 2, wherein M is equal to 32.

4. The method of claim 1, wherein encoding the reduced concatenated data into a bitstream includes quantizing and entropy encoding the enhanced concatenated feature tensor including (N×M) channels.

5. A device comprising one or more processors configured to:

for each of N pictures included in video data, generate feature data including a number of channels, C, corresponding to a scale, such that the generated feature data for each of the N pictures includes a feature tensor including a channel dimension, a height dimension, and a width dimension, (C×H×W);

concatenate the generated feature data about the channel dimension, such that the concatenated feature data includes a concatenated feature tensor including a channel dimension, wherein the number of channels in the concatenated feature tensor is given by N multiplied by the number of channels corresponding to the scale (N×C);

reduce the number of channels in the concatenated feature data to generate reduced concatenated feature data, wherein reducing the number of channels in the concatenated feature tensor includes:

performing a sequence of res2d operations on the concatenated feature tensor to generate a refinement value, wherein each of the res2d operations is a residual block of a compressive autoencoder, adding the refinement value to the concatenated feature tensor to generate an enhanced concatenated feature tensor, and performing a 2D convolution operation on the enhanced concatenated feature tensor to reduce the number of channels in the enhanced concatenated feature tensor from (N×C) to (N×M), wherein M is less than C; and encode the reduced concatenated feature data into a bitstream.

6. The device of claim 5, wherein the number of channels, C, is equal to 256 channels and the scale corresponds to a ¼ scale.

7. The device of claim 6, wherein M is equal to 32.

8. The device of claim 5, wherein to encode the reduced concatenated data into a bitstream includes to quantize and entropy encode the enhanced concatenated feature tensor including (N×M) channels.

* * * * *